March 14, 1961 F. G. STEELE 2,974,867

ELECTRONIC DIGITAL COMPUTER

Filed Oct. 25, 1956 4 Sheets-Sheet 1

INVENTOR:
Floyd G. Steele

By Seymour M. Rosenberg
Attorney

INVENTOR
Floyd G. Steele

By Seymour M. Rosenberg
Attorney

INVENTOR:
Floyd G. Steele

By Seymour M. Rosenberg
Attorney

INVENTOR:
Floyd G. Steele

By Seymour M. Rosenberg
Attorney 2,974,867

ELECTRONIC DIGITAL COMPUTER

Floyd G. Steele, La Jolla, Calif., assignor to Digital Control Systems, Inc., La Jolla, Calif.

Filed Oct. 25, 1956, Ser. No. 618,232
28 Claims. (Cl. 235—167)

The present invention relates to an electronic digital computer and more particularly to a general purpose electronic digital serial computer wherein both the number of addressing operations required and the equipment required for the accomplishment of such addressing operations has been greatly reduced.

In recent years a number of general purpose computers have been constructed, which although utilizing a fairly slow serial type of storage of signals, namely, magnetic drum storage, have nevertheless achieved unusually high computational rates, these high computational rates being largely due to the fact that these machines operate in a basic single address mode of operation which encourages minimal time programming and which eliminates much of the transferring, searching and selecting associated with the older two, three and four address modes of operation.

In one of the most advanced of these prior art computers, the information stored in the internal memory of the computer is organized in the following manner. The largest unit of information stored in the computer is called a block. A block comprises a plurality of serially arranged words, there being two types of words, instruction words and operand words. As instruction word contains a first group of signals designating an instruction to be performed and a second group of signals designating the address or position in the memory from which is to be read an operand number required in performing the instruction. An operand word contains merely a group of signals designating an operand number.

The memory of this prior art computer is organized into three one word arithmetic or operating registers (which are mechanized as short recirculating memory channels established over segments of the drum surface), an intermediate memory which contains four blocks contained in four separate intermediate length channels, and a main memory which contains a very large number of blocks each stored in a separate channel of the drum and read by a separate transducer.

Computation is ordinarily performed upon the words of one of the four blocks stored in the intermediate memory, the other three blocks being held in a stand-by condition so that they are ready for use when required. In a block being computed upon, instruction words are stored in a definite order and in predetermined positions or addresses, each instruction word being spaced from the preceding instruction word by a distance corresponding to ⅛ revolution of the drum. The spaces between the instruction words contain operand words. The normal operation of the computer is that it reads and accepts the instruction words in order. In response to the instruction and address in each instruction word, the computer waits until the operand number designated by the address appears at the read transducer. The designated operand number is then copied into one of the arithmetic registers and combined with numbers in the other arithmetic registers in accordance with the mathematical operation designated by the instruction. Alternatively, in response to an instruction and associated address, a number may be copied from one of the arithmetic registers into the intermediate length channel at the position designated by the address. The normal serial order in which instruction words are read may be disrupted through use of a jump instruction and associated address, the jump instruction causing the computer to not accept the normal succeeding instruction word but rather to accept its next instruction word from the position designated by the address.

Certain instructions called no address instructions specify operations to be performed only between arithmetic registers and hterefore do not require any new operands. In responding to such a no address instruction the computer ignores the following address and merely performs the required inter-register operation. The unused address may be replaced if desired by an additional no address instruction.

It should be understood that word addressing of the type described above is restricted to the block being computed upon in the intermediate channel. Special block jump instructions are provided which can cause the computer to begin computing upon a different one of the four blocks of the intermediate memory. When new information must be summoned up from the main memory, a block copy instruction and associated address are utilized, the address designating not a word position but rather the channel in the main memory in which the described block is stored. In response to a block copy instruction and associated address the computer parallel selects by means of a set of relays the transducer which is reading the channel of the desired block in the main memory and that block is then copied into one of the four blocks of the intermediate memory. Block copy instructions are also available for copying blocks back from the intermediate memory channels into designated channels of the main memory.

Word addressing in this prior art computer in connection with normal signal address instructions is mechanized in the following manner. A word address is transferred from the instruction word in which it appears to a plurality of flip-flops comprising an address register. The number in the address register is then continually compared with the count in a word counter which is counting words passing beneath the read transducer of the block being computed upon. When the count in the word counter agrees with the number in the address register, it is known that the desired word is being read and it is copied into one of the arithmetic registers.

Block addressing, in connection with a block copy instruction is mechanized in a somewhat different manner. A block address is transferred just like a word address to the address register. The output signals of the address register flip-flops are then utilized in parallel to control the selection, by means of a set of relays, of the transducer on the designated channel of the main memory. Since there are a very large number of channels in the main memory, a rather large selection matrix are a large number of relays and associated transducers (as well as the flip-flops of the address register) are required to accomplish this parallel selection of a desired block from the main memory. The equipment required in the described prior art computer for accomplishing this parallel selection constitutes a relatively large proportion of the total equipment in the computer.

It is of course obvious that it is desirable from an economic viewpoint to decrease the amount of equipment in a computer, especially if this can be done without any impairment of performance especially as respects speed of operation. The general purpose computer of the present invention has less than half as much equipment as the described prior art computer. In the general purpose computer of the present invention, the flip-flops of the word counter; and of the address register, and the large amount of equipment (selection matrix, multiplicity of relays and multiplicity of transducers) required for parallel selections of blocks from the multiple channels of the main memory has been entirely eliminated. Nevertheless the performance parameters of the general purpuse computer of the present invention in general match and in some areas exceed those of the described prior art computer, the computer of the present invention having approximately the same effective operating speed as the descirbed prior art computer and having similar types and varieties of instructions as well as certain special instructions which greatly increase its flexibility.

In the computer of the present invention very nearly all of the large amount of equipment normally required for selection of blocks from the main memory has been eliminated by serializing the main memory. That is, in the computer of the present invention, the plurality of blocks of the main memory are not contained in separate channels on the drum, each read by a separate parallel selected transducer but are instead arranged in order in a long memory channel or loop, the blocks being read in serial order from the long channel by an associated read transducer.

Parallel selection of the proper read transducer for a desired block is therefore not required in the computer of the present invention, a desired block being obtained instead, by calling for it at the time that it is being read by the read transducer of the long channel. The manner in which the long channel is established is unique. To assure absolute synchronization between the long channel and the other channels of the computer, the long channel is established on the surface of the drum itself, this being accomplished by gearing two transducers to the drum so that they are moved axially upwards and downwards adjacent the drum, each transducer traversing a helical channel on the drum surface, a counterclockwise helical channel being traversed by one transducer as the transducers move upward and an oppositely wound clockwise helical channel being traversed by the other transducer as the transducers move downwards. These two helical channels together hold all of the blocks of the main memory, so that all of the blocks of the main memory are traversed in order during one cycle of movement of the transducers. The coupling between the transducers and the drum is such that one traversal (one cycle of operation) of the long channel corresponds to an integral number of drum revolutions thus assuring that the helical channels and the blocks stored therein have fixed and known positions on the drum periphery. The two transducers are alternately connected by a switch to a common read-write circuit, each transducer being connected as it traverses its own helical channel.

It might be thought that serializing the main memory would have the effect of considerably reducing operating speed, since it is necessary to wait for a desired main memory block until it is read in its normal serial order rather than directly and immediately selecting the desired block. Actually there is no decrease in effective operating speed in the general purpose computer of the present invention. It must be understood in this connection that in ordinary computation, new blocks are required relatively infrequently. Ordinarily, lengthy computations, extensive iterations, are performed on the words of a block being computed upon, a new block not being required until these lengthy computations have been completed.

It is therefore clear that even a moderate increase in speed of computation upon words of a block will compensate for considerable increase in the time required for obtaining new blocks. Such an increase in speed of computation upon words of a block being computed upon has actually been obtained in the computer of the present invention by designating it to normally operate in a basic no-address mode of operation which occasionally reverts to a modified form of single address. In this form of operation called half-address operation, all words are instruction words and are normally read in order from an L block held in an intermediate channel. Each word contains an instruction and immediately thereafter a number portion designating an operand (and occasionally designating an address or addresses). When such a word is read, the instruction contained in the word is performed upon the immediately succeeding operand in the same word. Thus, ordinarily, addressing operations are not required and all of the time required in a single address operation for reading the address and seeking the addressed operand word is saved.

A few special instructions notably the jump instruction and the so-called "put" and "take" instruction require addresses and in a word containing such an instruction the immediately succeeding number portion (now and address portion) designates the address or addresses. In contrast to the described prior art computer, it is seen that in the computer of the present invention no address operation is not restricted to a necessarily brief series of instructions acting upon the few operands in the arithmetic registers but rather can proceed continuously for a great many instructions because of the fact that a large number of new operands can be introduced, as computation proceeds, thereby saving considerable time. It is quite feasible for example, in the general purpose computer of the present invention to perform 32 operational instructions during one cycle of operations upon a 33 word block, a computational rate that is unexcelled.

Moreover, since no address functioning is the normal mode of operation of the computer of the present invention, it is clear that an address register is not normally required. In fact there is no address register at all in the present computer. None is required in the normal no address operation and in response to an occasional word holding a special instruction and address portion, one of the arithmetic registers is borrowed to temporarily hold the address portion while the desired address (or addresses) is being found.

It should be said in this connection that the way in which addresses are designated by the signals of an address portion of a word is unique, and that virtually no equipment is required for locating desired words in accordance with such an address portion. The signals of an address portion of a word in a block correspond respectively to the words of the block. Thus a desired word may be addressed by the single signal positioned in a corresponding signal location (cell) of an address portion of a word. Extending this further it is clear that a plurality of desired words may be addressed by a corresponding plurality of signals positioned in the corresponding cells of an address portion. This latter feature makes possible certain very unusual and useful instructions. For example in response to a so-called "Put in L" instruction in a word of the L block, a number in an arithmetic register X is copied into any number of words in the L block, as arbitrarily designated by signals positioned in corresponding cells of the address portion of the word containing the Put instruction. Instructions of this type have been found to be exceedingly useful and are not available in any prior art computer.

In addition to the use of the described normal no address mode of operation, other features have been incorporated into the computer of the present invention to increase its effective computational speed and reduce equipment requirements. To eliminate any waste of time in reading a new block from the main memory, a system is used in which new blocks are read out of the main memory in advance of need, each block being stored in a standby condition in the intermediate channel as a B block which is interplexed digit by digit with the L block being computed upon. When computation upon the L block is completed, the L and B blocks are interchanged so that the standby B block enters computation without any delay as a new L block.

It should be understood that the reading of a new standby B block in advance of need from the main memory is automatically accomplished by the computer without any cessation of the computations being performed upon the words of the L block and without requiring the use of any special block copy instructions in the L block. Moreover almost no equipment is required to identify and select such standby blocks from the main memory. Blocks in the main memory are arranged in groups called precincts. The words in a block correspond respectively to the blocks in a precinct. Each block in the main memory carries the address of its successor block by having a single binary signal $t_b$ positioned in the corresponding word of the block. Thus for example if block 3 is to be automatically followed by block 12, then block 3 will have signal $t_b$ positioned in word 12. When block 3 is being computed upon as an L block, the computer will automatically respond to signal $t_b$ in Word 12 (W12) and will cause Block 12 (B/12) to be read out of the main memory as a B block as soon as it appears beneath the main memory transducer. The unique manner in which is accomplished the identification and reading of blocks from the main memory in response to the $t_b$ signals will be described in detail hereinbelow.

It should be noted that in the specific embodiment of the invention described hereinbelow each $t_b$ signal utilized to control the reading of a successor block is retained for a while thereafter and later controls the return or writing of the successor block into its original position in the main memory. The normal order of succession of blocks may be changed through use of a Branch instruction which allows a block to be followed by an alternate successor block rather than its normal successor block.

It is therefore an object of the present invention to provide an electronic digital computer requiring virtually no equipment for the performance of addressing operations.

It is another object of the invention to provide a general purpose computer functioning in a basic no-address mode of operation.

It is still another object of the invention to provide a general purpose computer wherein each word comprises an instruction and a number portion normally designating an operand, the computer responding to each instruction by operating upon the operand in the same word in accordance with the instruction.

It is yet another object of the invention to provide an electronic digital computer wherein the signals of an address portion of a word correspond respectively to words in a block, the computer being responsive to each signal in the address portion for operating upon the corresponding word.

It is a further object of the present invention to provide an electronic digital computer having a serialized main memory exactly and absolutely synchronized with its intermediate memory.

It is still another object of the present invention to provide a magnetic drum electronic digital computer having a serialized main memory comprising two helical channels established over the periphery of the drum by transducers coupled to the drum and moving in synchronism therewith.

It is a further object of the present invention to provide an electronic digital computer wherein, while a block is being computed upon, a successor block is automatically read from a serialized main memory into the intermediate memory to serve in a standby capacity.

It is yet another object of the present invention to provide an electronic digital computer wherein words are grouped in blocks and blocks are grouped in precincts, the words in a block corresponding respectively to the blocks in a precinct, each block having a successor block and having a signal $t_b$ positioned in the corresponding one of its words to designate the successor block.

It is still another object of the present invention to provide a computer wherein a standby B block is interplexed digit by digit in the intermediate channel with an L block being computed upon, whereby the two blocks may be exchanged without delay when computation on the L block is completed.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figs. *5a* through *5h* are schematic circuit diagrams of a plurality of switches which are utilized in the computer of the present invention to initiate and control the various operations of the computer.

Figure 1:
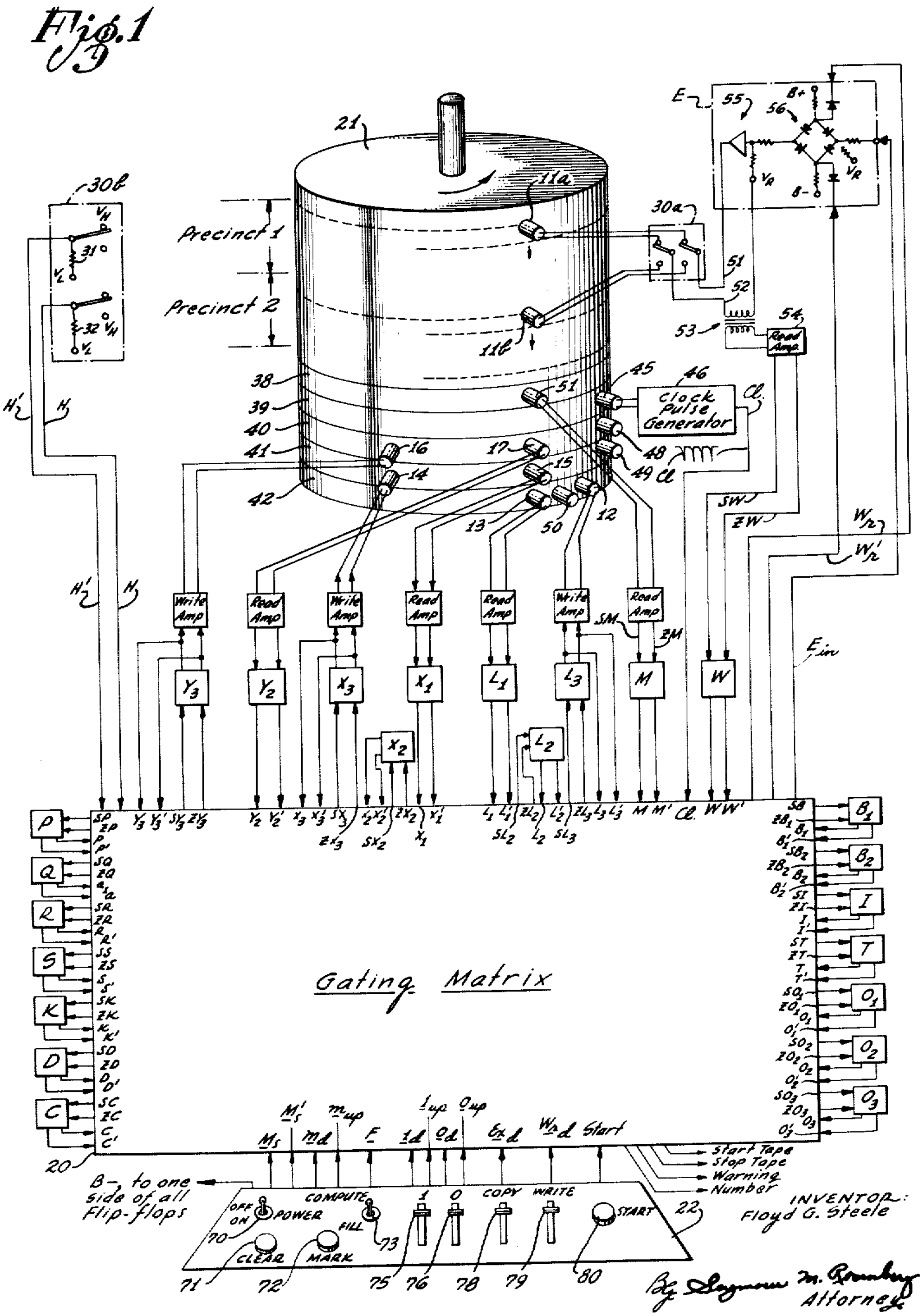
Fig. 1 is a partly block, partly circuit diagram of a preferred embodiment of the electronic digital computer of the present invention.

Referring now to the drawings, there is shown in Fig. 1 a complete, partly block, partly circuit diagram of a preferred embodiment of a magnetic drum, general purpose computer according to the present invention. As shown in Fig. 1, the computer comprises the following basic components: A rotatable magnetic drum 21 with associated magnetic transducers and read-write circuitry for reading and writing signals on the surface of the drum; a first group of flip-flops designated $L_1$, $L_2$, $L_3$, $X_1$, $X_2$, $X_3$, $Y_2$, $Y_3$, W and M associated with the read and write circuitry; a second group of flip-flops designated D, K, S, R, Q, and P which constitute an instruction register; a third group of flip-flops designated C, $B_1$, $B_2$, $O_1$, $O_2$, $O_3$, I and T, whose functions will be described; a gating matrix 20 which receives output signals from the flip-flops and applied resultant input signals to the flip-flops; and a control panel 22 including a plurality of control switches which are utilized for generating electrical signals (designated switch signals) for application to gating matrix 20 to initiate and control the various operations of the computer.

The periphery of drum 21 is provided with two separate counter-wound helical tracks, designated precincts 1 and 2 in Fig. 1, which, together with a read flip-flop W, and a write amplifier E constitute the main computer memory, hereinafter referred to as channel W. These tracks are traversed by two transducers 11*a* and 11*b*, respectively, which as indicated in Fig. 1 are moved together up and down in axially reciprocating motions synchronized with the rotation of drum 21. When the transducers are moving downward (as shown in the drawing), the helical track which constitutes precinct 1 is traversed by transducer 11*a*, while when they are moving upwards, the helical track which constitutes precinct 2 is traversed by transducer 11*b*. Each transducer is rendered operative (for reading or writing) only when it is traversing its corresponding precinct, this being accomplished by means of a toggle switch 30*a* which is actuated so as to connect transducer 11*a* to associated read-write circuitry when the transducers move downwards and to connect transducer 11*b* to this read-write circuitry when the transducers are moving upwards.

Another toggle switch 30*b* is actuated so as to generate a signal H having a high or low level in accordance with the precinct being traversed by the transducers. A signal H' complementary to signal H is also generated, both signals being applied along corresponding conductors (designated conductor H and conductor H', respectively), to matrix 20 to thereby serve to identify the precinct being traversed. In the operation of toggle switch 30*b*, a source of relatively high potential $V_H$ (not shown) is connected either to conductors H or H' in accordance with the switch position, both conductors being otherwise held at relatively low voltage levels by voltage applied thereto through associated resistors 31 and 32 from a source (not shown) of relatively low potential $V_L$.

Figure 2:
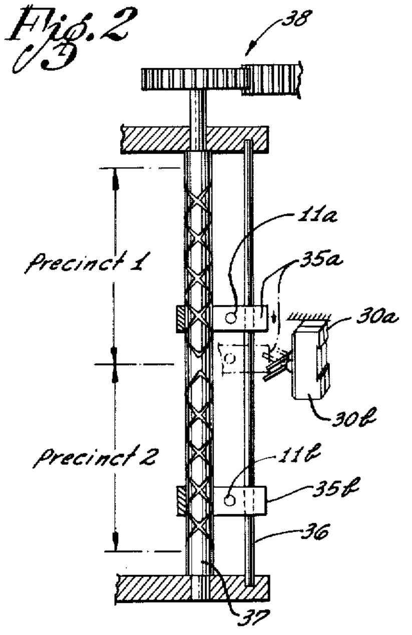
Fig. 2 is a plan view partly in section of the transducer moving mechanism which is utilized in the preferred embodiment of the computer of the present invention.

Referring now to Fig. 2 there is shown a developed view of one form of transducer moving mechanism which imparts the desired reciprocating motion to transducers 11*a* and 11*b* and actuates switches 30*a* and 30*b* in synchronism with rotation of drum 21. The mechanism includes two transducer mounts 35*a* and 35*b* for mounting transducers 11*a* and 11*b* respectively, the mounts being longitudinally slideable on a guide rod 36 and being longitudinally driveable in response to rotation of a level wind shaft 37 to whose grooves they are pinioned. The level wind shaft is in turn driven in synchronism with drum 21 through a suitable gear reduction unit generally designated 38. Toggle switches 30*a* and 30*b* are tandemly mounted on guide-rod 36 so that they are both thrown together to upper and lower positions respectively when the mounts 35*a* and 35*b* reach their corresponding upper and lower limit positions. In this manner the positions of the switches is made to correspond with the precincts being traversed.

Although this type of simple recognition by means of switches of the precinct being traversed is preferable, from the point of view of economy of equipment, it will be recognized numerous other forms of recognition means may be utilized. In addition, since the switches take a variable and relatively long time to change over, it is desirable, in order not to lose information, not to utilize those portions of precincts 1 and 2 whose traversals correspond to the time of occurrence of the switching operations. In the operation of the computer, the switching operations are so synchronized with respect to drum 21 that they occur near the ends of precincts 1 and 2, and, in particular, in the middle of those portions of the precincts as constitute blocks 33, as explained below. Information, therefore, is ordinarily neither read from nor written into either of the blocks 33 of channel W, this it has been found providing adequate protection against loss of information.

Considering briefly the read-write circuitry to which transducer 11*a* or 11*b* is selectively coupled via switch 30*a*, it is seen referring to Fig. 1 that the winding of the transducer selected by switch 30*a* is connected by a pair of conductors 51 and 52 to the output of a gated write amplifier E and is also coupled by a transformer generally designated 53 to the input of a read amplifier 54. Read amplifier 54 is responsive to variations in current through the transducer winding for producing corresponding output signals SW and ZW which are applied to read flip-flop W to set or zero the flip-flop in accordance with the 1 or 0 values of signals passing beneath the read transducer.

Gated write amplifier E comprises a low impedance output amplifier generally designated 55 to which the transducer winding is connected and a conventional diode bridge gating circuit generally designated 56 which receives complementary gating signals W*r* and W*r'* and an input signal $E_{in}$, applied thereto by matrix 20. Normally, when signal $E_{in}$ is not to be recorded in channel W, the gating signals W*r* and W*r'* have low and high voltage levels respectively and in response thereto diode bridge 56 acts as an open circuit blocking passage of signal $E_{in}$ to output amplifier 55. Amplifier 55 then functions merely as a passive low impedance path for the completion of current flow through the transducer winding. However when signal $E_{in}$ is to be recorded or written into channel W, the gating signals W*r* and W*r'* are maintained at their high and low levels respectively and in response thereto diode bridge 56 acts as a low impedance connection for applying signal $E_{in}$ to amplifier 55 which amplifies the signal to produce corresponding current variations in the transducer winding, thereby writing or recording signal $E_{in}$ in channel W.

Signals received by read amplifier 54 during the period in which writing is being performed are of too great an amplitude to be properly utilized by the amplifier and therefore any signals received by flip-flop W during this period and shortly thereafter cannot be used for any purpose. In addition, signals received by flip-flop W may be incorrect during the transducer switching operation. At other times the states of flip-flop W continuously represent the values of signals passing in the W channel beneath the selected transducer 11*a* or 11*b*.

Referring again to Fig. 1, it is seen that in addition to channel W, drum 21 has five magnetizable tracks or bands designated 38, 39, 40, 41 and 42. In track 39, a timing signal waveform or so-called clock pulse waveform is permanently recorded, this waveform comprising in the present computer 2904 evenly spaced timing signals recorded about the periphery of the drum as successively adjacent regions or cells of the drum surface alternately magnetized in opposite directions of polarization. Upon rotation of drum 21, each passage of a timing signal beneath a read transducer 45, positioned adjacent track 39, causes the transducer to produce a corresponding electrical signal which is applied to a wave shaping circuit or clock pulse generator 46 which converts the signals to an output train of sharp electrical "clock" pulses C*l*. Each appearance of a clock pulse C*l* indicates the passage of one of the magnetized timing cells of track 39 beneath transducer 45.

Clock pulses C*l* are applied to matrix 20 and are utilized therein to synchronize almost all of the operations of the computer. Transitions in the electronic 1 or 0 states of the flip-flop circuits are made only upon the appearance of a clock pulse signal. Recording in magnetic form of bi-valued 1 or 0 signals upon all of the memory tracks (including the helical tracks of precincts 1 and 2) is synchronized with the clock pulses in such a manner that these tracks are effectively divided into discrete storage cells corresponding to the timing track cells.

For example, it is clear that each complete coil of the helical track of precinct 1 or 2 of the W channel will contain 2904 cells as demarked by clock pulses C*l*. As pointed out below the W channel is intended to contain 66 blocks of 33 words each, each word having 84 cells, or a total of 182,952 cells. It can be seen, therefore, that the W channel comprises an integral number of coils, namely 63 coils $$\left(\frac{182{,}952}{2904}=63\right)$$

so that precincts 1 and 2 will each comprise 31½ coils. Because of this integral relationship between the effective length of the W channel and the effective length of the drum periphery, blocks stored in the W channel continually occupy the same positions on the surface of the drum and therefore the described transducer switching operations remain properly synchronized with the appearance of blocks 33 of precincts 1 and 2.

Track 40 cooperates with a write transducer 16 and a read transducer 17 to form a first recirculating channel, hereinafter referred to as the Y channel. The path of information flow of the Y channel is as follows: Read transducer 17, read flip-flop $Y_2$, gating matrix 20, and write flip-flop $Y_3$. As shown in Fig. 1, flip-flops $Y_2$ and $Y_3$ are coupled to their associated read and write transducers 17 and 16 through corresponding conventional read and write amplifiers.

In a similar manner, track 41 cooperates with a write transducer 14 and a read transducer 15 to form a second recirculating write channel, hereinafter referred to as the X channel. The path of information flow in the X channel is as follows: Read transducer 15, read flip-flop $X_1$, gating matrix 20, intermediate flip-flop $X_2$, gating matrix 20, and write flip-flop $X_3$. Finally, a third recirculating channel, hereinafter referred to as the L–B channel is maintained over that segment of track 42 moving between a write transducer 12 and a read transducer 13. The flip-flops of the L–B channel are read flip-flop $L_1$, intermediate flip-flop $L_2$, and write flip-flop $L_3$.

As shown in Fig. 1, permanent magnet erase heads 48, 49 and 50 may be positioned adjacent tracks 40, 41 and 42 respectively, for erasing stored signals after they have passed read transducer 17, 15 and 13 respectively, so that signals are returned to the Y, X and L–B recirculating channels only through the corresponding write transducers 16, 14 and 12. It will be understood however that in many forms of magnetic recording the use of such erase heads is not required, the write transducers in their action overwriting any interfering signals.

In track 38 there is provided a special non-recirculating channel, hereinafter referred to as the M channel, wherein are permanently stored certain signals which, in an initial set-up operation called the "mark" operation, are copied into the X and L–B channels. The signals stored in track 38 are read by a read transducer 51 which is coupled through an associated read amplifier to a read flip-flop M, whose output signals are applied to gating matrix 20.

To clarify the nomenclature which will be utilized in connection with the flip-flops utilized in the computer, consider flip-flop M, as shown in Fig. 1. Flip-flop M includes a pair of input conductors SM (Set M) and ZM (Zero M) and a pair of output conductors designated M and M′, the designations of these input conductors corresponding to the designations of the signals applied along these conductors (as the SM and ZM signals and the M and M′ output signals). It will be understood that in response to selective application of an SM or ZM input signal the flip-flop will be accordingly "set" to its 1 representing electrical state or "zeroed" to its 0 representing electrical state. Simultaneous application of SM and ZM input signals will cause the flip-flop to "trigger" or reverse its state. The electrical state of the flip-flop (usually the current conduction of either one or the other of a pair of cross-coupled amplifiers within the flip-flop) is externally displayed by the voltage levels of its output signals, signal M having a high or low voltage level when flip-flop M is in its 1 or 0 states and signal M′ being complementary to signal M (so that signal M′ has low and high voltage levels respectively when flip-flop M is in its 1 and 0 states).

Corresponding nomenclature and operation will be understood to apply to each of the other flip-flops of the computer. For convenience in drawing virtually all of the flip-flop input and output signals and other signals are labeled at the points at which these signals emerge from or are applied to matrix 20 as shown in Fig. 1.

It will be understood that basically in the preferred embodiment of the computer shown in Fig. 1 virtually all operational processes are carried on by successive changes in the states of the computer flip-flops. At the end of each timing interval (as demarked by the appearance of a clock pulse *Cl*) each flip-flop is either "set" by application of a signal to its set (S) input conductor or "zeroed" by application of a signal to its "zero" (Z) input conductor, or is possibly triggered by simultaneous application of signals to both its input conductors, or receives no input signals thereby maintaining its former state. The read flip-flops M, W, $X_1$, $Y_2$, and $L_1$ are each set or zeroed in accordance with the binary 1 or 0 values of magnetic signals then traversing beneath their associated read transducers. The remaining flip-flops receive their set (S) or zero (Z) input signals from gating matrix 20, which selectively generates these signals in accordance with the flip-flop output signals and other signals (the switch signals for example) received by matrix 20 during the previous timing interval.

In the structural description of the computer of the present invention, the general functions of only the first group of flip-flops has been presented thus far. Consideration is now given to the general functions of the second and third groups of flip-flops.

As pointed out above, the second group of flip-flops, namely, flip-flops D, K, S, R, Q, and P constitute an instruction register. More particularly, these flip-flops normally operate as a serial shift register in which digit information contained in flip-flop $L_2$ of the L–B channel is shifted into flip-flop D and thence through the other flip-flops in the order designated, until the entire instruction is stored therein. As pointed out in more detail below, each instruction contains six digits, and, therefore, the instruction register contains six flip-flops.

The third group of flip-flops is composed of flip-flops C, $B_1$, $B_2$, $O_1$, $O_2$, $O_3$, I, and T. The general function of each of these flip-flops will now be considered briefly in the order given.

Flip-flop C is an operational control flip-flop and performs a number of functions during the various operations of the computer. For example, flip-flop C stores the successive carry digits during the mathematical operations of addition and subtraction. In addition, during the Test operation, described in detail below, flip-flop C temporarily stores the sign of the number formed in the X channel. The complete function of operational control flip-flop C, including the functions set forth above, are described in detail below in connection with the specific operations of the computer of this invention.

Flip-flops $B_1$ and $B_2$ are information transfer control flip-flops which operate to control the flow of information between the L–B channel and the W channel. As set forth in greater detail below, the flow of information follows a predetermined pattern, hereinafter referred to as a block program, the elements of the pattern being determined by the states of flip-flops $B_1$ and $B_2$.

Flip-flops $O_1$, $O_2$, and $O_3$ are input information flip-flops which operate to control the initial information inserted in the memory channels during the "mark" and "fill" operations of the computer. For example, during "mark," signals stored in the M channel are copied into the X and L–B channels under the control of these flip-flops. During "fill," the flip-flops control the initial information loaded into the W channel and L–B channel.

Flip-flops I and T are identification or timing flip-flops which operate to identify the cells of the L–B channel. Flip-flop T changes state for each successive timing interval, as defined by clock pulses *Cl*, and, therefore, identifies alternate cells of the channel. The sequence of states of flip-flop I is set forth in detail below.

The remaining basic components of the computer shown in Fig. 1 are gating matrix 20 and control panel 22. As set forth above, gating matrix 20 receives the output signals of the flip-flops and electrical signals from the control panel, and generates input signals to the flip-flops. More particularly, gating matrix 20 is composed of a plurality of combinations of "and" and "or" circuits, as determined by a plurality of logical equations, for generating, in synchronism with clock pulses *Cl*, a corresponding pluarlity of setting and zeroing signals for the flip-flops. The logical equations, and the manner in which the equations are mechanized by gating matrix 20, are set forth in detail below.

Control panel 22 includes a plurality of switches and buttons and means for generating electrical switch signals in response to the positions of the switches and buttons. More particularly, control panel 22 includes the following:

Power switch 70—for applying power to the computer.

Clear button 71—for clearing all prior information out of the computer.

Mark button 72—for inserting initial control signals into the computer.

Compute switch 73—for setting the computer into the compute phase and/or for filling initial conditions into the computer.

Fill buttons 75 and 76—for operation with compute switch 73 to fill "1" and "0" digits respectively, into the alternate cells of the L–B channel. Note, however, that for greater entry speed, buttons 75 and 76 may be replaced by punched tapes or similar entry means.

Copy switch 78—for operation with compute switch 73 to copy the information filled into each cell of the L–B channel into the immediately succeeding cell.

Write switch 79—for operation with compute switch 73 to write the copied information into the W channel; and Start button 80—for operation with compute switch 73 to initiate computation.

As shown in Fig. 1 control panel 22 generates a plurality of signals which are applied to gating matrix 20. The manner in which these signals are generated will be described in detail below.

WORD STRUCTURE

Figure 3:
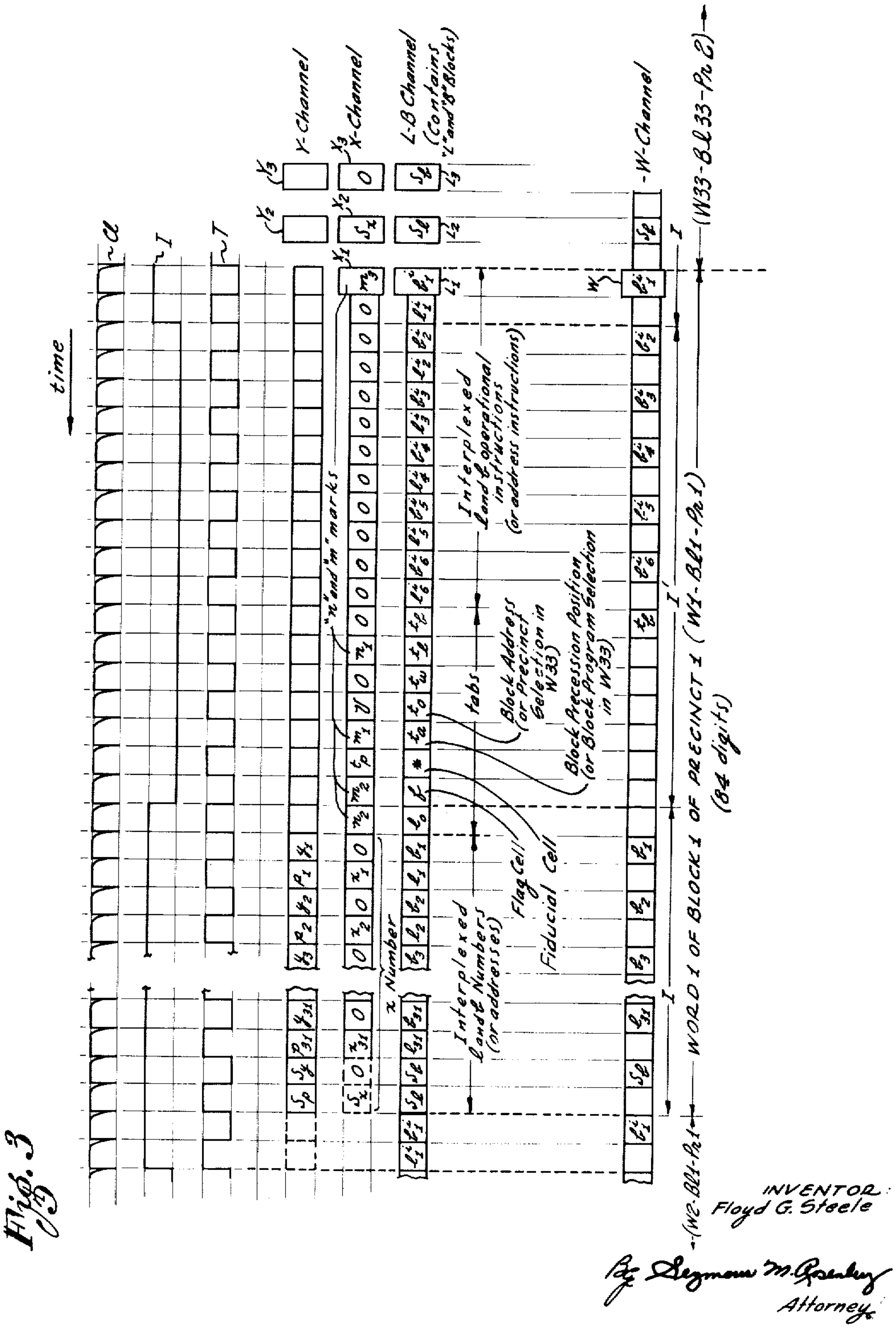
Fig. 3 is a word structure diagram which sets forth the manner in which signals are arranged in the memory channels of the preferred embodiment of the computer of the present invention.

Reference is now made to Fig. 3 which is a diagram, hereinafter termed a word structure diagram, representing on a common time scale the contents of the successive cells of the Y, X, L–B and W channels, together with waveforms of signals *Cl*, I, and T for one cycle of the Y channel. Since the serially arranged digits of each channel, as shown in Fig. 3 will appear in the same order in the corresponding read flip-flops of the channels, the diagram of Fig. 3 also represents the successive contents of the read flip-flops during one cycle of the Y channel, as marked by clock pulse *Cl*.

As indicated in Fig. 3, each cell in each channel is magnetized in one sense or the other to represent a binary (1 or 0) digit of information. A group of digits together constitute a "word" which is the primary unit of information in the computer and, in the embodiment shown in Fig. 3, comprises 42 digits.

Within a word the first 6 digits designate an "instruction," the next 4 digits are so-called "tabs" whose function will be described later, and the last 32 digits will normally be the successive digits and sign of a binary number (although as described hereinbelow these digits may, alternately, represent the "addresses" in the memory of other words). Negative numbers may be held in the complemented form, the sign digit of a positive number being a 1-valued signal and the sign digit of a negative number a 0-valued signal.

Words are grouped into sets of 33 words, called "blocks." In the specific computer described herein 66 blocks are held in the W channel, these being divided into 33 blocks per precinct. Words within a block are ordered—that is, they occur successively within the W channel, the successive words within a block being designated Word 1, Word 2 . . . Word 33, or in abbreviated form W1, W2 . . . W33. In a similar manner blocks are ordered within a precinct, the successive blocks within a precinct being designated Block 1 (B*l* 1), Block 2 (B*l* 2) . . . Block 33 (B*l* 33), respectively.

The general organization of the words, blocks and sectors within the memory is diagrammatically illustrated in Fig. 3. At the time illustrated in Fig. 3, the last digit of the last word (W33) of the last block (B*l*33) of the second precinct (P*r*2) has just traversed past the read transducer of the W channel and the first digit of the first word (W1) of Block 1 Precinct 1 (B*l*1 P*r*1) is now traversing beneath the transducer. In continuing operation all of the stored digits of Precinct 1 and then of Precinct 2 will pass serially beneath the read transducer of the W channel, one complete passage of all of these stored digits being designated a cycle of operation (or turn) of the W channel.

Reference is made first to the L–B channel shown in Fig. 3 for a more complete understanding of the word structure. It has been stated that a word in the present computer comprises 42 digits and that a block contains 33 words. Now the L–B channel holds two blocks of information, hereinafter referred to as the L block and the B block. Therefore, the number of digits in the L–B channel is equal to 2(blocks)×33(words)×42(digits) or 2772 digits.

Although the digits and blocks in the L–B channel could be arranged in a number of ways, in the arrangement shown in Fig. 3, the L and B blocks are interplexed digit by digit along track 42. Thus, as shown in Fig. 3, the digits of the instruction portion of the first word of the B block, designated $b_1^1$ through $b_6^1$, are located in alternate cells of the L–B channel, the $b_1^1$ digit traversing beneath the read transducer of the channel at the time the first digit of W1 is traversing beneath its read transducer. Similarly, the corresponding instruction digits of the first word of the L block, designated $l_1^1$ through $l_6^1$, are located in alternate cells, each $l$ digit immediately following the corresponding $b$ digit.

As set forth above, the four digits following the instruction digits of each word are tab digits, and, therefore, the next eight cells of the L–B channel are occupied by the interplexed tabs of the B and L words. For purposes of simplicity of explanation, all of the tabs are shown in the first set of interplexed B and L words, it being understood that the tabs may not necessarily all appear as shown in Fig. 3.

The successive tabs of the B word are designated $t_b$, $t_w$, $t_a$ and $f$, while the tabs of the L word are designated $t_1$, $t_0$, * and $l_0$. Of the latter group $l_0$ is not utilized and * (designated as the fiducial mark) appears only in Word 33 of the L–B channel and is the unique and distinctive signal which identifies W33 as the last word of the L–B channel.

It is important for several reasons that W33 of the L–B channel be uniquely identified—first, because transitions between block programs must take place only during the passage of W33 (as it happens, upon the appearance of the fiducial mark) and secondly, because many of the tabs have an entirely different significance in W33 than they have in any of the other words of the L–B block. For example, as indicated by the legend, in Fig. 3, the $t_a$ tab is normally a precessing signal which will be in W2 at the time illustrated and will be moved one word (to the left in Fig. 3) for each turn of the L–B channel, skipping W33, to thereby identify the corresponding blocks in the W channel for purposes of block addressing. However in W33 the corresponding tab, designated $t_a$* to distinguish it from the normal $t_a$ tab, is used to designate the block program being performed, as will be shown hereinbelow.

As another example, the presence of the $t_0$ tab in any $W_1$ of the L–B block normally positionally designates that $Bl_1$ is the next block to be read from or written into the W channel. In W33 however, the corresponding tab designated $t_0$* indicates the precinct (whether Pr1 or 2) of the selected block in the W channel. The functions of the tabs $t_w$, $t_1$ and $t_b$ in all words other than W33 relate in a manner to be described to the block addressing operations, while the corresponding tabs in W33 designated $t_w$*, $t_1$* and $t_b$* are used in connection with the identification of the precincts of selected blocks.

The remaining digits of the B and L words are designated $b_1$ through $b_{31}$ and $S_b$ and $l_1$ through $l_{31}$ and $S_l$. As noted above, these digits normally represent the number and sign of the B and L words, respectively, and are also interplexed in alternate cells of the L–B channel, as shown in Fig. 3.

It will be apparent that the L–B channel comprises not only the section of magnetic track lying between write transducer 12 and read transducer 13, but also flip-flops $L_1$, $L_2$ and $L_3$ and the read and write circuitry. Since the output signals of a flip-flop are indicative of the signals stored therein, the flip-flops $L_1$, $L_2$ and $L_3$ may be thought of as windows through which three consecutive signals of the 2772 recirculating digit signals in the L–B channel may be viewed or sensed. In particular the signal passing beneath read transducer 13 will simultaneously appear in flip-flop $L_1$, the signal appearing in flip-flop $L_3$ will be written simultaneously by write transducer 13, and the signal immediately preceding $b_1^1$ in $L_1$ will appear in flip-flop $L_2$, as shown in Fig. 3. Accordingly, of the 2772 digits of the L–B channel, one digit will always be stored in flip-flop $L_2$ and the remaining digits on track 42.

Referring next to the W channel, it has been stated that each word of this channel contains 84 cells. On the other hand, it has been stated that each word includes only 42 digits, one-half the number of cells of a word in the W channel. The reason for the difference is that the digits of a word in the W channel are located in alternate cells in order to correspond to the digits in the L–B channel, as shown in Fig. 3. Stated differently, since the L–B channel contains 2772 cells and one block of channel W contains 33(words)×84(cells), one complete circulation of the information contained in the L–B channel (hereinafter termed one "turn" of the channel) corresponds to the time required for one block of information in the W channel to pass beneath its read transducer.

As shown in Fig. 3 the digits of the words of the W block appear in read flip-flop W at times T′ (at times when signal T′ is at its high level). Since the digits of the B block of the L–B channel also appear in read flip-flop $L_1$ at these times, the words in the W channel are considered as belonging to B blocks and are so designated in the W channel. The reason for this arrangement is discussed below in connection with the section on information flow.

Only a single tab, $t_b$, is shown in Fig. 3 for the reason that, although other tabs are recorded in the W channel, only the $t_b$ tab (and the corresponding $t_b$* tab) is read back from the channel. Thus since only this $t_b$ tab (and the $t_b$* tab) has significance in the words of the W channel, it alone is shown in Fig. 3.

From a consideration of the W channel it is clear that there is space therein for an additional equal number of blocks which might be interplexed with those already present. Those skilled in the art will readily perceive how through relatively simple modifications of the present computer, facilities may be provided for addressing to and from such additional blocks.

The next channel to be considered is the X channel which, as shown in Fig. 3 contains 84 cells and has a cycle of operation corresponding to the passage of a single word in the W channel beneath its read transducer. As in the L–B channel, one of the digits stored in the X channel is contained in flip-flop $X_2$, while the remaining 83 digit signals appear in track 41. In order to permit ready comparison of the digit information in the various channels, the digits actually stored in flip-flops $X_2$ and $X_3$ are also shown in dotted outline at the end of the X channel in Fig. 3.

It has been stated previously that the X channel contains an X number, the digits and sign of which are designated $X_1$, $X_2$ . . . $X_{31}$ and $S_x$, respectively. As shown in Fig. 3 the digits of the X number occupy the same relative positions in the X channel as the corresponding digits of the L number in the then appearing word of the L–B channel, with zero-valued signals being stored in the immediately preceding cells. It will be shown below that this arrangement greatly simplifies the performance of serial operations upon the two numbers X and L.

All but the first of the cells of the X channel corresponding to the instruction digits of the L–B channel and the cell corresponding to tab $t_w$ of the L–B channel are filled with zero-valued signals, as shown in Fig. 3. On the other hand, certain cells are filled with one-valued signals and are designated $m_3$, $n_1$, $m_1$, $m_2$, and $n_2$ in the order of their appearance in the X channel. The cell preceding $m_2$ contains a signal $t_p$ and the cell preceding $m_1$ contains a signal $v$, both of which will be discussed below. The zero and one-valued signals shown in the X channel are normally recirculated without change in the operations of the computer.

The primary purpose of the marks stored in the X channel is to identify particular cells in the words of the L–B channel; that is, the appearance of the marks in flip-flops $X_1$, $X_2$ and $X_3$ distinguish the times of appearance of corresponding signals of the L word in flip-flops $L_1$, $L_2$ and $L_3$. The signals I and T (and I′ and T′) are used in conjunction with the marks for this purpose. The manner in which the times of appearance of particular signals of an L–B word are identified by signals I, T and the marks in the X channel is best illustrated by a few examples.

Suppose that it is desired to distinguish the time at which fiducial mark * may appear in flip-flop $L_1$. At that time, as shown in Fig. 3, signal I, which is at a low level during the time intervals corresponding to digits $b_2^1$ through $f$ of the L–B channel and a high value at all other times, will be low, and signal I′ which is the complement of I will be high. At the same time, signal T, which is at a high level of all L digits and a low level on all B digits, as shown in Fig. 3, will be high. The $m_1$ mark will be in flip-flop $X_2$ (so that signal $X_2$ will be high). Thus, the time at which the fiducial mark * may appear in $L_1$ will always be the unique condition indicated by signals I′ and T and $X_2$ all being at their high levels, this being expressed by the Boolean expression $I'TX_2$.

Similar expressions may be provided to illustrate the identification of the times of appearance of other signals. For example, listing some of these:

The time at which tab $t_0$ may appear in flip-flop $L_1$ is distinguished by the unique condition of signal I′ high, signal T high, and $n_1$ mark in $X_3$ and a 0-valued signal in $X_2$—hence by $I'TX_3X'_2$;

The time at which tab $t_0$ may appear in flip-flop $L_2$ is distinguished by the unique condition $I'T'X_1X'_3$;

The time at which tab $t_a$ may appear in flip-flop $L_1$ is also distinguished by $I'T'X_1X'_3$; and The times of appearance of digits $l_1$, $l_2$ through $l_{31}$ and $S_l$ in flip-flop $L_1$, are distinguished by $ITX'_2$.

In the same manner all required identifications of the appearance of particular signals or groupings of signals in the flip-flops of the L–B channel (or in the flip-flops of the X, Y and W channels) may be similarly accomplished.

The last channel shown in Fig. 3 is the Y channel which contains 86 cells, that is two more cells than the X channel. As a result, signals stored in the Y channel will be delayed or precessed with respect to corresponding signals appearing in the X and L–B channels. More particularly, each signal initially stored in the Y channel will thereafter precess two cells to the left, as viewed in Fig. 3, relative to the corresponding signals in the X and L–B channels. For example, signal $p_1$, which is shown in Fig. 3 as being aligned with signal X of the $X_1$ channel and signal $l_1$ of the first L word of the L–B channel, will be aligned with signal $X_2$ of the X channel and signal $l_2$ of the second L word of the L–B channel during the next turn of the X channel.

As shown in Fig. 3, the Y channel has provision for storing two numbers Y and P. The digits and sign of Y, namely $y_1$ through $y_{31}$ and $s_y$, are shown in Fig. 3 as being aligned with the B word of the L–B channel, while the digits $p_1$ through $p_{31}$ and sign $S_p$ of P are aligned with the corresponding digits of the L word of the L–B channel.

The described precession of digits in the Y channel with respect to digits in the L–B channel is utilized in the word addressing operations of the computer, as explained fully below. Those skilled in the art will also perceive how readily applicable such precession may be in the performance of such operations as multiplication where successive digits of a multiplier number may be stored in the Y channel so as to serially appear at predetermined times for operation upon a multiplicand number held in the Y channel.

BASIC PROCESSES OF THE COMPUTER

The general purpose computer of the present invention simultaneously performs two basic processes, namely, a computation process in which computations are performed upon the L words in the L–B channel, and an information flow process in which blocks are transferred between the W channel and the L–B channel. Generally speaking, each of these processes, and particularly the sequencing thereof, is carried on independently of the other. It should be apparent, however, that there is a definite relationship between the processes, and this relationship will become clear from the detailed description of the computer. For the purpose of clarity of the present description, each of the basic processes will now be considered separately.

(*a*) *Computation process*

In the computing process of the computer, computations are normally performed upon the numbers of the L words in the L–B channel and the number in the X channel. More particularly, the words in the L block are treated serially, so that first the instruction and number of Word 1 (W1) of the L block are operated upon, then the instruction and number of Word 2 (W2) of the L block and so on. Ordinarily an instruction in a word will designate a mathematical operation to be performed upon the immediately succeeding number of the same word. For example tht appearance of an addition instruction, 001000, in the first six cells of L word causes the succeeding number of the same L word to be added to the X number in the X channel. The addition operation is completed during the passage of the L word through the $L_1$, $L_2$ and $L_3$ flip-flops so that when the L word has completed its passage, the computer will be ready to accept the instruction contained in the next L word and operate in accordance therewith upon the number contained in this word.

Such operations which are performed within the passage of a single word are called one-pass operations. However even if an instruction in a word orders an operation which cannot be performed within the passage of a single word (a so-called multi-pass operation), the described serial mode of operation may still be preserved—that is the next instruction accepted will be the instruction in the next word. When an L word instruction ordering such a multi-pass operation occurs, a signal, designated a flag tab, is stored in the fourth or *f* tab position of the corresponding interplexed B word, as shown in Fig. 3, to thereafter identify the word in which this initiating instruction occurred. After the performance of the multi-pass operation, which may require one or several turns of the L–B channel, serial operation is continued by recognizing (and removing) the flag tab and then accepting the instruction in the next word following the flag tab. The manner in which the computer recognizes and removes the *f* tab is explained in detail below.

It is seen that in the described purely serial mode of operation upon the successive words of the L–B block, addressing operations will not ordinarily be required, the sequence in which mathematical operations are performed being determined by the sequence in which words (and their corresponding instructions) are stored in the memory. This might be described as being essentially no-address operation upon the words of the L block.

However it will be understood by those skilled in the art, that it is sometimes desirable to disrupt such purely serial operation, as for example in response to a so-called jump instruction, as explained more fully below, to skip over one or a group of words to a remote word. When such an L word jump instruction occurs, it signifies that the digits in the number part of the same word do not designate a quantity but instead designate the address or position in the L–B channel of the desired remote word. More particularly, the address or position of the remote word relative to the instruction word is designated by the position of a single signal stored within one of the 32 cells of the number part of the word.

The particular addressing method set forth above, in which each address is designated by the position of a single signal in one of the 32 cells of the number portion of a word, has an additional advantage in that a plurality of addresses (up to 32 arbitrarily selected addresses) can be designated in the number portion of a single word by appropriately positioning therein a corresponding plurality of signals. This feature of the present computer is utilized in connection with so-called Put instructions, that is Put in L (P*l*) and Put in B (P*b*).

In response to the occurrence of a P*l* instruction in a word of the L block, the X number in the X channel is copied into the number portion of certain words in the L block, as arbitrarily designated by corresponding signals stored in corresponding cells of the number portion of the word containing the P*l* instruction. A P*b* (Put in B) instruction is also available. The use of these unique instructions greatly facilitates the programming of complex mathematical problems.

The manner in which a signal stored in an appropriate cell of the number portion of a word carrying a put or jump instruction can act to identify a corresponding remote word will be described in detail at a later point in the present specification. It may be stated briefly however that what is done is to copy such a signal, as it appears in flip-flop $L_2$ of the L–B channel, into a simultaneously appearing cell of the Y channel, that is to transfer the signal from flip-flop $L_2$ to flip-flop $Y_3$. Since the Y channel is two cells longer than a word of the L–B channel, as stated before, a signal stored in the Y channel will precess 2 cells (counterclockwise, as shown in Fig. 3) for each passage of a word in the L–B channel. Eventually as a result of such precession, the stored signal will emerge in the Y channel (appearing in flip-flop $Y_3$ of the Y channel) at the same time that the first digit of a word emerges in the L–B channel. This coincidental appearance of the stored signal and the digit at the front of an emerging word is recognized, and the emerging word is thereby identified as the desired remote word.

As an example, if a jump instruction in a word is intended to cause a jump to the third word therefrom (so that the instruction of the third word will be accepted) then a signal will be stored in the third last cell (the cell which normally contains the $l_{30}$ digit) of the number portion of the word in which the jump instruction appears. Similarly a jump from a word containing a jump instruction to the fifteenth word therefrom, would be indicated by a signal stored in the fifteenth last cell (the cell which normally contains the $l_{18}$ digit) of the number portion of the jump instruction containing word. In the general case a jump or put from any word $W_1$ to a remote $W_{1+k}$ (where $k$ may be positive or negative), is designated by a signal stored in the number portion of $W_1$, in the $l_{33-k}$ position for positive $k$ and in the $l_{-k}$ position for negative $k$. In this connection, it should be noted that the $l_{33}$ position is the $S_1$ position shown in Fig. 3.

In summary, in a conventional single address computer, each word contains an address portion which in each instance designates where the next numbtr to be operated upon is to be found. It is seen, that in contrast thereto, in the computer of the present invention, each word contains a number portion which alternatively designates either a number which is to be immediately operated upon in accordance with an accompanying instruction in the word, or the address of the next number which is to be utilized. The described mode of operation of the computer of the present invention insofar as word addressing is concerned is therefore called half-address operation to distinguish it both from conventional single-address and from pure no-address operation.

(b) *Information flow process*

As stated before, computation operations are normally performed upon (and addressing operations made between) the words of the L block. In ordinary operation, L blocks originate as blocks in the W channel which are brought up via read flip-flop W into the L–B channel, are computed upon, and are then returned to their positions in the W channel. A block brought up from the W channel to the L–B channel serves first, usually in a standby capacity, as a B block; then as an L block which is operated upon, then again as a B block, this time waiting to be written back into its position in the main memory; and finally is written back into the main memory when its position in the main memory passes beneath one of transducers 11*a* and 11*b*.

The normal procedure is as follows: When all computation upon an L block has been completed, the information in the L and B blocks are exchanged, a relatively simple operation to perform since the two blocks are interplexed digit by digit. While computations are being performed upon the new L block (the former B block), the new B block (which is, of course, the former L block) is written back into its original position in the main memory. Thereafter while operation continues upon the L block, its successor block is read from the main channel to serve as the next B block.

The described manipulations of the blocks of the computer may be thought of as being divided into five block programs of the computer. These five block programs are designated, in the normal order of their occurrence as:

(1) Write—the B block is written into its position in the W channel.

(2) Read—Immediately follows Write, the next B block being read from the W channel.

(3) Preexchange—The period between Read and the acceptance of an exchange (X) instruction in W33 of the L block which causes the transition from Preexchange to:

(4) Exchange—The information in the L and B blocks are interchanged.

(5) Postexchange—The period between Exchange and Write, this is the period between Exchange and the appearance in the W channel of the position to which the B block is to be returned.

It should be understood, however, that various deviations may occur in the normal order of occurrence of the block programs. Each of these durations will be described in detail below.

It has been previously stated that flip-flops $B_1$ and $B_2$ have supervisory control over the performance of the block programs. Actually, the transition from one block program to another is controlled not only by these flip-flops but by the value of the signal stored in the third or $t_a$ tab in W33 of the B word of the L–B channel, as shown in Fig. 3, this signal being designated $t_a{}^*$ since it occurs in the fiducial word. The following table, Table 1, summarizes the relationship between each block program and the succeeding program, as determined by the value of $t_a{}^*$.

TABLE 1

| | From— | | | Value of $t_a{}^*$ | To— | | |
|---|---|---|---|---|---|---|---|
| | Block Program | States of— | | | Block Program | States of— | |
| | | $B_1$ | $B_2$ | | | $B_1$ | $B_2$ |
| (1) | Write | 1 | 0 | 0 | Read | 1 | 1 |
| (2) | Read | 1 | 1 | 0 | Read | 1 | 1 |
| (3) | Read | 1 | 1 | 1 | Preexchange | 0 | 0 |
| (4) | Preexchange | 0 | 0 | (1) | Exchange | 0 | 1 |
| (5) | Exchange | 0 | 1 | 0 | Postexchange | 0 | 0 |
| (6) | Postexchange | 0 | 0 | 0 | Write | 1 | 0 |
| (7) | Exchange | 0 | 1 | 1 | Preexchange | 0 | 0 |

Lines (1) through (6) represent the normal sequence of the block programs, as set forth above. In this connection, it should be noted that in line (2) the read program continues until signal $t_a{}^*$ has a value of 1, that is blocks from the W channel will be written into the B blocks of the L–B channel, one over the other, until the correct block is read. At this point the block program will transfer from Read to Preexchange, as indicated by line (3).

The significance of the parentheses in the $t_a{}^*$ column of line (4) will now be considered. As indicated in line (4), Preexchange normally transfers to Exchange if signal $t_a{}^*$ has a value of 1. There is one further condition for this transition, namely, that an Exchange instruction in W33 be accepted. As pointed out in detail below, there are several circumstances under which this condition is not met. Under these circumstances, the computer of the present invention will remain in the Preexchange program.

Line (7) of Table 1 represents a variation from the normal block program sequence when the computer is in the Exchange program. As indicated, if signal $t_a{}^*$ has a value of 1, instead of 0 as in line (5), the transition will be from Exchange back to Preexchange. This condition occurs when Exchange instructions are accepted from both W32 and W33. The significance of the variation will be set forth below in connection with the list of instructions.

The manner in which the computer identifies the position in the W channel from which a block is to be read or into which it is to be written, will now be considered. In each instance the block number of the position in the W channel from which a block is to be read (or written into) is positionally designated by the presence of a single signal stored in the second $t_0$ tab cell of a correspondingly numbered word of the L block, as shown in Fig. 3. The precinct number (whether Pr1 or 2) of the desired block position is indicated by the value (whether 0 or 1, respectively), of a signal, stored in the second or $t_0$* tab cell of the last or fiducial word, W33 of the L block.

As an example of this system of addressing to block positions in the W channel, assume that a B block is to be written into Block 2, Precinct 1 (Bl2–Pr1) of the W channel. To designate this position, the $t_0$ tab will be stored in the correspondingly numbered word, W2, of the L block, and the $t_0$* tab in W33 of the L block will have the value 0.

The manner in which these tabs are actually used to identify desired block positions will be described in detail at a later point in this specification. However it can be briefly explained at this point that what is done is to provide in a unique manner, information as to the block number and precinct of the blocks passing beneath transducers 11*a* and 11*b*, so that reading or writing can be initiated when this information agrees with the address information supplied by the $t_0$ and $t_0$* tabs.

It will be recalled that information as to the precinct passing beneath the W channel transducer is supplied by switch 30*b*. In particular, switch 30*b* produces signal H (and complementary signal H′) having a low level when Precinct 1 is being traversed and a high level when Precinct 2 is being traversed.

Information as to the numbers of the blocks passing beneath the active transducer of the W channel is provided by a precessing signal which appears in the third or $t_a$ tab cell of only one word of the B block and is moved left from word to word of the L–B block as viewed in Fig. 3. The $t_a$ tab is moved one word for each turn of the L–B channel, so that in operation the $t_a$ tab moves one word of the L–B block for each passage of a block in the W channel. In the present computer the $t_a$ tab is initially inserted so that it appears in W3 of the L–B channel when *Bl*2 of the W channel begins its passage. Thereafter the position of the $t_a$ tab remains as an absolute reference to the blocks passing beneath the active transducer in the W channel, indicating the number of the block which will next appear in this channel.

The manner in which tab $t_a$ is in operation precessed one word for each complete turn of the L–B channel may readily be explained with the aid of Fig. 3. During each passage of a word (other than W33) in the L–B channel signal $t_p$ in the X channel and the signal representing tab $t_a$ in the L–B channel are interchanged. Since tab $t_a$ will be actually present in only one of the 33 words of the L–B channel, the described tab interchange operation will have the effect when that word appears of removing the $t_a$ tab from the word and placing the tab in the X channel. During the passage of the next word of the L–B channel the repetition of the tab interchange will have the effect of redepositing the $t_a$ tab from the X channel into this next word of the L–B channel. In this manner, the $t_a$ tab is moved back one word of the L–B channel for each complete turn of the L–B channel.

It will be recalled that in W33 of the L–B channel, the $t_a$* tab is utilized in connection with block program transitions and its value controls the transition in cooperation with the states of flip-flops $B_1$ and $B_2$. For this reason, the $t_p$–$t_a$ interchange is suppressed during passage of W33 of the thirty-first turn of the L–B channel, and, therefore, tab $t_a$ which was inserted in $t_p$ during that turn will remain in the X channel. During passage of the next word of the L–B channel (W1 of the thirty-second turn) $t_p$–$t_a$ interchange occurs and tab $t_a$ is inserted in W1. Accordingly, on the next or thirty-third turn of the L–B channel, the tab $t_a$ appears in W1 and is transferred to W2. In this way the tab stays in synchronism with the blocks of the W channel for utilization in the block addressing operations and yet avoids interference with the $t_a$* tab.

Interchange of the signals representing $t_p$ and $t_a$ is accomplished immediately after these signals appear in flip-flops $X_1$ and $L_2$, respectively. In the next timing interval, the signal in flip-flop $X_1$ is placed in flip-flop $L_3$ and the signal in flip-flop $L_2$ is placed in flip-flop $X_2$ thus accomplishing the desired $t_p$–$t_a$ interchange. Suppression of the $t_p$–$t_a$ interchange in W33 is accomplished through recognition of the presence of the fiducial mark * in flip-flop $L_1$.

As an example of tab recognition assume that the $t_a$ tab is located in W2 of the L–B channel as Bl1–Pr1 begins its passage in the W channel, as shown in Fig. 3. If, as was assumed before, the B block is to be written back into Bl2–Pr1, then the $t_0$ tab will also appear in W2 of the L–B channel, as was hereinbefore explained. Therefore as W2 of the L–B channel appears, the coincidental appearance of the $t_a$ and $t_0$ tabs in this word may be recognized and will indicate that the next block (Bl2–Pr1) to appear, in the W channel is that one (assuming its precinct is proper) into which the B block is to be written. The computer makes note of this coincidence of the $t_a$ and $t_0$ tabs (as will be seen), by inserting a signal in the *v* space of the X channel, as shown in Fig. 3.

The computer then waits, insofar as the block programs are concerned, until the last word, W33, of the L–B block appears so that the desired precinct (as indicated by the $t_0$* tab in W33) may be verified against the true precinct of the next appearing block *Bl*2 (as indicated by signal H). If precinct verification is obtained (and the *v* signal appears in the X channel) then it is known that the immediately succeeding W channel block is the proper one, the write program is entered in accordance with Table 1 and writing of the B block into this block is immediately initiated. If precinct verification were not obtained (as would be the case if the B block were to be returned to Pr2 rather than Pr1) Postexchange program continues and the *v* signal is erased on the next turn of the L–B channel. The *v* signal would not be reinserted until $t_a$ and $t_0$ tab coincidence was again obtained in W2 of the L–B channel, this time during passage of Bl1–Pr2 of the W channel. All of the operations will then be repeated, concluding with the writing away of the B block into the proper block, *Bl*2, of Pr2 rather than Pr1.

The addressing and recognition of blocks in the W channel for the purpose of reading such blocks into the L–B channel as B blocks is conducted in substantially the same manner. In the read program, however, the digit in *v* of the X channel has the opposite significance to that in the write program. The details of the read program are explained below.

It should be noted in connection with the block programs (Write, Read, Preexchange, Exchange, Postexchange) that for the most part the successive performance of these programs is a semi-autonomous function of the computer carried on automatically, and independent of the ordinary computational operations performed upon the words of the L block. Thus for example computation on the L block may continue uninterruptedly throughout Write, Read and other block programs, saving considerable amounts of time.

INSTRUCTION LIST

To further illustrate other distinctive features and capabilities of the computer of the present invention, and to clarify and further illustrate its operation, there is provided below a list of instructions which the specific computer to be described will respond to. Each instruction is designated first by an alphabetical abbreviation, then in parentheses by a verbal name if one exists—followed by the six binary digits, most significant digit first, which designate the instruction and then by a statement as to the operations performed by the computer in response to the instruction.

$A_1$—(Add)—001000—This L number is added to the X number and the sum is written into the X channel as the new X number.

$S_1$—(Subtract)—001001—The L number is subtracted from the X number and the difference is written into the X channel as the new X number.

$T_0$—(Test)—001101—Same as $A_1$. The sign of the sum is read and if the sum is negative the instruction in the next word is not read, computation beginning again with the word after that.

$T_1$—(Test$_1$)—001111—Same as $S_1$. The sign of the difference is read and if the difference is negative the instruction in the next word is not accepted.

Idle—010000—This instruction stops all computation and simply allows recirculation without change of all memory channels.

Pass—000000—If a word is not used its instruction digits are all left zero, this being designated as the Pass instruction. A word containing a Pass instruction will be ignored, computation beginning again at the next word.

$W_0$—(Wait)—110010—This instruction stops all computation until the block program Preexchange is entered. The $f$ flag is left in the word containing the Wait instruction and computation recommences at the word following the flag.

$U_0$—(Unconditional transfer or jump)—111000—This information transfers the point of computation to another word within the L block. As set forth above, if the word containing the $U_0$ instruction is $W_l$ and it is desired to transfer or jump to $W_{l+k}$, the non-zero digit in the $W_l$ number will be $l_{33-k}$ if $k$ is positive and $l-k$ if $k$ is negative.

$Pl_0$—(Put in L)—111110—This instruction puts the X number into one or more words of the L block. As set forth above, the non-zero digit or digits are determined by the rule outlined above in connection with $U_0$.

$Pb_0$—(Put in B)—111010—This instruction in an L word puts the X number into a word or words of the B block. $Pb_0$ differs from $Pl_0$ in the transfer to the B block rather than the L block, as determined by the digits in the instruction. $Pb_0$ is not accepted until the computer is in the Preexchange program.

$Tl_0$—(Take from L)—111101—This instruction moves the number of a designated L word into the X channel. The number following $Tl_0$ is determined in the same way as that following $Pl_0$.

$Tb_0$—(Take from B)—111011—This instruction moves the number of a designated B word into the X channel. The number following $Tb_0$ is determined in the same way as that following $Pb_0$. $Tb_0$ is not accepted until the computer is in the Preexchange program.

$\overline{X}$—(Exchange)—011011—This instruction causes the interchange of the L and B blocks, and is not accepted until the computer is in the Preexchange program. If the instruction appears in only W33 of the L block, the computer will enter its Exchange block program after this instruction has been accepted. The L and B blocks will then be interchanged, and thereafter the block program Postexchange will be initiated, as indicated in Table 1.

If however the X instruction is placed in W32 as well as W33, and (as a result of Test, for example) W32 is used, the Exchange block program will still be entered but will be followed by the block program Preexchange, as set forth above in connection with Table 1. This latter usage permits the L and B blocks to be computed upon consecutively as long as desired, until when (as a result of Test) W32 is skipped and only the $\overline{X}$ instruction in W33 is utilized. Then Exchange will be followed by the normal Postexchange and the normal block cycle will be resumed.

$Br_0$—(Branch)—111001—This instruction alters the normal block program sequence to permit a block from the W channel to be read in as the new B block in the L–B channel after the normal read program has been completed, the new B block being written over the previously read B block. The $Br_0$ instruction is placed in a word in the L block which immediately follows an L word containing a test instruction, and it not accepted until the computer is in the Preexchange program.

As an illustration assume that in response to a test instruction in word $W_{j-1}$ of the L block, the computer is required to read block $B_j$ if the test instruction is not satisfied and block $B_k$ if the test instruction is satisfied. Assume that the computer has followed the normal block program squence and that block $B_j$ has been read into the L–B channel in accordance with the normal $t_0$ tab in $W_j$ of the L block, as set forth above. Under these conditions the computer is in the Preexchange program so that the $Br_0$ instruction may be accepted.

$W_j$ of the L block, therefore, contains the $Br_0$ instruction and a non-zero digit in the number portion designating the address of the $W_k$ in accordance with the rules set forth above in connection with the $U_0$ instruction. If the test instruction is not satisfied, the $Br_0$ instruction is not accepted, in accordance with the rules set forth above for $T_0$ and $T_1$, and the $B_j$ block in the L–B channel is undisturbed.

If the test instruction is satisfied, the computer accepts the $Br_0$ instruction in word $W_j$ and performs the following operations. The $t_0$ tab in $W_j$ is erased and a one-valued signal is inserted in the $f$ tab of this word. A new $t_0$ tab is inserted in word $W_k$, in accordance with the block addressing technique, to thereby identify the $B_k$ block to be read. At the time block $B_k$ begins its passage in the W channel, the computer program is changed from Preexchange to the phase of Read shown in line (3) of Table 1, thereby permitting block $B_k$ to be read into the L–B channel as the new B block.

Upon the appearance of the $f$ tab during the Read program, the $Br_0$ instruction in the instruction register is removed and the $f$ tab is erased. Computation begins again in word $W_{j+1}$ in accordance with the instruction in that word, the normal block programming cycle combining in the manner previously described.

Start tape—This instruction orders the acceleration of an associated magnetic tape to full speed, so that the tape will have sufficient velocity for proper recording of read-out information supplied by the computer.

Stop tape—This instruction orders the deceleration and stoppage of the associated magnetic tape, and is used to conserve tape after read-out operations have been completed.

Read-out—This instruction in a word signifies that the number portion of the same word is to be read out into the magnetic tape.

CLEAR, MARK AND FILL

Before proceeding further with description of the computations performed by the computer, a brief explanation will be provided of the manner in which the computer of the present invention is placed in operation. It will be understood that in placing the computer in operation for a problem solution, first, any old information relating to former problems is removed or "cleared" from the recirculation channels of the computer; then, the required marks and the precessing $t_a$ tab are recorded in the X and L–B channels (this being designated the mark operation); and finally all of the required blocks of information are recorded in the W and L–B channels. These clear, mark, and fill operations may be performed by an operator through utilization of the control switches provided on control panel 22, as shown in Fig. 1.

The first step performed by an operator in placing the computer in operation is to throw main power switch 70, thereby supplying electrical power to the computer, and then to momentarily depress the clear button 71, thereby placing flip-flop Q in its 1 state and all other computer flip-flops in their 0 states. Write flip-flops $Y_3$, $X_3$ and $L_3$ then record 0-valued signals in all of the cells of the corresponding channels thus removing any unusable information contained therein.

Next, button 72 is momentarily depressed causing recording from the M channel of the fiducial mark * and tab $t_a$* in the L–B channel thereby defining W33, and then of marks $m_3$, $n_1$, $m_1$, $m_2$, $n_2$ and of signal $t_p$ in the X channel. The recording of these signals is synchronized with the head-switching operation, the recording commencing at a predetermined time after signal H changes from its high to low level. The normal $t_p$–$t_a$ interchange operation immediately begins and is thereby properly related to the passage of blocks in the W channel, as explained in detail below.

The computer may then be filled with desired information blocks. In filling the computer, the normal path for a block of information is that first it is filled into the L block; next, it is copied from the L block into the B block; and then, it is written from the B block into its appropriate position in the main memory W channel. The second last block to be filled into the computer is not immediately written into the W channel but is retained in the L–B channel as a B block. The last block filled in the computer is retained in the L–B channel as an L block. Computation is then started (with the computer in its Preexchange block program) upon the retained blocks held in the L–B channel. All of these operations may be controlled by an operator through utilization of the remaining switches provided on control panel 22.

In filling a block of information into the L block, after fill-compute toggle switch 73 has been thrown to its lower "fill" position, the successive 1- and 0-valued signals of a block may be entered into the L block by selectively depressing switches 75 and 76, respectively. Each signal entered by the switches is recorded in the first L or $l_0$ cell following the fiducial mark * in W33 and is shifted two cells to the left, as viewed in Fig. 1, during entry of each subsequent signal. In this manner, all of the cells of the L block are filled with an information block.

The next step to be performed in "fill" is to cause the information in the L block to be copied into the B block. For this purpose, copy switch 78 is depressed and, in response thereto, the signals recorded in the L block cells are copied into the corresponding cells of the B block. Following this, write switch 79 is depressed, forcing the computer into its Write program so that the copied B block is written into its proper position (as designated by a $t_0$ address tab carried within the block) in the W channel.

After Write has been completed the computer enters its Preexchange program, and is ready to have another block filled therein. Through repetition of the described operations, all of the required blocks of information are entered in the W channel. In entering the last two information blocks, write switch 79 is not utilized so that these blocks are retained in the L–B channel as L and B blocks. At this point, "fill" is completed and switch 73 is returned to its "compute" position.

It should be noted that all flip-flops but flip-flop Q of the instruction register flip-flops P, Q, R, S, K, D are zeroed (as was accomplished by the clear operation), the states of these flip-flops corresponds to receipt of an Idle instruction, and further instructions will not be accepted, computation thus being stopped. The depression of start button 80 causes flip-flop Q to be zeroed at the next appearance of the fiducial mark, thereby removing the Idle instruction from the instruction register flip-flops and allowing L word instructions to be accepted by the instruction register.

EXAMPLE OF BLOCK ADDRESSING (The Tab System)

When a block is filled into the computer it is normally filled into the L block so that it contains both its own address and the address of its successor block. The block's own address is filled therein so that the block can be initially filled into its proper position in the W channel. The address of the successor block is contained therein so that when the block is later computed upon (as an L block) it will be able to designate the next block to be read from the W channel.

In initially filling an information block into the L block, the block number of its own address is inserted therein as the position of the $t_0$ tab and the block number of the address of its successor block is inserted therein as the position of the $t_1$ tab. The precincts of its own and the successor blocks addresses are indicated in W33 of the L block as the values of the $t_0$* and $t_1$* tabs, respectively.

When such a block, is copied into the B block during the fill operation, the $t_0$ and $t_1$ (and $t_0$* and $t_1$*) tabs are copied into the $t_w$ and $t_b$ tabs (and $t_w$* and $t_b$* tabs), respectively. The B block is then written away into its place in the W channel in accordance with the address specified by the $t_0$ tab in the L block. Once the block is written into the W channel, only the $t_b$ tab (and the $t_b$* tab) retains significance (since reading of the other tabs will be suppressed in later operations). Therefore, it is clear that a block stored in the W channel effectively contains only the address of its successor block, this address being indicated by the position of the $t_b$ tab (and the value of $t_b$* tab).

The basic problem solved by the tab system is to manipulate these $t_b$ and $t_b$* tabs so that during computation they serve at the proper times as $t_0$ and $t_0$* tabs to control the reading of successor blocks and also to control the return of blocks to their own W channel positions. In the following discussion of these manipulations, the tabs in W33 ($t_0$*, $t_w$*, $t_1$* and $t_b$*) will not be separately referred to, for the manipulations to be described are commonly performed on both sets of tabs.

The last two blocks filled into the computer (those which will be retained as L and B blocks and with which computation will begin) are exceptional in that each carries the address of the other (rather than its own address) and also, as usual, the address of its successor block. After computation has begun, the repetition, during each cycle of the block programs, of the following two operations accomplishes all required manipulations of the tabs:

(1) During Exchange the signals in the $t_0$ and $t_w$ tabs are interchanged in each word of the L–B channel and also the signals in the $t_1$ and $t_b$ tabs are interchanged.

(2) During Write, the signal in the $t_1$ tab is copied into the $t_0$ tab in each word of the L–B channel.

The described manipulation of the tabs during fill and compute operations and also the sequence of operation in the block programs will be greatly clarified by consideration of an illustrative example. Assume for the purposes of this example, that it is desired that computation begin upon B/1 and that B/1 is to be succeeded by B/2, which is to be succeeded in turn by B/3, then by B/4, and so forth. To accomplish this, B/1 will be the last block filled into the computer (so that it serves as an initial L block) and B/2 will be the second last block filled therein (so that it will serve as the initial B block).

The following table, Table 2 indicates the placement of the tabs within the words of the L–B channel during successive fill operations and compute programs, beginning with the filling of B/2 into the L block of the L–B channel. In Table 2, the solid horizontal line demarks the boundary between the fill operations and the succeeding compute block programs and the dashed horizonal lines demark four successive full cycles of the block programs. The various fill operations and block programs are numbered as entries 1–23 in the order of their occurrence to facilitate discussion thereof. For purposes of clarification, the corresponding states of the block program control flip-flops $B_1$ and $B_2$ and also the values of the $t_a$* tab are shown in Table 2.

TABLE 2

| Entry | States of— | | | Fill Operations and Compute Block Programs | Words of L–B channel in which are positioned the Tabs | | | |
|---|---|---|---|---|---|---|---|---|
| | $B_1$ | $B_2$ | $t_a$* | | $t_0$ | $t_w$ | $t_1$ | $t_b$ |
| 1 | 0 | 0 | 1 | Fill Bl2 into L block | →1 | | →3 | |
| 2 | 0 | 0 | 1 | Copy | 1 | →1 | 3 | →3 |
| 3 | 0 | 0 | 1 | Fill Bl1 into L block | →2 | 1 | →2 | 3 |
| 4 | 0 | 0 | 1 | Preexchange | 2 | 1 | 2 | 3 |
| 5 | 0 | 1 | 0 | Exchange (Bl1 and Bl2) | 1← | →2 | 3← | →2 |
| 6 | 0 | 0 | 0 | Postexchange | 1 | 2 | 3 | 2 |
| 7 | 1 | 0 | 0 | Write (Bl1 into W channel) | 3← | 2 | —3 | 2 |
| 8 | 1 | 1 | 0→1 | Read (Bl3) | 3 | 2 | 3 | 4← |
| 9 | 0 | 0 | 1 | Preexchange | 3 | 2 | 3 | 4 |
| 10 | 0 | 1 | 0 | Exchange (Bl2 and Bl3) | 2← | →3 | 4← | →3 |
| 11 | 0 | 0 | 0 | Postexchange | 2 | 3 | 4 | 3 |
| 12 | 1 | 0 | 0 | Write (Bl2 to W channel) | 4← | 3 | —4 | 3 |
| 13 | 1 | 1 | 0→1 | Read (Bl4) | 4 | 3 | 4 | 5← |
| 14 | 0 | 0 | 1 | Preexchange | 4 | 3 | 4 | 5 |
| 15 | 0 | 1 | 0 | Exchange (Bl3 and Bl4) | 3← | →4 | 5← | →4 |
| 16 | 0 | 0 | 0 | Postexchange | 3 | 4 | 5 | 4 |
| 17 | 1 | 0 | 0 | Write (Bl3 into W channel) | 5← | 4 | —5 | 4 |
| 18 | 1 | 1 | 0→1 | Read (Bl5) | 5 | 4 | 5 | 6← |
| 19 | 0 | 0 | 1 | Preexchange | 5 | 4 | 5 | 6 |
| 20 | 0 | 1 | 0 | Exchange (Bl4 and Bl5) | 4← | →5 | 6← | →5 |
| 21 | 0 | 0 | 0 | Postexchange | 4 | 5 | 6 | 5 |
| 22 | 1 | 0 | 0 | Write (Bl4 into W channel) | 6← | 5 | —6 | 5 |
| 23 | 1 | 1 | 0→1 | Read (Bl6) | 6 | 5 | 6 | 7← |

(1) In entry 1 of Table 2, it is seen that when Bl2 is filled into the L block of the L–B channel, it carries the address of Bl1 as the $t_0$ tab (entered into W1) and the address of its successor block (Bl3) as the $t_1$ tab (entered into W3).

(2) In entry 2, Bl2 is copied into the B block of the L–B channel, thereby copying the $t_0$ and $t_1$ tabs (as indicated by the arrows) into the $t_w$ and $t_b$ tabs, respectively.

(3) In entry 3, it is seen that when Bl1 is filled into the L block of the L–B channel, it carries the address of Bl2 as the $t_0$ tab (entered into W2) and the address of its successor block (also Bl2) as the $t_1$ tab (entered into W2).

The fill operations are then completed and computation is initiated by pressing the button of the start switch. The computer then enters its normal Preexchange block program, designated as entry 4 in Table 2.

(4) The computer is in its Preexchange block program ($B_1=0$, $B_2=0$, $t_a^*=1$). Computation is performed upon the words of the L block (Bl1). When computation is completed, an $\overline{X}$ instruction appearing in W33 (and assumed to be only in W33) of the L block is accepted and immediately thereafter (at the appearance of the fiducial mark *) the computer enters its Exchange block program ($B_1=0$, $B_2=1$, $t_a^*=0$) by setting flip-flop $B_2$ and changing signal $t_a^*$ from a 1 to a 0 value.

(5) The computer is in its normal Exchange block program ($B_1=0$, $B_2=1$, $t_a^*=0$) which will last for one turn of the L–B channel. During this turn the L and B blocks (Bl1 and Bl2) are interchanged so that Bl2 becomes the new L block and Bl1 becomes the new B block. In each word, therefore, the $t_0$ and $t_w$ tabs are interchanged (as indicated by the arrows) and the $t_1$ and $t_b$ tabs are interchanged. Note that as a result of this operation the new $t_0$ tab (in W1) properly designates the block address to which the old L block (Bl1), now the new B block, is to be returned.

When the turn of the L–B channel is completed (upon the next appearance of the fiducial mark *) flip-flop $B_2$ is zeroed so that the Postexchange block program ($B_1=0$, $B_2=0$, $t_a^*=0$) is thereupon entered into.

(6) The computer is in its Postexchange block program which may last for many turns of the L–B channel. During this program, the $t_0$ tab (in W1) is used to identify the address in the W channel to which the B block (Bl1) is to be returned in a succeeding Write program. The identification is accomplished by looking for $t_a$–$t_0$ tab coincidence (coincidental appearance of $t_a$ and $t_0$ in the same word), such tab coincidence during a turn of the L–B channel indicating that the correct block (assuming its precinct is proper) will appear in the W channel during the next turn of the L–B channel.

When tab coincidence occurs (in W1 in the present example) during a turn of the L–B channel, it is memorized for the remainder of the turn by setting signal $v$ in the X channel to its 1 value ($v=1$). At the completion of the turn, upon the appearance of the fiducial mark * and $v=1$ (and assuming the precinct is proper as verified by tab $t_0$* in W33 and signal H agreeing in value with each other), the program flip-flop B, will be set to its 1 state, so that the computer thereupon enters into its Write program ($B_1=1$, $B_2=0$, $t_a^*=0$).

If precinct is not verified in W33, Postexchange will hold (flip-flop $B_1$ will not be set) and signal $v=1$ will be erased (returned to its 0 value) upon the appearance of tab $t_a$ in a word in which tab $t_0$ does not appear. Normal Postexchange operation then continues until tab coincidence (this time in the correct precinct) is again obtained, and upon precinct verification in W33, the Write program ($B_1=1$, $B_2=0$, $t_a^*=0$) is entered.

(7) The computer is in its Write program ($B_1=1$, $B_2=0$, $t_a^*=0$) which lasts for one turn of the L–B channel, the B block (Bl1) being written into its proper position in the W channel during this turn.

During the Write program, as indicated by the arrow, tab $t_1$ is copied into the tab $t_0$ cell in each word of the L–B channel to thereby serve (in W3) to identify the address of the next block (Bl3) to be read from the W channel.

At the completion of the turn of the L–B channel (upon the next appearance of the fiducial mark *), the $B_2$ flip-flop is set to its 1 state so that the computer then enters the first phase ($B_1=1$, $B_2=1$, $t_a^*=0$) of its Read program.

It should however be noted that if tab coincidence had occurred during Write, the $v$ signal would be zeroed (to memorize the tab coincidence) and at the end of the turn of the L–B channel (assuming precinct verification were obtained) not only would the $B_2$ flip-flop be set but also the $t_a$* tab would be changed to a 1 valued signal, so that the computer would enter the second phase ($B_1=1$, $B_2=1$, $t_a^*=1$) of its read program. It will appear shortly that this alternative operation allows any $Bl_i$ to be read from the W channel immediately after the preceding block $Bl_{(i-1)}$ is written into the W channel.

(8) The computer is initially in the first phase ($B_1=1$, $B_2=1$, $t_a^*=0$) of its read program. During this phase, the W channel blocks as they appear are continually copied into the B block during successive turns of the L–B channel, until $t_a$–$t_0$ tab coincidence occurring during a turn indicates that the desired block (B$l$3) will appear and be copied during the next turn of the L–B channel. The $v$ signal is zeroed to memorize such tab coincidence until the completion of the turn in which coincidence occurs.

At the completion of the turn in which tab coincidence occurs (as indicated by $v=0$ and appearance of the fiducial mark *) the $t_a$* tab in W33 is changed to its 1 value (provided precinct verification is obtained) so that the computer then enters the second phase ($B_1=1$, $B_2=1$, $t_a^*=1$) of its Read program during the next turn of the L–B channel. The fact that $t_a^*=1$ indicates that the desired block (B$l$3) is being read and copied during the next turn and, therefore, at the completion of this turn the Read program is ended, the flip-flops $B_1$ and $B_2$ both being zeroed so that the computer re-enters its Preexchange block program.

Note that when the desired block (B$l$3) is copied into the B block, it carries the address of its successor block (B$l$4) as the position (in W4) of the $t_b$ tab, this tab being also copied (as shown by the arrow).

If precinct verification has not been obtained, the first phase of the Read program would continue ($t_a$* would not be changed to its 1 value) and the $v$ signal would be reset to its 1 value upon the appearance of tab $t_a$ in a word in which tab $t_0$ does not appear. The normal first phase of the Read program would thereafter continue until tab coincidence (this time in the correct precinct) is again obtained, and upon precinct verification in W33, the second phase of the read program would be entered upon, this lasting for one turn of the L–B channel and followed by the Preexchange program.

(9)–(23) During the programs described by entries (9) through (23), three more complete cycles of the block programs are accomplished. Note that the described manipulations of the tabs are repeated without change in each cycle of the block programs. Note further that in the course of these manipulations each entering $t_b$ tab is utilized as a $t_0$ tab at the proper times to first control reading of the successor block from the W channel during the next block program cycle, and then to control the return of the successor block to its proper position in the W channel two program cycles later.

For example, referring to entry (8) when B$l$3 is read into the B block, its $t_b$ tab in W4 indicates that B$l$4 is to be the successor block. As shown by entries (10) and (12), respectively, in the next block program cycle, the entering $t_b$ tab appears next as a $t_1$ tab in W4 and then as $t_1$ and $t_0$ tabs in W4, serving at this time to control the reading of B$l$4 from the W channel. During the Exchange program of the next cycle, entry (15), the $t_0$ and $t_1$ tabs are changed to the $t_w$ and $t_b$ tab cells of W4. Therefore, when B$l$3 is written back into the W channel, it carries its correct $t_b$ tab in W4 to identify its successor block (B$l$4) if B$l$3 is ever used again. Moreover, during the Exchange program of the next cycle, entry (20), the $t_w$ tab again appears as the $t_0$ tab in W4, and is utilized in entry (21) to control the writing of B$l$4 back into the W channel. It is thus seen that the simple repetition of the described tab movements is able to accomplish quite complex block addressing operations.

It will be understood that the tab manipulations shown by Table 2, are also performed on the corresponding tabs $t_0$*, $t_w$*, $t_1$* and $t_b$* appearing in W33 of the L–B channel. In this manner the tabs in W33 are moved about within the word so that they are able to serve at the proper times as $t_0$* tabs to thereby identify the precincts of W channel positions from which blocks are to be read or into which blocks are to be written.

DEVIATIONS FROM NORMAL BLOCK PROGRAM CYCLE

As shown in Table 2, the block programs appear in their normal sequence. However as was hereinbefore mentioned a number of deviations from this sequence are possible. These are listed for purposes of convenience.

(1) If the $\underline{\overline{X}}$ (Exchange) instruction appears and is accepted in W32 as well as in W33, Exchange is followed by Preexchange. This allows a pair of L and B blocks to be computed upon as long as desired until (as a result of a test instruction) the $\underline{\overline{X}}$ instruction in W32 is not accepted. Then Exchange will be normally followed by Postexchange.

(2) If during Write, tab coincidence and precinct verification are found, Write will be immediately followed by the second phase of Read.

(3) A Branch instruction, if it occurs, will be effective during Preexchange, and after causing the selection of a new successor block, causes the computer to be forced into the second phase of Read so that the new successor block is read into the B block.

VALUES OF THE $v$ SIGNAL

As explained in connection with Table 2, the $v$ signal in the X channel is utilized to store or memorize the occurrence of tab coincidence during the course of the block addressing operations. The described operations upon the $v$ signal are briefly summarized in the following table, Table 3:

TABLE 3

| Block Program | State of flip-flop $B_1$ | Tab Coincidence signified by | Operations Performed |
|---|---|---|---|
| Write<br>Read | 1 | $v=0$ | (a) If $v=1$, change $v$ to 0, upon $t_a$-$t_0$ tab coincidence.<br>(b) If $v=0$, change $v$ to 1 when $t_a=1$ appears in word having $t_0=0$. |
| Preexchange<br>Exchange<br>Postexchange | 0 | $v=1$ | (a) If $v=0$, change $v$ to 1 upon $t_a$-$t_0$ tab coincidence.<br>(b) If $v=1$, change $v$ to 0 when $t_a=1$ appears in word having $t_0=0$. |

From a consideration of Table 3, it becomes clear that a tab coincidence noted during Exchange or Preexchange or Postexchange (by setting $v=1$) automatically loses that significance once Write or Read is entered since during Write the normal value of $v$ is 1 and tab coincidence is memorized by zeroing $v$.

Similarly a tab coincidence noted during Write or Read (by zeroing $v$) automatically loses that significance, once Preexchange is entered.

DETAILED DESCRIPTION OF STRUCTURE AND OPERATION

Virtually all of the operations of the computer have now been described with varying particularity in the general description of operation provided in the preceding portions of this specification. All of the above described operations of the computer will now be reviewed in detail both to further clarify the nature of the operations performed and to fully disclose the electrical circuits and apparatus utilized in a preferred embodiment of the computer to mechanize these operations.

As stated before, in the operation of the computer, as indicated in Fig. 1, virtually all operations are carried on by successive changes in the states of the computer flip-flops. During each timing interval, gating matrix 20 receives bilevel signals and in response thereto at the end of the timing interval (as demarked by the appearance of a clock pulse $Cl$) selectively produces "set" and "zero" signals which are applied to the corresponding inputs of the computer flip-flops to "set," "zero" or "trigger" the flip-flops. Matrix 20 also produces the pair of gate control signals $B_1B'_2$ and $B'_1+B_2$ and also the output signals Start Tape, Stop Tape, Warning and Number.

It will be shown that gating matrix 20 comprises a plurality of gating networks, each gating network receiving some of the signals applied to the gating matrix and combining these signals to form one of the output signals produced by the gating matrix. Thus gating matrix 20 includes one gating network for producing the SI input signal, a second gating network for producing the ZI signal and so forth, there being one gating network respectively for each of the output signals produced by gating matrix 20. Each of the gating networks will ordinarily include a plurality of logical "and" gates and "or" gates arranged to combine applied signals in accordance with an associated Boolean logical equation to produce a desired resultant output signal. As is well known in the art, the Boolean equation associated with a gating network fully defines the output signal produced by the network in terms of the input signals received by the network and in addition supplies a complete description of the structure of the gating network.

Figure 4:
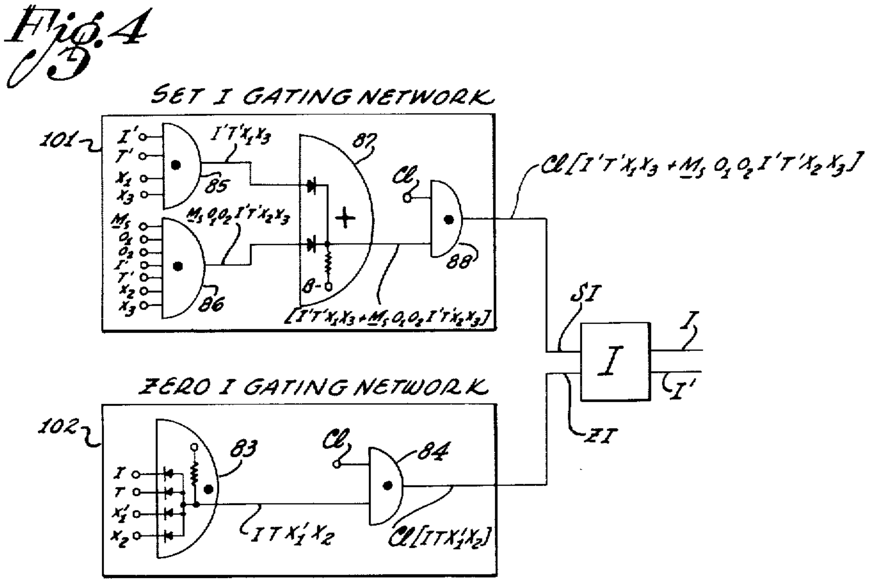
Fig. 4 is a partly block, partly circuit diagram of two gating networks which are included in a gating matrix of the preferred embodiment of the invention shown in Fig. 1.

For example, referring now to Fig. 4, there are illustrated two gating networks 101 and 102, respectively, which form the output signal SI and ZI respectively, these signals, as illustrated in Figs. 1 and 4, being applied to flip-flop I to respectively set and zero the flip-flop. In reference to their functions, gating network 101 will be referred to as Set I Gating Network 101 and gating network 102 as Zero I Gating Network 102. Other gating networks will be similarly designated in terms of the output signals they produce.

As will be shown Set I and Zero I Gating Networks 101 and 102 as shown in Fig. 4 are respectively mechanized in strict accordance with the terms of corresponding Boolean logical Equations 1 and 2, provided hereinbelow.

$$SI=Cl[I'T'X_1X_3+\underline{M}_sO_1O_2I'T'X_2X_3] \quad (1)$$

$$ZI=Cl[ITX'_1X_2] \quad (2)$$

In Eqs. 1 and 2 the presence of a "+" indicates that the logical "or" operation is to be performed on the expressions joined thereby while the absence of a "+" indicates that the logical "and" operation is to be performed on the expressions joined thereby. A bracket [ ], parentheses, or similar expression also indicates that the logical "and" operation is to be performed upon the factor outside the bracket and the expression contained within the bracket.

Thus Eq. 2 states in a very concise form that an output pulse ZI will be produced only when signals I $\underline{\text{and}}$ T $\underline{\text{and}}$ $X'_1$ $\underline{\text{and}}$ $X_2$ are at their high (1 representing) levels $\underline{\text{and}}$ a clock pulse $Cl$ appears. Eq. 2 also provides an exact and literal description of the corresponding structure of Zero I Gating Network 102. As shown in Fig. 4, gating network 102 comprises two conventional diode "and" gates 83 and 84. "And" gate 83 mechanizes the expression $ITX'_1X_2$ in Eq. 2 and is therefore a four input terminal gate to whose terminals the bilevel signals I, T, $X'_1$, $X_2$ are respectively applied, gate 83 combining these applied signals in accordance with the logical "and" operation to produce a bilevel output signal designated as signal $ITX'_1X_2$ which has a high level only when all of the signals I $\underline{\text{and}}$ T $\underline{\text{and}}$ $X'_1$ $\underline{\text{and}}$ $X_2$ are at their high levels.

As shown in Fig. 4, to complete the mechanization of Eq. 2 the signal $ITX'_1X_2$ is applied to one input terminal of the two input "and" gate 84 symbolically represented in Fig. 4 as a semi-circle with a dot in the center, the clock pulses $Cl$ being applied to a second input terminal of gate 84. Gate 84 is effective to produce an output pulse signal $Cl[ITX'_1X_2]$ only when signal $ITX'_1X_2$ is at a high level $\underline{\text{and}}$ a clock pulse $Cl$ appears. This output pulse signal as shown in Fig. 4 is output signal ZI as defined by Eq. 2.

As another example, consider the mechanization of Boolean Eq. 1 by corresponding gating network 101 to produce the SI input signal. Eq. 1 indicates that the SI input signal is to be produced only when signals I' $\underline{\text{and}}$ T' $\underline{\text{and}}$ $X_1$ $\underline{\text{and}}$ $X_3$ are all high, or when signals $\underline{M}_s$ $\underline{\text{and}}$ $O_1$ $\underline{\text{and}}$ $O_2$ $\underline{\text{and}}$ I' $\underline{\text{and}}$ T' $\underline{\text{and}}$ $X_2$ $\underline{\text{and}}$ $X_3$ are all high, $\underline{\text{and}}$ in addition a clock pulse $Cl$ is applied. In mechanizing the expression $I'T'X_1X_3$ a four input "and" gate 85 is utilized which receives signals I', T', $X_1$ and $X_3$ and combines them to produce a corresponding output signal $I'T'X_1X_3$. The expression $\underline{M}_sO_1O_2I'T'X_2X_3$ is mechanized by a seven input "and" gate 86 which combines the corresponding signals $\underline{M}_s$, $O_1$, $O_2$, I', T', $X_2$ and $X_3$. The signals produced by gates 85 and 86 are applied to a conventional "or" gate 87 which combines these signals to produce an output signal designated as $[I'T'X_1X_3+\underline{M}_sO_1O_2I'T'X_2X_3]$ which is at a high level whenever any of the two applied signals $I'T'X_1X_3$ $\underline{\text{or}}$ $\underline{M}_sO_1O_2I'T'X_2X_3$ is at its high level. The signal produced by gate 87 is applied to one terminal of an "and" gate 88 which receives clock pulses $Cl$ at its other terminal, gate 87 functioning to produce a pulse output signal whenever the signal $[I'T'X_1X_3+\underline{M}_sO_1O_2I'T'X_2X_3]$ is at its high level and a clock pulse $Cl$ appears. This pulse output signal is the required SI signal as defined by Eq. 1.

It is apparent from the preceding discussion that logical Eqs. 1 and 2 completely specify the structure of the corresponding gating networks 101 and 102, that is, each equation specifies the number of "and" and "or" gates which are to be included in the gating network, the number of inputs to each corresponding gate and the interconnection between the gates. Similar discussions of the manner in which Boolean logical equations may be mechanized by corresponding gating networks have appeared in a variety of prior art publications, as for example in an article entitled "An Algebraic Theory for Use in Digital Computer Design," by E. C. Nelson, found in the Transactions of the IRE Professional Group on Electronic Computers, September 1954 issue, pages 12 through 21. Accordingly, for the purpose of facilitating complete understanding of the structure and operation of the present invention, the remainder of this specification will be largely devoted to a derivation of the logical equations which describe the operation and specify the structure of the corresponding gating networks which together comprise gating matrix 20, there being one logical equation (and corresponding gating network) for each of the output signals produced by matrix 20. For purposes of handy reference, all of the equations to be derived are set forth below in Table 4. In addition all of the terms of the equations are numbered in the order in which these terms are developed in the following portions of the specification.

TABLE 4

$$SI=Cl[I'T'X_1X_3+\underline{M}_sO_1O_2I'T'X_2X_3] \quad (1)$$
1 172

$$ZI=Cl[ITX'_1X_2] \quad (2)$$
2

$$ST=Cl[T'] \quad (3)$$
3

$$ZT=Cl[(\underline{M}'_s+O'_1+O'_2+O_3+M'+L_2)T] \quad (4)$$
4

$$SL_2=Cl[I'TX'_2X_3(B_1B'_2L_3+B_1B_2L_1$$
116 134

$$+B'_1B'_2(Br_1CL'_1+Br'_0L_1))+I'TX_2L_1$$
85 77 100

$$+I'T'X_1X_3(L'_1(Br_0+W_0+\tau_0)+L_1(W_1+Br_1Rd'))$$
78 43 50 46

$$+ITEx'L_1+IT'(Rd'L_1+RdW)+I'TX'_2X'_3EX'L_1$$
149 124 122 151

$$+I'T'[X'_1X'_2RdW+X_1X'_3RdL_1+(X'_1+X'_3)Rd'L_1]$$
126 128 130

$$+\underline{M}_s[O_1O_2O'_3M+(O'_1+O'_2+O_3)L_1]$$
163 165

$$+\underline{F}[O'_1O_2T(I+X'_2)O_3+TI'X_2L_1$$
179 181

$$+(O_1+O'_2)L_1+T'L_1]]$$
183 185

(5)

$$ZL_2=Cl[I'TX'_2X_3(B_1B'_2L'_3+B_1B_2L'_1$$
117 135

$$+B'_1B'_2(Br_0L_1+L'_1(Br'_1+C'))+I'TX_2L'_1$$
76 86 101

$$+I'T'X_1X_3(L'_1W'_0Br'_0\tau'_0+L_1W'_1(Br'_1+Rd))$$
44 49

$$+ITEx'L'_1+IT'(Rd'L'_1+RdW')+I'TX'_2X'_3Ex'L'_1$$
150 125 123 152

$$+I'T'[X'_1X'_2RdW'+X_1X'_3RdL'_1$$
127 129

$$+(X'_1+X'_3)Rd'L'_1]+\underline{M}_s[O_1O_2O'_3M'$$
131 164

$$+(O'_1+O'_2+O_3)L'_1]+\underline{F}[O'_1O_2T(I+X'_2)O'_3$$
166 180

$$+TI'X_2L'_1+(O_1+O'_2)L'_1+T'L'_1]]$$
182 184 186

(6)

$$SL_3=Cl[ITX_1X_2L_2+I'TX'_2(ExL_1+Ex'L_2)$$
132 153 155

$$+IT(X'_1+X'_2)[Pb_2X_1+Pb'_2(ExL_1+Ex'L_2)]$$
62 157 68

$$+I'T'L_2+IT'(Pl_2X_2+Pl'_2L_2)$$
102 64 159

$$+I'TX_2L'_1X_1(O'_1+O'_2)+I'TX_2L_1[B_1X'_3(L_3H+L'_3H')$$
104 120

$$+B_1L_2+B'_1B_2L_2+B'_1B'_2L_2(\underline{\overline{X}}'+X_1+C)]]$$
139 146 143

(7)

TABLE 4—Continued $$ZL_3=Cl[ITX_1X_2L'_2+I'TX'_2(ExL'_1+Ex'L'_2)$$
133 154 156

$$+IT(X'_1+X'_2)[Pb_2X'_1+Pb'_2(ExL'_1+Ex'L'_2)]$$
63 158 69

$$+I'T'L'_2+IT'(Pl_2X'_2+Pl'_2L'_2)$$
103 65 160

$$+I'TX_2L'_1X'_1(O'_1+O'_2)$$
105

$$+I'TX_2L_1[L'_2B_1(X_3+L_3H'+L'_3H)$$
121

$$+B'_1B_2L'_2+B'_1B'_2L'_2+B'_1B'_2L_2\underline{\overline{X}}X'_1C']]$$
147 148 141

(8)

$$SX=Cl[I'TX_2L'_1L_2(O'_1+O'_2)$$
106

$$+(I+T'+X'_2+L_1)X_1+\underline{M}_sO_1O_3M]$$
108 168

(9)

$$ZX_2=Cl[I'TX_2L'_1L'_2(O'_1+O'_2)$$
107

$$+(I+T'+X'_2+L_1)X'_1+\underline{M}_sO_1O_3M']$$
109 169

(10)

$$SX_3=Cl[I'T'(X'_1+X_3)X_2+I'T'X_1X'_3[B_1[X_2(L'_1+L'_2)$$
110 119

$$+X'_2L_1L'_2]+B'_1[X_2(L'_1+L_2)+X'_2L_1L_2]]$$
136 88 87

$$+TX_2+IT'X'_3[Tl_2L_2+Tb_2L_3$$
70 67 66

$$+(A_1+T_0)\{L_2(C'X'_2+CX_2)+L'^2(CX'_2+C'X_2)\}$$
16

$$+(S_1+T_1)\}L'_2(C'X'_2+CX_2)+L_2(CX'_2+C'X_2)\}]$$
30

$$+IT'[X_3+Tl'_2Tb'^2A'_1T'_0S'_1T'_1]X_2]$$
72

(11)

$$ZX_3=Cl[TX'_2+I'T'X_3X'_2] \quad (12)$$
71 111

$$SY_3=Cl[IT'X'_3L_2(Br_0+U_0+\tau_0)$$
79 34 51

$$+IT'X'_3Y_2(Br_1+\tau_1+U_1)]$$
82 57 39

(13)

$$ZY_3=Cl[IT'X'_3L'_2(Br_0+U_0+\tau_0)$$
80 35 52

$$+IT'X'_3Y'_2(Br_1+\tau_1+U_1)+I']$$
83 58 40 42

(14)

$$SB_1=Cl[I'TX_2L_1B'_1B'_2L'_2X_3(L_3H+L'_3H')$$
112

$$+I'TX_2L_1B'_1B'_2L_2X_3(L_3H+L'_3H')Br_1$$
89

$$+\underline{F}\,\underline{Wr_d}I'TX_2L_1X_3(L_3H+L'_3H')]$$
191

(15)

TABLE 4—Continued $$ZB_1=Cl[I'TX_2L_1B_1B_2L_2+\underline{F}I'TX_2L_1B_1] \quad (16)$$
137 192

$$SB_2=Cl[I'TX_2L_1B_1B'_2L'_2$$
118

$$+I'TX_2L_1B'_1B'_2L_2X_3(L_3H+L'_3H')Br_1$$
90

$$+I'TX_2L_1B'_1B'_2L_2\underline{\overline{X}}X'_1+\underline{F}\,\underline{Ex}_dI'TX_2L_1B'_2] \quad (17)$$
140 190

$$ZB_2=Cl[I'TX_2L_1B_1B_2L_2+I'TX_2L_1B'_1B_2] \quad (18)$$
138 145

$$SC=Cl[(T_0+T_1)ITX'_1X_2X'_3$$
19

$$+ITX'_1X_2Y_3(Br_1+\tau_1+\tau_2)+I'TX_2L'_1\underline{\overline{X}}$$
84 59 142

$$+ITX_1X_2(S_1+T_1)+IT'X'_3[A_1+T_0)C'X_2L_2$$
29 17

$$+(S_1+T_1)C'X_2L'_2]] \quad (19)$$
31

$$ZC=Cl[(T_0+T_1)ITX'_1X_2X_3+ITX_1X_2\underline{\overline{X}}'S'_1T'_1$$
20 28

$$+IT'X'_3[(A_1+T_0)CX'_2L'_2+(S_1+T_1)CX'_2L_2]] \quad (20)$$
18 32

$$SP=Cl[\text{Step } Q] \quad (21)$$
15

$$ZP=Cl[Ze+ITX'_1X_2(U_0+\tau_0)] \quad (22)$$
22 36 53

$$SQ=Cl[\text{Step } R+ITX'_1X_2(Pl_2+Pb_2)] \quad (23)$$
13 74

$$ZQ=Cl[\text{Step } R'+Ze+I'T'X_1X_3C(Pl_1+Pb_1] \quad (24)$$
14 23 61

$$SR=Cl[\text{Step } S+I'T'X_1X_3C\tau_1] \quad (25)$$
11 60

$$ZR=Cl[\text{Step } S'+Ze+ITX'_1X_2(Br_0+\tau_0+U_0+\tau_2)] \quad (26)$$
12 24 81 54 37 73

$$SS=Cl[\text{Step } K+ITX'_1X_2(Tb_0+Pb_0+W_0)] \quad (27)$$
9 55 45

$$ZS=Cl[\text{Step } K'+Ze] \quad (28)$$
10 25

$$SK=Cl[\text{Step } D+ITX'_1X_2U_0] \quad (29)$$
7 38

$$ZK=Cl[\text{Step } D'+Ze+ITX'_1X_2Pl_0] \quad (30)$$
8 26 56

TABLE 4—Continued $$SD=Cl[\text{Step } L_2+I'TX_2L_1L_2B'_1B'_2W_1] \quad (31)$$
5 47

$$ZD=Cl[\text{Step } L'_2+Ze] \quad (32)$$
6 27

$$Wr=B_1B'_2 \quad (33)$$
113

$$Wr'=B'_1+B_2 \quad (34)$$
114

$$E_{in}=B_1B'_2T'L_1 \quad (35)$$
115

$$\text{Start-Tape}=P'QRS'K'D' \quad (36)$$
92

$$\text{Stop-Tape}=PQR'SK'D' \quad (37)$$
97

$$\text{Warning}=IT'X'_3 \text{ Read-out} \quad (38)$$
94

$$\text{Number}=IT'X'_3L_2 \text{ Read-out} \quad (39)$$
95

$$SO_1=Cl[O'_1O'_2H'\underline{M}_s+\underline{F}I'TX_2L_1O'_1O_2] \quad (40)$$
162 187

$$ZO_1=Cl[\underline{M}_s\underline{m}_{up}+\underline{F}\,\underline{1}_{up}\underline{0}_{up}] \quad (41)$$
173 189

$$_2=Cl[O'_1O'_2m_d\underline{H}M_s\underline{+}FI'\underline{T}X_2L_1(1_dO_{\underline{3}}+0_d\underline{O'}_3)] \quad (42)$$
161 176

$$ZO_2=Cl[\underline{M}_sO_2O_3M'X_2X_3+\underline{F}I'TX_2L_1O'_1O_2] \quad (43)$$
170 188

$$SO_3=Cl[O_1O_2O'_3ML_2\underline{M}_s$$
167

$$+\underline{F}\,\underline{1}_dO'_1O'_2+\underline{F}T(I+X'_2)O'_1O_2L_1] \quad (44)$$
174 177

$$ZO_3=Cl[\underline{M}_sO_2O_3M'X_2X_3$$
171

$$+\underline{F}\,\underline{0}_dO'_1O'_2+\underline{F}T(I+X'_2)O'_1O_2L'_1] \quad (45)$$
175 178

In the mechanization of logical Eqs. 1–45 by the corresponding gating networks 101–145, there are a number of auxiliary signals which are so widely utilized in the various networks that these signals are separately generated within gating matrix 20 by additional gating networks 201a–248a and distributed whenever required. The alphabetical abbreviations (as used in Eqs. 1–45) of these auxiliary signals and their corresponding logical equations, Eqs. 1a–48a, are listed in the following table, Table 5.

TABLE 5

| Auxiliary Signal | Logical Equation | | States of Flip-flops | | | | | |
|---|---|---|---|---|---|---|---|---|
| | | | P | Q | R | S | K | D |
| $A_1$ | $A_1=P'Q'RS'K'D'$ | (1a) | 0 | 0 | 1 | 0 | 0 | 0 |
| $A'_1$ | $A'_1=P+Q+R'+S+K+D$ | (2a) | | | | | | |
| $S_1$ | $S_1=P'Q'RS'K'D$ | (3a) | 0 | 0 | 1 | 0 | 0 | 1 |
| $S'_1$ | $S'_1=P+Q+R'+S+K+D'$ | (4a) | | | | | | |
| $T_0$ | $T_0=P'Q'RSK'D$ | (5a) | 0 | 0 | 1 | 1 | 0 | 1 |
| $T_1$ | $T_1=P'Q'RSKD$ | (6a) | 0 | 0 | 1 | 1 | 1 | 1 |
| $T'_1$ | $T'_1=P+Q+R'+S'+K'+D'$ | (7a) | | | | | | |
| $U_0$ | $U_0=PQRS'K'D'$ | (8a) | 1 | 1 | 1 | 0 | 0 | 0 |
| $U_1$ | $U_1=P'QR'S'KD'$ | (9a) | 0 | 1 | 0 | 0 | 1 | 0 |
| $Pl_0$ | $Pl_0=PQRSKD'$ | (10a) | 1 | 1 | 1 | 1 | 1 | 0 |
| $Pl_1$ | $Pl_1=P'QR'SK'D'$ | (11a) | 0 | 1 | 0 | 1 | 0 | 0 |
| $Pl_2$ | $Pl_2=P'Q'RSK'D'$ | (12a) | 0 | 0 | 1 | 1 | 0 | 0 |
| $Pl'_2$ | $Pl'_2=P+Q+R'+S'+K+D$ | (13a) | | | | | | |
| $Tl_0$ | $Tl_0=PQRSK'D$ | (14a) | 1 | 1 | 1 | 1 | 0 | 1 |
| $Tl_1$ | $Tl_1=P'QR'SK'D$ | (15a) | 0 | 1 | 0 | 1 | 0 | 1 |
| $Tl_2$ | $Tl_2=P'QRSK'D$ | (16a) | 0 | 1 | 1 | 1 | 0 | 1 |
| $Tl'_2$ | $Tl'_2=P+Q'+R'+S'+K+D'$ | (17a) | | | | | | |

TABLE 5—Continued

| Auxiliary Signal | Logical Equation | | States of Flip-flops | | | | | |
|---|---|---|---|---|---|---|---|---|
| | | | P | Q | R | S | K | D |
| $Pb_0$ | $Pb_0=PQRS'KD'$ | (18a) | 1 | 1 | 1 | 0 | 1 | 0 |
| $Pb_1$ | $Pb_1=P'QR'SKD'$ | (19a) | 0 | 1 | 0 | 1 | 1 | 0 |
| $Pb_2$ | $Pb_2=P'Q'RSKD'$ | (20a) | 0 | 0 | 1 | 1 | 1 | 0 |
| $Pb'_2$ | $Pb'_2=P+Q+R'+S'+K'+D$ | (21a) | | | | | | |
| $Tb_0$ | $Tb_0=PQRS'KD$ | (22a) | 1 | 1 | 1 | 0 | 1 | 1 |
| $Tb_1$ | $Tb_1=P'QR'SKD$ | (23a) | 0 | 1 | 0 | 1 | 1 | 1 |
| $Tb_2$ | $Tb_2=P'QRSKD$ | (24a) | 0 | 1 | 1 | 1 | 1 | 1 |
| $Tb'_2$ | $Tb'_2=P+Q'+R'+S'+K'+D'$ | (25a) | | | | | | |
| $\tau_0$ | $\tau_0=PQR(S+K)$ | (26a) | | | | | | |
| $\tau'_0$ | $\tau'_0=P'+Q'+R'+S'K'$ | (27a) | | | | | | |
| $\tau_1$ | $\tau_1=P'QR'S$ | (28a) | | | | | | |
| $\tau_2$ | $\tau_2=P'RS(Q+D')$ | (29a) | | | | | | |
| $\underline{\overline{X}}$ | $\underline{\overline{X}}=P'QRS'KD$ | (30a) | 0 | 1 | 1 | 0 | 1 | 1 |
| $\underline{\overline{X}}'$ | $\underline{\overline{X}}'=P+Q'+R'+S+K'+D'$ | (31a) | | | | | | |
| $Br_0$ | $Br_0=PQRS'K'D$ | (32a) | 1 | 1 | 1 | 0 | 0 | 1 |
| $Br'_0$ | $Br'_0=P'+Q'+R'+S+K+D'$ | (33a) | | | | | | |
| $Br_1$ | $Br_1=PQR'S'K'D$ | (34a) | 1 | 1 | 0 | 0 | 0 | 1 |
| $Br'_1$ | $Br'_1=P'+Q'+R+S+K+D'$ | (35a) | | | | | | |
| $W_0$ | $W_0=PQR'S'KD'$ | (36a) | 1 | 1 | 0 | 0 | 1 | 0 |
| $W'_0$ | $W'_0=P'+Q'+R+S+K'+D$ | (37a) | | | | | | |
| $W_1$ | $W_1=PQR'SKD'$ | (38a) | 1 | 1 | 0 | 1 | 1 | 0 |
| $W'_1$ | $W'_1=P'+Q'+R+S'+K'+D$ | (39a) | | | | | | |
| $W_2$ | $W_2=PQR'SKD$ | (40a) | 1 | 1 | 0 | 1 | 1 | 1 |
| Idle | Idle%$P'QR'S'K'D'$ | (41a) | 0 | 1 | 0 | 0 | 0 | 0 |
| Read-out | Read-out$=PQR'S'K'D'$ | (42a) | 1 | 1 | 0 | 0 | 0 | 0 |
| $Rd$ | $Rd=B_1B_2$ | (43a) | | | | | | |
| $Rd'$ | $Rd'=B'_1+B'_2$ | (44a) | | | | | | |
| $Ex$ | $Ex=B'_1B_2$ | (45a) | | | | | | |
| $Ex'$ | $Ex'=B_1+B'_2$ | (46a) | | | | | | |
| Step | Step$=I'T'X'_1X'_2C'(Q'+R)$ | (47a) | | | | | | |
| $Ze$ | $Ze=I'T'X_1X_2(\underline{\overline{X}}L_2+L_1RdBr_1+$ <br> 144 91 <br> $L_1W_2+L_1\tau_1+L_2$ Idle $\underline{\text{Start}})+$ <br> 48 75 99 <br> $ITX'_1X_2(A_1+T_0+S_1+T_1+U_1Y_1+$ <br> 21 33 41 <br> Read-out+Start-Tape+Stop-Tape) <br> 96 93 98 | (48a) | | | | | | |

It is seen, referring to Table 5 that many of the auxiliary signals are designated by the abbreviations of the various instructions heretofore described. It will be understood that when such an auxiliary signal is at its high level, the corresponding instruction is contained in the instruction register. The equations for such auxiliary signals merely define the states (and the output signals) of the instruction register flip-flops P, Q, R, S, K, D after the digits of the corresponding instructions have been shifted into the instruction register. Where applicable the corresponding states of the instruction register flip-flops are also listed in Table 5.

For example, as indicated by Table 5, when the digits 111110 of the Put in L ($Pl_0$) instructions are accepted (shifted into the instruction register), then the flip-flops P, Q, R, S, K, D will be in the corresponding states 111110. As a result of the signals P, Q, R, S, K, D' will all be at their high levels. Thus auxiliary signal $Pl_0$, as defined by Eq. 10*a* will be at its high level so long as the $Pl_0$ instruction is held in the instruction register.

It will also be understood, referring to Table 5, that during the performance of some of the major instructions (the $Pl_0$ instruction for example) the flip-flops P, Q, R, S, K, D of the instruction register are automatically cycled through various states corresponding to the presence of certain subordinate instructions (as for example, $Pl_1$ and $Pl_2$) in the instruction register. As shown in Table 5, corresponding auxiliary signals (auxiliary signals $Pl_1$ and $Pl_2$, for example) are generated to indicate when such subordinate instructions are contained in the instruction register.

A number of complementary (primed) auxiliary signals are also generated which merely indicate (at their high levels) that the corresponding instructions are <u>not</u> contained in the instruction register. For example, the auxiliary signal $\underline{\overline{X}}'$ at its high level indicates that the $\underline{\overline{X}}$ instruction is not contained in the instruction register (and that the X signal is therefore at a low level). The equations for such primed signals are obtained by merely complementing the equations for the corresponding unprimed signals in accordance with the ordinary rules of Boolean algebra.

The auxiliary signal $\tau_0$ at its high level indicates that any one of the Put or Take instructions $Pl_0$, $Tl_0$, $Pb_0$ or $Tb_0$ is contained in the instruction register. Similarly, if the auxiliary signal $\tau_1$ is at its high level then any one of the subordinate Put or Take instructions $Pl_1$, $Tl_1$, $Pb_1$ or $Tb_1$ is contained in the instruction register. The equations for these signals may be verified by a brief examination of Table 5.

The auxiliary signals R*d* and R*d'* indicate respectively whether the computer is or is not in its Read block program. The auxiliary signals E*x* and E*x'* indicate respectively whether the computer is or is not in its Exchange block program.

The auxiliary signal *Ze* (called the Zeroing signal *Ze*) has the effect when at its high level of causing all of the instruction register flip-flops (P, Q, R, S, K and D) to be zeroed, thereby effectively placing the Pass instruction in the instruction register which then accepts the next instruction. It is through the action of the *Ze* signal that the completed instructions are removed from the instruction register. Unlike the precedingly listed auxiliary signals, the equation for the *Ze* signal is relatively complex and therefore its terms are numbered and will be derived hereinafter.

The auxiliary signal Step has the effect, when at its high level, of causing the contents of each instruction register flip-flop to be shifted (actually copied) into the next flip-flop (the order being D to K to S to R to Q to P), the contents of the $L_2$ flip-flop being in addition shifted into flip-flop D. It is through the action of the Step signal that digits of an instruction are shifted into the instruction register. Note, referring to Eq. 47 that the Step signal will be high (thus allowing instructions to be accepted) only when signal C' is high and signals Q' or R are high. This means that instructions will not be accepted if flip-flop C is in its "1" state or if flip-flops Q and R are in their "1" and "0" states, respectively.

The first property is particularly important in connection with the Test ($T_0$ or $T_1$) instructions where flip-flop C is set to its "1" state to cause a word to be skipped, that is, to not accept the instruction of the word. The second property is of importance in connection with those instructions which must be held in the instruction register for more than one word passage. All of these instructions (as shown in Table 5, the instructions $Br_1$, $W_0$, $W_1$, $W_2$, $U_1$, $Pl_1$, $Tl_1$, $Pb_1$, $Tb_1$, Idle, Read-Out and Stop-Tape) have the protective digit sequence 1, 0 in their fifth and fourth digits (corresponding to flip-flops Q and R) and thus after such a protected instruction has been placed in the instruction register, it will remain there and cannot be replaced by succeeding instructions in the L–B channel until either the instruction register is zeroed (by the action of the Ze signal) or there is an automatic transition to a subordinate instruction.

The following order of consideration of operations will be followed in deriving the terms of the logical equations. First a few preliminary operations will be considered, particularly those relating to the regular changes occurring during normal operation in the state of the I and T flip-flops. Next, those operations will be considered which relate to the preformance of the various instructions which the computer responds to. Next those operations will be considered which relate to the accomplishment of the block programs. Finally the mark and fill operations will be considered, discussion of these being deferred to the last because they are largely accomplished through simple manipulation of the structure which accomplishes the block programming.

CHANGES IN STATE OF FLIP-FLOP I

As shown in Fig. 3 in normal operation flip-flop I is in its "1" state during the passage (through flip-flop $L_1$) of the first two digits of each word of the L–B channel, is in its "0" state during the passage of the next 17 digits and is then returned to its "1" state for the passage of the remaining digits of the word and the first two digits of the next word. To accomplish this, flip-flop I is zeroed at the time when digit $l_1^1$ is in the $L_1$ flip-flop (this corresponding to the time $ITX'_1X_2$ at which mark $m_3$ is in flip-flop $X_2$), and is set at the time when flag tab $f$ may be in flip-flop $L_1$ (this corresponding to the time $I'T'X_1X_3$ at which mark $m_2$ is in the $X_1$ flip-flop and mark $m_1$ is in the $X_3$ flip-flop). The term in the SI equation which defines the described setting operation is therefore:

$$S_pI = I'T'X_1X_3 \tag{1}$$

where the subscript $p$ in $S_pI$ indicates that the equated expression is only a part of, in this instance one term of, the complete SI equation. Note that since the clock pulse signal $Cl$ is understood to be a common factor of all terms of the SI equation, for purposes of convenience it is not represented in the $S_pI$ expression. Note also that the term is numbered to correspond with the identical numbering in the SI equation.

The remaining term in the SI equation is related to the mark operations and will be later discussed in connection with these operations. The complete ZI equation comprises a single term which defines the described zeroing of flip-flop I and is therefore:

$$ZI = Cl[ITX'_1X_2] \tag{2}$$

CHANGES IN STATE OF FLIP-FLOP T

Referring to Fig. 3, it is seen that flip-flop T is to change its state at the end of each timing interval. Thus flip-flop T must be set whenever it is in its "0" state (when signal T' is high) and must be zeroed whenever it is in its "1" state (when signal T is high). The corresponding setting and zeroing equations for flip-flop T are:

$$ST = Cl[T'] \tag{3}$$

$$ZT = Cl[(\underline{M'}_8 + O'_1 + O'_2 + O_3 + M' + L_2)T] \tag{4}$$

It is seen that the ST equation indicates that as described, flip-flop T will be set whenever signal T' is high and a clock pulse $Cl$ appears; while on the other hand the ZT equation indicates that flip-flop T will be zeroed whenever signal T is high and a clock pulse $Cl$ appears and in addition any one of the signals $\underline{M'}_8$ or $O'_1$ or $O_3$ or $\underline{M'}$ or $L_2$ is at its high level. Ordinarily this latter condition will be satisfied and zeroing of T will therefore normally take place in the described manner. Normal zeroing of flip-flop T will be suppressed when said latter condition is not satisfied (at time $\underline{M}_8O_1O_2O'_3\underline{M}L'_2$), this being associated with an initial synchronization of flip-flop T as will be later described in connection with the mark operations.

PERFORMANCE OF THE ADD ($A_1$) AND TEST ($T_0$) INSTRUCTIONS

The $A_1$ and $T_0$ instructions are considered together because of their similarities. In response to either of these instructions in a word of the L block, the L number of the same word is added to the X number. One additional operation is performed in response to the $T_0$ instruction, this being that the sign digit of the resultant sum in the X channel is copied, reversed in value into the C flip-flop, at the completion of the addition operation. Since as explained, acceptance or lack of acceptance of the instruction in the next word is determined by the state of the C flip-flop, it is clear that in this way the next word may be skipped or not in accordance with the sign of the resultant sum.

Assuming that flip-flop C is initially in its 0 state and that the instruction register flip-flops P, Q, R, S, K, and D are initially in their $o$ states, the successive operations performed during the passage of a word containing the $A_1$ or $T_0$ instructions are:

($a$) The digits $l_1^1$ through $l_6^1$ of the instruction as they appear in flip-flop $L_2$ are successively copied or shifted into flip-flop D and from there shifted through the remaining flip-flops K, S, R, Q, P of the instruction register under the control of the auxiliary Step signal, so that the instruction is thereby contained in the instruction register.

It is clear that in this operation the Step signal must be high at each time (times $I'T'X'_1X'_2$) that one of the digits $l_1^1$ through $l_6^1$ is in flip-flop $L_2$. Thus in the equation for the Step signal, which is:

$$\text{Step} = I'T'X'_1X'_2C'(O'+R)$$

it will be noted that the expression $I'T'X'_1X'_2$ appears, assuring that signal Step can be high only at the desired times. Note further that since flips-flops C, Q and R are assumed to be in their 0 states, the equation will be satisfied (and therefore signal Step will be high) at the desired times.

Copying or shifting of instruction digits from flip-flop $L_2$ to flip-flop D under the control of the Step signal is defined by the following terms:

$$S_pD = \text{Step } L_2 \tag{5}$$

$$Z_pD = \text{Step } L'_2 \tag{6}$$

Similarly copying or shifting of instruction digits from flip-flop D to flip-flop K and thence to flip-flops S, R, Q and P are defined by the following terms:

$$S_pK = \text{Step } D \quad (7)$$

$$Z_pK = \text{Step } D' \quad (8)$$

$$S_pS = \text{Step } K \quad (9)$$

$$Z_pS = \text{Step } K' \quad (10)$$

$$S_pR = \text{Step } S \quad (11)$$

$$Z_pR = \text{Step } S' \quad (12)$$

$$S_pQ = \text{Step } R \quad (13)$$

$$Z_pQ = \text{Step } R' \quad (14)$$

$$S_pP = \text{Step } Q \quad (15)$$

Note that it is not necessary to copy a 0-valued digit into flip-flop P since it is already in its 0 state at the time a digit would be transferred to it.

(*b*) After the instruction has been shifted into the instruction register, the digits $l_1$–$l_{32}$ and $S_1$ of the L number as they appear in flip-flop $L_2$ are added to the corresponding digits $x_1$–$x_{32}$ and $S_x$ of the X number as they appear in flip-flop $X_2$. The resultant sum digits as they are formed are placed in the $X_3$ flip-flop so as to continue normal recirculation of the new X number without any delay. The successive carry digits formed are placed in flip-flop C, each carry digit being utilized in the formation of the sum digit. Since flip-flop C is initially in its 0 state, this has the effect of providing an initial 0-valued carry digit for use in forming the first sum digit. The ordinary rules for binary addition of three input digits (X digit, L digit and carry digit) are applied—that is the sum digit will be "1" if one or three of the input digits are 1 and otherwise 0; while the carry digit will be 1 if any two of the input digits are 1 and is otherwise 0.

Accordingly, after noting that the L digits $l_1$–$l_{32}$ and $S_1$ appear in flip-flop $L_2$ at times $IT'X'_3$, the conventional sum term defining the formation of 1-valued sum digits in flip-flop $X_3$ may be immediately written:

$$S_pX_3 = IT'X'_3(A_1+T_0)[L_2(C'X'_2+CX_2)+L'_2(CX'_2+C'X_2)] \quad (16)$$

It should be noted that a corresponding $Z_pX_3$ term for the formation of 0-valued sum digits in flip-flop $X_3$ is not required, since it is known that flip-flop $X_3$ will in each instance already be in a 0 state immediately before a sum digit is to be placed because of the passage of the preceding 0-value digits (shown in Fig. 3 between the digits of the X number) through the flip-flop.

In considering the terms defining the formation of the corresponding carry digits in flip-flop C, it will be understood that it is only necessary to set flip-flop C if the preceding carry digit was a 0 and the new carry digit is to be a 1 (so that flip-flop C is in its 0 state and must be set to its 1 state). Thus in accordance with the hereinbefore explained rules for the formation of carry digits it is clear that flip-flop C is to be set only when it initially contains a 0 carry digit and the other two digits (in flip-flops $L_2$ and $X_2$) are both 1's. The term defining the formation of 1-valued carry digits in flip-flop C is therefore:

$$S_pC = IT'X'_3(A_1+T_0)C'X_2L_2 \quad (17)$$

Similarly, it will be understood that for the formation of 0-valued carry digits in flip-flop C, it is only necessary to zero flip-flop C at times when it contains a 1-valued previous carry digit and the other two digits (in flip-flops $L_2$ and $X_2$) are both 0's, the term defining this operation therefore being:

$$Z_pC = IT'X'_3(A_1+T_0)CX'_2L'_2 \quad (18)$$

(*c*) In the performance of the $T_0$ ($\text{Test}_0$) instruction (and also for the $T_1$ instruction)—the sign digit $S_x$ of the new number formed in the X channel is copied reversed in value into flip-flop C, this operation being performed at the time (time $ITX'_1X_2$) that the new sign digit $S_x$ appears in flip-flop $X_3$ and mark $m_3$ appears in flip-flop $X_2$. The terms defining this operation are, therefore:

$$S_pC = (T_0+T_1)ITX'_1X_2X'_3 \quad (19)$$

$$Z_pC = (T_0+T_1)ITX'_1X_2X_3 \quad (20)$$

It is clear from a consideration of terms 19 and 20 that flip-flop C will be set to its 1 or 0 states, respectively, in accordance with the sign digit $S_x$ in flip-flop $X_3$ being 0 (negative) or 1 (positive). As indicated by Eq. 47a for the Step signal, the instruction in the next word will be accepted if the new number in the X channel is positive and will be skipped if the new number is negative.

(*d*) The instructions $A_1$ or $T_0$ contained in the instruction register are erased therefrom at the beginning of the next word, this being accomplished by zeroing (under the control of the *Ze* signal) all of the instruction register flip-flops P, Q, R, S, K, D at the same time (time $ITX'_1X_2$) as the sign digit is found in flip-flop C. The terms defining these operations are:

$$Ze_p = ITX'_1X_2(A_1+T_0) \quad (21)$$

$$Z_pP = Ze \quad (22)$$

$$Z_pQ = Ze \quad (23)$$

$$Z_pR = Ze \quad (24)$$

$$Z_pS = Ze \quad (25)$$

$$Z_pK = Ze \quad (26)$$

$$Z_pD = Ze \quad (27)$$

(*e*) To insure that the effect of a test instruction will be limited only to the acceptance or skipping of the next instruction and will not affect subsequent instructions, the C flip-flop is normally automatically zeroed after the passage of each instruction, provided however that the instruction register does not contain any of the instructions $\overline{X}$ or $S_1$ or $T_1$. The reasons for these exceptions will be explained later in connection with discussion of these instructions. The described zeroing of flip-flop C is accomplished at the time (time $ITX_1X_2$) that marks $n_2$ and $m_2$ appear in flip-flops $X_1$ and $X_2$, respectively and is therefore defined by the following term:

$$Z_pC = ITX_1X_2\overline{X}'S'_1T'_1 \quad (28)$$

PERFORMANCE OF THE SUBTRACT ($S_1$) AND TEST ($T_1$) INSTRUCTIONS

In response to either of these instructions in a word, the L number of the word is subtracted from the X number, the difference appearing as a new X number. In addition in response to the $T_1$ instruction the sign digit of the resultant difference is copied into the C flip-flop to control skipping of the next instruction. Subtraction is accomplished in a conventional manner by complementing (reversing) all of the digits of the L number as they appear and thereafter proceeding as in addition but with an initial 1-valued carry digit being utilized in the formation of the first digit of the difference. The successive operations performed are listed below:

(*a*) The digits of the instruction are shifted into the instruction register in the manner hereinbefore explained in connection with Eq. 47a for the Step signal and terms 5 through 15. Hereinafter the shifting in of instructions, will not again be commented on, since this operation is uniform for all instructions.

(*b*) An initial 1-valued carry digit is placed in flip-flop C at the time (time $ITX_1X_2$) the reading of the instruction has been completed, this operation being defined by the following term:

$$S_pC = ITX_1X_2(S_1+T_1) \quad 29$$

To avoid any interference with this operation, the normal zeroing of flip-flop C at this time is suppressed whenever the $S_1$ or $T_1$ instructions are contained in the instruction register, as defined by term 28 hereinbefore presented.

(*c*) The digits of the L number (as they appear in flip-flop $L_2$) are added reversed in value to the corresponding digits (appearing in flip-flop $X_2$) of the X number to thereby perform a subtraction, the digits of the resultant difference being placed in flip-flop $X_3$ and the corresponding carry digits being placed in flip-flop C. As explained before flip-flop C initially contains a 1-valued carry digit, as required by this type of subtraction.

The term defining the formation of 1-valued difference digits in flip-flop $X_3$ is therefore:

$$S_pX_3 = IT'X'_3(S_1+T_1)[L'_2(C'X'_2+CX_2)+L_2(CX'_2+C'X_2)] \quad 30$$

in which, as contrasted with the normal sum term 16, each signal $L_2$ has been replaced by the complementary or reversed-valued signal $L'_2$. As explained in connection with term 16, no term is required for the formation of 0-valued digits in $X_3$.

In this same manner, the formation of carry digits in flip-flop C may be defined by the following terms:

$$S_pC = IT'X'_3(S_1+T_1)C'X_2L'_2 \quad 31$$

$$Z_pC = IT'X'_3(S_1+T_1)CX'_2L_2 \quad 32$$

wherein, as contrasted with the normal carry terms 17 and 18, each signal $L_2$ is replaced by the complementary signal $L'_2$.

(*d*) In response to the $T_1$ instruction, the sign digit $S_x$ of the new X number is copied reversed in value into the C flip-flop as defined by terms 19 and 20 hereinbefore explained.

(*e*) The $S_1$ or $T_1$ instruction is erased from the instruction register at the beginning of the next word, under the control of the *Ze* signal. The term in the *Ze* equation defining this operation is:

$$Ze_p = ITX'_1X_2(S_1+T_1) \quad 33$$

Resultant zeroing of the instruction register flip-flops P, Q, R, S, K, D is defined by terms 22 through 27 hereinbefore explained.

(*f*) Any instruction skipping caused the $T_1$ instruction is ended when flip-flop C is zeroed during the passage of the next word as defined by term 28 hereinbefore explained.

PERFORMANCE OF THE JUMP OR UNCONDITIONAL TRANSFER ($U_0$) INSTRUCTION

In response to the $U_0$ instruction in a word of the L block, the point of computation is transferred to a desired remote word within the L block as designated by the position of a single 1-valued digit stored in one of the 32 cells of the number portion of the word containing the $U_0$ instruction. To accomplish this, the 1-valued digit as it appears in flip-flop $L_2$ is coppied (via flip-flop $Y_3$) into the corresponding cell of the Y channel, where it remains, precessing two cells (to the left as shown in Fig. 3) for each passage of a word in the L–B channel. Computation thereafter is suspended (no further instructions are accepted) until the digit in the Y channel has precessed to the $S_p$ position appearing in flip-flop $Y_3$ at the same time that mark $m_3$ appears in flip-flop $X_2$. The occurrence of this event indicates that the desired remote L word is beginning its passage and therefore computation is begun again by accepting the instruction contained in this word.

The successive operations performed are listed below:

(*a*) After the $U_0$ instruction in a word has been shifted into the instruction register, all digits in the number portion of the word, as they appear (at times $IT'X'_3$) in flip-flop $L_2$ are copied into flip-flop $Y_3$. Thus any 1-valued digit in the number portion of the L word is copied into the corresponding cell in the Y channel. The terms defining this copying operation are:

$$S_pY_3 = IT'X'_3L_2U_0 \quad 34$$

$$Z_pY_3 = IT'X'_3L'_2U_0 \quad 35$$

(*b*) Computation is suspended by automatically changing the instruction from $U_0$ (111000 in P, Q, R, S, K, D) to $U_1$ (010010 in P, Q, R, S, K, D) at the beginning of the next word when mark $m_3$ appears in flip-flop $X_2$ (time $ITX'_1X_2$). Since the $U_1$ instruction has the digit sequence 1, 0 in flip-flop Q and R, as defined by Eq. 47a for the signal Step, no further instructions can be accepted until the $U_1$ instruction is removed. The transition from $U_0$ to $U_1$ is accomplished by zeroing flip-flops P and R and setting flip-flop K at the indicated time (time $ITX'_1X_2$). The described transitions are therefore defined by the following terms:

$$Z_pP = ITX'_1X_2U_0 \quad 36$$

$$Z_pR = ITX'_1X_2U_0 \quad 37$$

$$S_pK = ITX'_1X_2U_0 \quad 38$$

(*c*) For the duration of the $U_1$ instruction, digits appearing in the number portion of the Y channel are merely recirculated without change, being copied as they appear in flip-flop $Y_2$ (at times $IT'X'_3$) directly into flip-flop $Y_3$. In this manner, since the Y channel has two more cells than a word of the L–B channel, the digits in the Y channel precess in the described manner relative to the signals in the words of the L–B channel. The terms defining the recirculation of digits from flip-flop $Y_2$ into flip-flop $Y_3$ are therefore:

$$S_pY_3 = IT'X'_3Y_2U_1 \quad 39$$

$$Z_pY_3 = IT'X'_3Y'_2U_1 \quad 40$$

(*d*) The $U_1$ instruction is removed (by zeroing all of the instruction register flip-flops under the control of the *Ze* signal) when a 1-valued digit appears in flip-flop $Y_3$ at the same time (time $ITX'_1X_2$) that mark $m_3$ appears in flip-flop $X_2$. The term defining this operation is:

$$Ze_D = ITX'_1X_2U_1Y_3$$
41

Thereafter the next appearing instruction is accepted and computation begins again at the desired remote word.

(e) Digits precessing in the Y channel are erased after they have been used to prevent their interfering with later operations. To accomplish this erasure, flip-flop $Y_3$ is uniformly zeroed whenever signal I is low. Thus whenever a digit, after it has been used, precesses out of the number portion of the Y channel (for which signal I is high) and into a portion for which signal I is low, the precessing digit is effectively erased. The term defining the described zeroing of flip-flop $Y_3$ is:

$$Z_DY_3 = I'$$
42

PERFORMANCE OF THE WAIT ($W_0$) INSTRUCTION

The Wait instruction is ordinarily utilized in a word preceding such instructions as P*b*, T*b*, $\underline{X}$ and $Br_0$ which affect the B block, and are intended to operate not upon an old B block (which is about to be returned to the W channel) but rather upon a new B block (which has just been read from the W channel). Since a new B block is not utilized until Read has been completed and Preexchange entered, the Wait instructions may be used preceding these particular instructions (P*b*, T*b*, $\underline{X}$ and $Br_0$) and has the effect whenever it is accepted of suspending further computation (no further instructions being accepted) until the block program Preexchange is entered, computation then beginning again at the word following the $W_0$ instruction as identified by a flag (*f*) tab initially left behind in the word containing the $W_0$ instruction. The successive operations performed are listed below:

(a) After a $W_0$ instruction has been shifted into the instruction register, a flag (*f*) tab is inserted in the word containing the $W_0$ instruction by setting flip-flop $L_2$ at the time (time $I'T'X_1X_3$) that the flag cell appears in flip-flop $L_1$, thereby inserting the flag tab without introducing any delay in the recirculation thereof. The term defining the insertion of the flag in flip-flop $L^2$ is therefore:

$$S_DL_2 = I'T'X_1X_3L'_1W_0$$
43 and the corresponding term which defines the normal recirculation at this time of the flag cell, when the instruction is not $W_0$ and the flag is not to be inserted is:

$$Z_DL_2 = I'T'X_1X_3L'_1W'_0Br'_0\tau'_0$$
44

The inclusion in term 44 of the signals $Br'_0$ and $\tau'_0$ will be explained later in connection with the corresponding operations.

(b) To suspend further computation, the $W_0$ instruction (110010 in P, Q, R, S, K, D), as well as all other W instructions, prevent further acceptance of instructions because of the digits 1, 0 in flip-flops Q and R. At the beginning of the next word ($ITX'_1X_2$) the $W_0$ instruction is changed to a $W_1$ instruction (110110 in P, Q, R, S, K, D) by setting flip-flop S. The term defining this setting of flip-flop S is:

$$S_DS = ITX'_1X_2W_0$$
45

(c) So long as the $W_1$ instruction remains in the instruction register the flag (*f*) tab is recirculated without change, it being copied as it appears in flip-flop $L_1$ (at time $I'T'X_1X_3$) directly into flip-flop $L_2$. The term defining this operation is:

$$S_DL_2 = I'T'X_1X_3L_1(W_1 + Br_1Rd')$$
46

The significance of $Br_1Rd'$ will be apparent from the subsequent operations described below.

(d) Instruction $W_1$ (110110 in P, Q, R, S, K, D) is changed to instruction $W_2$ (110111 in P, Q, R, S, K, D) when the block program Preexchange ($B'_1B'_2$, $t_a^* = 1$) is entered, this being accomplished by setting flip-flop D at the time (time $I'TX_2L_1$) in Preexchange that the fiducial mark * appears in flip-flop $L_1$ and the $t_a^*$ tab appears in flip-flop $L_2$. The term defining this operation is:

$$S_DD = I'TX_2L_1L_2B'_1B'_2W_1$$
47

(e) Instruction $W_2$ will hold until flag *f* appears, the instruction $W_2$ then being removed by zeroing the instruction register flip-flops under the control of the *Ze* signal at the time (time $I'T'X_1X_3$) that the flag appears in flip-flop $L_1$. The term defining this operation is:

$$Ze_D = I'T'X_1X_3L_1W_2$$
48

Thereafter succeeding instructions will be accepted in normal manner.

(f) At the same time (time $I'T'X_1X_3$) instruction $W_2$ is to be removed, flag *f* is erased (as it appears in flip-flop $L_1$) by zeroing flip-flop $L_2$. The term defining this erasure is:

$$Z_DL_2 = I'T'X_1X_3L_1W'_1(Br'_1 + Rd)$$
49

The reasons for the inclusion in term 49 of the expression ($Br'_1 + Rd$) will be explained later in connection with the corresponding operations.

PERFORMANCE OF THE PUT AND TAKE INSTRUCTIONS ($Pb_0$, $Pl_0$, $Tb_0$ and $Tl_0$)

Performance of these four instructions will be considered together because of their great similarities. It will be remembered that in response to the $Pb_0$ or $Pl_0$ instructions further computation is suspended until the X number has been copied into one or more specified remote words of the L or B blocks respectively, as designated by the positions of corresponding digits stored in the number portion of the word containing the $Pl_0$ or $Pb_0$ instruction. Computation thereafter begins again at the word following the $Pl_0$ or $Pb_0$ instruction, as identified by flag tab *f* initially left behind in the word containing the instruction.

The $Tl_0$ and $Tb_0$ instructions are similarly performed, differing only in that in response to these instructions the L or B number respectively, of a specified word is copied into the X number rather than vice-versa.

In identifying or addressing to the desired remote words, the digits stored in the number portion of the word containing the put or take instruction are utilized in the same manner as has already been described in connection with the Unconditional Transfer ($U_0$) instruction—that is that the digits are copied into the Y channel and allowed to precess there until they emerge at the proper times to identify the desired words.

The successive operations performed are listed below. In considering these, it should be remembered that signal $\tau_0$ at its high level indicates that any one of the instructions $Pb_0$, $Pl_0$, $Tb_0$ and $Tl_0$ is contained in the instruction register. Similarly signal $\tau_1$ at its high level indicates that any one of the subordinate instructions $Pb_1$, $Pl_1$, $Tb_1$ and $Tl_1$ are contained therein; and signal $\tau_2$ at its high level indicates that any one of the subordinate instructions $Pb_2$, $Pl_2$, $Tb_2$ and $Tl_2$ is contained therein.

I. ($\tau_0$ At A high level): After any of the put or take instruction $Pb_0$, $Pl_0$, $Tb_0$ or $Tl_0$ has been shifted into the instruction register; first flag tab $f$ is inserted into the word containing the instruction; then the number portion of this word is copied into the Y channel, and finally, at the beginning of the next word, instructions $Pb_0$, $Pl_0$, $Tb_0$ or $Tl_0$ is changed to corresponding subordinate instructions $Pb_1$, $Pl_1$, $Tb_1$ or $Tl_1$, respectively.

(*a*) Flag tab $f$ is inserted by setting flip-flop $L_2$ at the time (time $I'T'X_1X_3$) that the flag cell appears in flip-flop $L_1$. The term defining this is:

$$S_DL_2=I'T'X_1X_3L'_1\tau_0$$
50

The term defining normal recirculation of the flag ($f$) cell in the absence of a $\tau_0$ instruction is term 44 hereinbefore presented.

(*b*) The number portion of the word is copied into the Y channel by setting or zeroing flip-flop $Y_3$ in accordance with the states of flip-flop $L_2$ at the times (times $IT'X'_3$) that the digits of the number appear in $L_2$. The corresponding terms are:

$$S_DY_3=IT'X'_3L_2\tau_0$$
51

$$Z_DY_3=IT'X'_3L'_2\tau_0$$
52

(*c*) The manner in which the transitions from the $Pb_0$, $Pl_0$, $Tb_0$ or $Tl_0$ instructions to the corresponding $Pb_1$, $Pl_1$, $Tb_1$ or $Tl_1$ instructions are accomplished is shown in the following table, Table 6.

TABLE 6

| Transitions | States of— | | | | | | Operations Required (at time $ITX'_1X_3$) |
|---|---|---|---|---|---|---|---|
| | P | Q | R | S | K | D | |
| $Pb_0$ to $Pb_1$ | 1 | 1 | 1 | 0 | 1 | 0 | Zero P, Zero R, Set S |
| | ↓ 0 | 1 | ↓ 0 | ↓ 1 | 1 | 0 | |
| $Pl_0$ to $Pl_1$ | 1 | 1 | 1 | 1 | 1 | 0 | Zero P, Zero R, Zero K |
| | ↓ 0 | 1 | ↓ 0 | 1 | ↓ 0 | 0 | |
| $Tb_0$ to $Tb_1$ | 1 | 1 | 1 | 0 | 1 | 1 | Zero P, Zero R, Set S |
| | ↓ 0 | 1 | ↓ 0 | ↓ 1 | 1 | 1 | |
| $Tl_0$ to $Tl_1$ | 1 | 1 | 1 | 1 | 0 | 1 | Zero P, Zero R |
| | ↓ 0 | 1 | ↓ 0 | 1 | 0 | 1 | |

The zeroing of flip-flops P and R as required by all of the transitions is defined by the following terms:

$$Z_DP=ITX'_1X_2\tau_0$$
53

$$Z_DR=ITX'_1X_2\tau_0$$
54

The setting of flip-flop S, as required by the transitions $Pb_0$ to $Pb_1$ and $Tb_0$ to $Tb_1$ is defined by the following term:

$$S_DS=ITX'_1X_2(Tb_0+Pb_0)$$
55

The zeroing of flip-flop K, as required by the $Pl_0$ to $Pl_1$ transition is defined by the following term:

$$Z_DK=ITX'_1X_2Pl_0$$
56

II. ($\tau_1$ At A high level): While any of the instructions $Pb_1$, $Pl_1$, $Tb_1$, $Tl_1$ is contained in the instruction register; the digits which have been copied into the Y channel are recirculated so that they precess in normal fashion; next whenever a precessing digit appears in $Y_3$ at the beginning of a word, flip-flop C is set to indicate that a desired word has been reached; and finally at the middle of that word in response to flip-flop C being in its 1 state, the instruction is changed from $Pb_1$, $Pl_1$, $Tb_1$, $Tl_1$ to $Pb_2$, $Pl_2$, $Tb_2$, $Tl_2$, respectively.

(*a*) Automatic recirculation (and hence precession) of the digits transferred to the Y channel is defined by the following terms:

$$S_DY_3=IT'X'_3Y_2\tau_1$$
57

$$Z_DY_3=IT'X'_3Y'_2\tau_1$$
58

(*b*) Flip-flop C is set when a precessing digit appears in $Y_3$ at the same time (time $ITX'_1X_2$) that mark $m_3$ appears in $X_2$, this being defined by the following term:

$$S_DC=ITX'_1X_2Y_3(\tau_1+\tau_2)$$
59

The reasons for the inclusion of the signal $\tau_2$ in term 59 will be explained later.

(*c*) At the middle of the following word, at the time (time $I'T'X_1X_3$) that mark $m_2$ appears in the flip-flop $X_1$, if flip-flop C is in its 1 state, the instructions $Pb_1$, $Pl_1$, $Tb_1$, $Tl_1$ are changed to the corresponding $Pb_2$, $Pl_2$, $Tb_2$, $Tl_2$ instructions in accordance with the following table, Table 7.

TABLE 7

| Transition | States of— | | | | | | Operation Required |
|---|---|---|---|---|---|---|---|
| | P | Q | R | S | K | D | |
| $Pb_1$ to $Pb_2$ | 0 | 1 | 0 | 1 | 1 | 0 | Zero Q |
| | 0 | ↓ 0 | ↓ 1 | 1 | 1 | 0 | Set R |
| $Pl_1$ to $Pl_2$ | 0 | 1 | 0 | 1 | 0 | 0 | Zero Q |
| | 0 | ↓ 0 | ↓ 1 | 1 | 0 | 0 | Set R |
| $Tb_1$ to $Tl_2$ | 0 | 1 | 0 | 1 | 1 | 1 | |
| | 0 | 1 | ↓ 1 | 1 | 1 | 1 | Set R |
| $Tl_1$ to $Tl_2$ | 0 | 1 | 0 | 1 | 0 | 1 | |
| | 0 | 1 | ↓ 1 | 1 | 0 | 1 | Set R |

The setting of flip-flop R as required by all of the transitions is defined by the following term:

$$S_DR=I'T'X_1X_3C\tau_1$$
60

The zeroing of flip-flop Q, as required by the $Pb_1$ to $Pb_2$ and $Pl_1$ to $Pl_2$ transitions is defined by the following term:

$$Z_DQ=I'T'X_1X_3C(Pl_1+Pb_1)$$
61

Immediately after these instruction transitions are effected, the C flip-flop is returned to its normal 0 state, this being accomplished by zeroing flip-flop C at time $ITX_1X_2$ as defined by term 28 hereinbefore presented.

III. ($\tau_2$ At A high level): While the instruction $Pb_2$ or $Pl_2$ is contained in the instruction register during passage of the number portion of a word, the X number is copied into the word as an L or B number respectively, while when either of the instructions $Tb_2$ or $Tl_2$ is contained in the instruction register during passage of the number portion of a word the L or B number respectively, is copied as an X number. At the beginning of the next word, the instructions $Pb_2$, $Pl_2$, $Tb_2$, $Tl_2$ are changed back to $Pb_1$, $Pl_1$, $Tb_1$, $Tl_1$, respectively to thereby end the copying operation.

(*a*) The manner in which the copying operations are effected while $\tau_2$ is at a high level is summarized by the following table, Table 8.

TABLE 8

| Instruction | Operation |
|---|---|
| $Pb_2$ | Digits of X number as they appear in $X_1$ are copied into $L_3$. |
| $Pl_2$ | Digits of X number as they appear in $X_2$ are copied into $L_3$. |
| $Tb_2$ | Digits of B number as they appear in $L_3$ are copied into $X_3$. |
| $Tl_2$ | Digits of L number as they appear in $L_2$ are copied into $X_3$. |

The above described $Pb_2$, $Pl_2$, $Tb_2$, $Tl_2$ copying operations are defined by the following terms:

$$S_pL_3 = IT(X'_1 + X'_2)Pb_2X_1 \quad (62)$$

$$Z_pL_3 = IT(X'_1 + X'_2)Pb_2X'_1 \quad (63)$$

$$S_pL_3 = IT'Pl_2X_2 \quad (64)$$

$$Z_pL_3 = IT'Pl_2X'_2 \quad (65)$$

$$S_pX_3 = IT'X'_3Tb_2L_3 \quad (66)$$

$$S_pX_3 = IT'X'_3Tl_2L_2 \quad (67)$$

As explained, terms 62, 63 and 64, 65 define the copying of the digits of the X number into the B and L numbers, respectively in accordance with the $Pb_2$ and $Pl_2$ instructions, respectively. It will be recognized that normally in the absence of these instructions the digits of the B and L numbers will be recirculated without change (from flip-flop $L_2$ to flip-flop $L_3$). The terms defining the recirculation of the digits of the B number in the absence ($Pb'_2$) of the $Pb_2$ instructions is the following:

$$S_pL_3 = IT(X'_1 + X'_2)Pb'_2Ex'L_2 \quad (68)$$

$$Z_pL_3 = IT(X'_1 + X'_2)Pb'_2Ex'L'_2 \quad (69)$$

The reason for the inclusion of the signal $Ex'$ in terms 68 and 69 will be explained later in connection with discussion of the Exchange block program.

Similar normal recirculation terms are provided in connection with terms 66 and 67 which define the copying of 1-valued digits into the X number in accordance with the $Tb_2$ and $Tl_2$ instructions. It will be noted with respect to terms 66 and 67 that corresponding terms for the copying of 0-valued digits are not required, since each digit of the X number is preceded by a 0-valued signal shown in Fig. 4.

The terms defining the normal recirculation of such 0-valued signals from $X_2$ to $X_3$ in the X channel (and in fact defining the recirculation of all signals appearing in $X_2$ at time T) are the following terms:

$$S_pX_3 = TX_2 \quad (70)$$

$$Z_pX_3 = TX'_2 \quad (71)$$

The term defining the normal recirculation from $X_2$ to $X_3$ of the digits of the X number in the absence of the $Tb_2$ or $Tl_2$ instructions (and also in the absence of the $A_1$, $T_0$, $S_1$ or $T_1$ instruction) is the following term:

$$S_pX_3 = IT'[X_3 + Tl'_2Tb'_2A'_1T'_0S'_1T'_1]X_2 \quad (72)$$

Term 72 it is seen also defines the normal recirculation from $X_2$ to $X_3$ of all other digits of the X channel which appear in flip-flop $X_2$ at time $IT'$.

(*b*) After copying is completed into or from a given word of the L–B channel, the $Pb_2$, $Pl_2$, $Tb_2$ or $Tl_2$ instruction is changed back to the respective $Pb_1$, $Pl_1$, $Tb_1$ or $Tl_1$ instruction respectively at the beginning of the next word at the time (time $ITX'_1X_2$) that mark $m_3$ appears in $X_2$, the transitions in the instruction being accomplished as shown in the following table, Table 9.

TABLE 9

| Transition | States of— | | | | | | Operation Required |
|---|---|---|---|---|---|---|---|
| | P | Q | R | S | K | D | |
| $Pb_2$ to $Pb_1$ | 0 | 0 | 1 | 1 | 1 | 0 | Set Q |
| | 0 | 1 | 0 | 1 | 1 | 0 | Zero R |
| $Pl_2$ to $Pl_1$ | 0 | 0 | 1 | 1 | 0 | 0 | Set Q |
| | 0 | 1 | 0 | 1 | 0 | 0 | Zero R |
| $Tb_2$ to $Tb_1$ | 0 | 1 | 1 | 1 | 1 | 1 | |
| | 0 | 1 | 0 | 1 | 1 | 1 | Zero R |
| $Tl_2$ to $Tl_1$ | 0 | 1 | 1 | 1 | 0 | 1 | |
| | 0 | 1 | 0 | 1 | 0 | 1 | Zero R |

The zeroing of flip-flop R as required by all of the transitions is defined by the following term:

$$Z_pR = ITX'_1X_2\tau_2 \quad (73)$$

The setting of flip-flop Q as required by the $Pb_2$ to $Pb_1$ and $Pl_2$ to $Pl_1$ transitions is defined by the following term:

$$S_pQ = ITX'_1X_2(Pl_2 + Pb_2) \quad (74)$$

IV. If a Put instruction is involved, the operations described above by paragraphs III(*a*) and III(*b*) may be repeated many times during a turn of the L–B channel; that is, repeated once for each word into which the X number is to be copied. Thus for example, after a $Pl_2$ or $Pb_2$ has been changed back after completion of a copying operation, to a $Pl_1$ or $Pb_1$ instruction, flip-flop C may be set again at the beginning of a later word upon emergence of another precessing digit from the Y channel. In this case, instruction $Pl_1$ or $Pb_1$ is changed again to $Pl_2$ or $Pb_2$ to accomplish another copying operation. When numbers in two adjacent words are to be copied, the $Pl_2$ or $Pb_2$ instruction used in the first word will still be in existence at the time (time $ITX'_1X_2$) that flip-flop C is to be set for the next word, and therefore to accomplish the proper setting of flip-flop C for this situation the signal $\tau_2$ is included in term 59 hereinabove presented.

Eventually however all copying operations will have been completed, so that thereafter the instruction $Pb_1$, $Pl_1$, $Tb_1$ or $Tl_1$ remains unchanged, no further computation or copying operations being effected. This condition until the flag (*f*) reappears indicating a complete turn of the L–B channel has been completed so that the word which contained the original Put or Take instruction has reappeared. At this time (time $I'T'X_1X_3$) the flag is erased and the instruction $Pb_1$, $Pl_1$, $Tb_1$ or $Tl_1$ is removed from the instruction register by zeroing all of the instruction register flip-flops under the control of the $Ze$ signal. Thus the instruction of the word following the flag will be accepted and computation will begin again with this word.

(*a*) Erasure of flag *f* at the time (time $I'T'X_1X_3$) that it reappears (in flip-flop $L_1$) is accomplished by zeroing flip-flop $L_2$ at this time as defined by term 49 presented hereinbefore.

(*b*) The zeroing of all of the instruction register flip-flops under the control of the *Ze* signal at the time (time $I'T'X_1X_3$) that flag *f* reappears is defined by the following term:

$$Ze_D=I'T'X_1X_3L_1r_1$$
75

PERFORMANCE OF THE BRANCH $_0(Br_0)$ INSTRUCTION

The $Br_0$ instruction in an L block permits the computer to write in a new B block $Bl_k$ over the normal successor block $Bl_j$ in the L–B channel. The $Br_0$ instruction is placed in word $W_j$ of the L block and is normally preceded by both Wait and Test instructions so that: (1) The $Br_0$ instruction may selectively be accepted or not accepted in accordance with the test instruction; and (2) will be accepted, if at all, only in Preexchange—at a time therefore when the normal successor block $Bl_j$ (as identified by a $t_0$ tab in word $W_j$) has already been read from the W channel as the normal B block.

If the $Br_0$ instruction in word $W_j$ is not accepted, block $Bl_j$ is undisturbed and the normal block program continues; but if the $Br_0$ instruction in $W_j$ is accepted the $t_0$ tab in word $W_j$ is erased, a flag *f* is inserted in the word, a new $t_0$ tab is inserted in word $W_k$, and the Read program is reentered so that block $Bl_k$ (as identified by the new $t_0$ tab in word $W_k$) is read from the W channel as a B block, thereby replacing the previously read block $B_j$.

During Read, the Branch instruction is removed from the instruction register when word $W_j$ appears (as identified by appearance of flag tab *f* inserted in word $W_j$ when the Branch instruction was initially accepted) and normal computation therefore begins again at word $W_{j+1}$. The successive operations performed are listed and described hereinbelow:

I. (Signal $Br_0$ at A high level): After the $Br_0$ instruction in word $W_j$ has been shifted into the instruction register flip-flops, tab $t_0$ in word $W_j$ is erased as it is transferred from flip-flop $L_1$ to flip-flop $L_2$ and a flag tab *f* is inserted in word $W_j$ at the time that the flag cell transfers from flip-flop $L_1$ to flip-flop $L_2$. The number portion of word $W_j$ contains a digit designating the address of word $W_k$. The number portion is copied into the Y channel and is precessed therein, as explained above, to identify word $W_k$. At the completion of passage of word $W_j$ the $Br_0$ instruction is changed to the subordinate $Br_1$ instruction.

(*a*) Erasure of tab $t_0$ in word $W_j$ at the time (time $I'TX'_2X_3$) that it appears in $L_1$ during Preexchange ($B'_1B'_2$) is defined by the following term:

$$Z_DL_2=I'TX'_2X_3B'_1B'_2Br_0L_1$$
76

Normal recirculation of tab $t_0$ from flip-flop $L_1$ to flip-flop $L_2$ at times when the $Br_0$ instruction is not contained in the instruction register is defined by the following term:

$$S_DL_2=I'TX'_2X_3B'_1B'_2Br'_0L_1$$
77

(*b*) The insertion of flag tab *f* in word $W_j$ at the time (time $I'T'X_1X_3$) that the flag cell appears in $L_1$ is defined by the following term:

$$S_DL_2=I'T'X_1X_3L'_1Br_0$$
78

Normal recirculation of the flag cell in the absence of the $Br_0$ instruction is defined by term 44 presented hereinbefore.

(*c*) Copying of the digits of the number portion of word $W_j$ into the Y channel is accomplished at the times (times $IT'X'_3$) that these digits appear in flip-flop $L_2$, these digits being copied into flip-flop $Y_3$ as defined by the following terms:

$$S_DY_3=IT'X'_3L_2Br_0$$
79

$$Z_DY_3=IT'X'_3L'_2Br_0$$
80

(*d*) The $Br_0$ instruction (111001 in P, Q, R, S, K, D) is changed to the $Br_1$ instruction (110001 in P, Q, R, S, K, D) by zeroing flip-flop R at the beginning of the next word at the time (time $ITX'_1X_2$) that mark $m_3$ appears in flip-flop $X_2$. The term defining this zeroing of flip-flop R is:

$$Z_DR=ITX'_1X_2Br_0$$
81

II. (Signal $Br_1$ at A high level): While the $Br_1$ instruction is contained in the instruction register the digits copied into the Y channel are recirculated there, so that they precess in normal fashion with respect to signals in the L channel. When a 1-valued digit has precessed so that it appears in flip-flop $Y_3$ at the same time that mark $m_3$ appears in flip-flop $X_2$ (thereby identifying the beginning of word $W_k$), flip-flop C is set to its 1 state to memorize this event. During passage of word $W_k$ (as identified by $C=1$ and the presence of the $Br_1$ instruction) a new tab $t_0$ is inserted in the word to thereby designate block $Bl_k$ as the new successor block.

After the new $t_0$ tab is inserted in word $W_k$, the computer remains in its Preexchange block program until $t_a$–$t_0$ tab coincidence is obtained in word $W_k$ (indicating that block $Bl_k$ will appear next in the W channel), the *v* signal is changed to memorize this event, and precinct verification is obtained in word W33 (thus indicating that the desired block $Bl_k$ is beginning its passage).

At this time the Preexchange block program ($B'_1B'_2$, $t_a^*=1$) is changed to the second phase ($B_1B_2$, $t_a^*=$) of the Read block program. Therefore, the desired block $Bl_k$ is read from the W channel as a new B block during the next turn of the L–B channel, thereby replacing the normal successor block $Bl_j$. During this one turn of the Read program, the flag tab *f* is erased as it appears in word $W_j$ and, simultaneously, the $Br_1$ instruction is removed from the instruction register so that computation begins again at word $W_{j+1}$.

(*a*) Recirculation of digits (from flip-flop $Y_2$ to flip-flop $Y_3$) in the Y channel is defined by the following terms:

$$S_DY_3=IT'X'_3Y_2Br_1$$
82

$$Z_DY_3=IT'X'_3Y'_2Br_1$$
83

(*b*) Setting of flip-flop C at the beginning of word $W_k$ in response to the appearance of a 1-valued digit in flip-flop $Y_3$ is defined by the following term:

$$S_DC=ITX'_1X_2Y_3Br_1$$
84

Flip-flop C will not be zeroed again until the appearance of mark $m_2$ in flip-flop $X_2$ as defined by term 28 presented hereinabove.

(*c*) The $t_0$ tab is inserted in word $W_k$ by setting flip-flop $L_2$ at that time during Preexchange in which the $t_0$ tab cell of word $W_k$ appears in flip-flop $L_1$. Word $W_k$ is identified at this time by the fact that flip-flop C is in its 1 state and the $Br_1$ instruction is contained in the instruction register. The term defining the insertion of the $t_0$ tab in word $W_k$ is therefore the following:

$$S_DL_2=I'TX'_2X_3B'_1B'_2Br_1CL'_1$$
85

Normal recirculation of the $t_0$ tab (from flip-flop $L_1$ to flip-flop $L_2$) after it has been inserted in word $W_k$ is defined by term 77 hereinbefore presented.

Normal recirculation of the $t_0$ tab cell from flip-flop $L_1$ to flip-flop $L_2$ at times when it contains a 0-valued signal and a tab is not being inserted therein is defined by the following term:

$$Z_pL_2=I'TX'_2X_3L'_1(Br'_1+C')$$
86

(*d*) Preexchange ($B'_1B'_2$, $t_a=1$) continues. When tab coincidence occurs during a turn of the L–B channel—that is when tab $t_a$ appears in word $W_k$ in flip-flop $L_1$ at the same time that the new tab $t_0$ appears in flip-flop $L_2$, the $v$ signal in the X channel is changed to its 1 value by setting flip-flop $X_3$. The term defining this operation is the following:

$$S_pX_3=I'T'X_1X'_3B'_1X'_2L_1L_2$$
87

Thereafter the 1-valued $v$ signal is recirculated without change for the remainder of the turn of the L–B channel as defined by the following term:

$$S_pX_3=I'T'X_1X'_3B'_1X_2(L'_1+L_2)$$
88

Precinct verification may or may not be obtained at the end of the turn of the L–B channel (during passage of word W33).

If precinct verification is not obtained, Preexchange continues and the $v$ signal will be erased during the next turn of the L–B channel and will not be reinserted until tab coincidence (in word $W_k$) is again obtained 33 turns later, this time during the passage of the correct precinct of the W channel.

As defined by term 88 presented hereinabove, the $v$ signal will be recirculated during this next turn of the L–B channel until the passage of word $W_{k+1}$ in which $t_a=1$ but $t_0=0$. When $t_a=1$ appears in flip-flop $L_1$ and $t_0=0$ appears in flip-flop $L_2$, the expression $(L'_1+L_2)$ in term 88 is not satisfied and therefore $v=1$ is not transferred at this time from flip-flop $X_2$ to flip-flop $X_3$. Since flip-flop $X_3$ is already in its 0 state because of the passage of the preceding 0-valued signal, this has the effect of changing the $v$ signal to its 0 value. Thus all memory of tab coincidence in the wrong precinct is removed.

Thereafter normal recirculation of $v=0$ continues until in the thirty-third later turn of the L–B channel tab coincidence is again obtained in $W_k$ this time in the correct precinct. The $v$ signal is again changed to its 1 value to memorize this event (as defined by the already presented term 87) and is recirculated (as defined by term 88 presented hereinabove) until precinct verification is obtained during the passage of word W33. At this time, the Preexchange block program ($B'_1B'_2$, $t_a{}^*=1$) is changed to the second phase of the Read block program ($B_1B_2$, $t_a{}^*=1$) so that reading of the alternate successor block $Bl_k$ is initiated.

The change from the Preexchange block program to the second phase of the Read block program is accomplished by setting flip-flops $B_1$ and $B_2$ at the time ($I'TX_2L_1$) that the fiducial mark * appears in flip-flop $L_1$, provided $t_a{}^*=1$ (in flip-flop $L_2$), $v=1$ (in flip-flop $X_3$), and precinct is verified as indicated by $t_0{}^*$ (appearing in flip-flop $L_3$) agreeing in value with signal H. The terms defining this setting of flip-flops $B_1$ and $B_2$ are therefore:

$$S_pB_1=I'TX_2L_1B'_1B'_2L_2X_3(L_3H+L'_3H')Br_1$$
89

$$S_pB_2=I'TX_2L_1B'_1B'_2L_2X_3(L_3H+L'_3H')Br_1$$
90

(*e*) The specific manner in which $Bl_k$ is read from the W channel as a new B block during the second phase of the Read block program will be later clarified in the explanation of the block programs provided hereinbelow.

During the one turn of the L–B channel in which $Bl_k$ is being read, flag tab $f$, which has been recirculating in the L–B channel (as defined by term 46 presented above) is erased when it appears (in word $W_j$) and simultaneously the $Br_1$ instruction is removed from the instruction register by zeroing all of the instruction register flip-flops under the control of the $Ze$ signal.

Flag tab $f$ is erased at the time ($I'T'X_1X_3$) that it appears in flip-flop $L_1$ by zeroing flip-flop $L_2$, as defined by term 49 presented hereinabove.

The simultaneous zeroing of the instruction register flip-flops under the control of the $Ze$ signal is defined by the following term:

$$Ze_p=I'T'X_1X_3L_1RdBr_1$$
91

Computation will thereafter begin again at the following word $W_{j+1}$. At the completion of the turn of the L–B channel block $Bl_k$ will have been read in as the new B block and the normal transition from Read to Preexchange will be accomplished as will be later explained in connection with the block programs.

PERFORMANCE OF THE START-TAPE, STOP-TAPE AND READ-OUT INSTRUCTIONS

These instructions are used together to allow the numbers contained in one or a group of words of an L block to be read out from the computer and recorded by an associated tape recording unit or other suitable recording device.

Suppose for example that the number contained in word W15 of the L block is to be read out and recorded. The Read-out instruction would be contained in word W15, the Start-Tape instruction would be contained in an earlier word, W10 for example and the Stop-Tape instruction would be contained in the following word W11 or some later word.

(*a*) When the Start-Tape instruction (011000) is shifted into the instruction register flip-flops during the passage of word W10, a corresponding output signal called the Start-Tape output signal is produced by matrix 20 as defined by the following single term equation:

$$\text{Start-Tape}=P'QRS'K'D' \qquad (36)$$
92

As shown in Fig. 1 the Start-Tape signal is applied to the external recording unit (not shown) which in response thereto initiates acceleration of a recording tape to its full velocity so that the following numbers may be properly recorded.

The Start-Tape instruction is removed at the beginning of the next word as defined by the following term:

$$Ze_p=ITX'_1X_2\ \text{Start-Tape}$$
93

(*b*) Upon the appearance of word W15 containing the Read-out instruction (110000), the instruction is shifted into the register flip-flops and the auxiliary signal Read-out is produced, as defined by Eq. 42*a* shown in Table 5. During the passage of the number portion of word W15, two signals are produced by matrix 20, a so-called Warning signal which has a high level whenever a digit of the number appears in flip-flop $L_2$, and a Number signal which has a high or low level in accordance with the digit in flip-flop $L_2$ having a 1 or 0 value. The two signals may be recorded in separate channels of the recording, the high levels of signal Warning in one channel serving as a clocking signal which in playback indicate the presence of digits representing signals in the other channel.

The single term equation defining the Warning signal is the following:

$$\text{Warning}=IT'X'_3\ \text{Read-out} \qquad (38)$$
94 and the corresponding single term equation defining the Number signal is the following:

$$\text{Number}=IT'X'_3L_2 \text{ Read-out} \quad (39)$$
95

At the beginning of the next word the Read-out instruction is removed from the instruction register as defined by the following term:

$$Ze_p=ITX'_1X_2 \text{ Read-out}$$
96

(*c*) Thereafter when the Stop-Tape instruction (110100) is shifted into the instruction register the Stop-Tape signal is produced by matrix 20 as defined by the following single term equation:

$$\text{Stop-Tape}=PQR'SK'D' \quad (37)$$
97

This signal is applied to the external recording unit which in response thereto decelerates and stops the recording tape. In this manner the tape is moved at high speed only when useful information is being recorded thereon.

The Stop-Tape instruction is removed from the instruction register at the beginning of the next word as defined by the following term:

$$Ze_p=ITX'_1X_2 \text{ Stop-Tape}$$
98

If additional numbers are to be read out between the Start-Tape and Stop-Tape instructions additional Read-out instructions are utilized, one such instruction being placed in each word containing a number to be read out.

PERFORMANCE OF THE IDLE INSTRUCTION

After the Idle instruction (010000) has been shifted into the instruction register flip-flops, the protective digit sequence 1, 0 will appear in flip-flops Q and R and thereafter, as indicated by Eq. 47*a* for the Step signal, no further instructions can be accepted. Therefore, computation ceases, only normal recirculation continuing, until such time as the Idle instruction is removed from the instruction register flip-flops.

The Idle instruction can only be removed by depressing Start switch 80, this having the effect of producing a high level signal designated $\underline{\text{Start}}$. Upon the appearance of signal $\underline{\text{Start}}$ at its high level, the Idle instruction is removed by zeroing all of the instruction register flip-flops, under the control of auxiliary signal Ze, at the next appearance of the fiducial mark in flip-flop $L_2$ as defined by the following term:

$$Ze_p=I'TX_1X_3L_2 \text{ Idle } \underline{\text{Start}}$$
99

PERFORMANCE OF THE PASS INSTRUCTION

Shifting of the Pass instruction (000000) into the instruction register flip-flops has the effect of placing all of the instruction register flip-flops P, Q, R, S, K, D in their 0 states thus removing any prior instruction. No operations are performed in response to the Pass instruction, the computer merely idling until the instruction in the next word appears and is shifted into the instruction register.

THE BLOCK PROGRAMS

All operational instructions other than the Exchange ($\underline{X}$) instructions have now been described in detail. The $\underline{X}$ instruction is peculiarly identified with initiation of the Exchange block program and will be discussed in connection with the detailed description of the block programs which is provided hereinbelow.

There are certain operations associated with the block programs which are uniformly performed throughout all block programs. For example the fiducial mark (*) is always recirculated (from flip-flop $L_1$ to flip-flop $L_2$ to flip-flop $L_3$) without change during all block programs. The regular transfer of the fiducial mark from flip-flop $L_1$ to flip-flop $L_2$ is defined by the following terms:

$$S_pL_2=I'TX_2L_1$$
100

$$Z_pL_2=I'TX_2L'_1$$
101

The regular transfer of the fiducial mark from flip-flop $L_2$ to flip-flop $L_3$ (and also the transfer of all other signals appearing in flip-flop $L_2$ at times I'T') is defined by the following terms:

$$S_pL_3=I'T'L_2$$
102

$$Z_pL_3=I'T'L'_2$$
103

Another operation, uniformly performed throughout all block programs, is that signals $t_p$ and $t_a$ are uniformly exchanged in all words other than W33 as these signals appear in flip-flops $X_1$ and $L_2$ respectively. Interchange is effected by copying the signal $t_p$ in flip-flop $X_1$ into flip-flop $L_3$ and by simultaneously copying the signal $t_a$ in flip-flop $L_2$ into flip-flop $X_2$. Copying is only done if there is not a fiducial mark in flip-flop $L_1$ thus confining the $t_p$–$t_a$ interchange to words other than W33.

The copying of signal $t_p$ from flip-flop $X_1$ into flip-flop $L_3$ is defined by the following terms:

$$S_pL_3=I'TX_2L'_1X_1(O'_1+O'_2)$$
104

$$Z_pL_3=I'TX_2L'_1X'_1(O'_1+O'_2)$$
105

The copying of signal $t_a$ from flip-flop $L_2$ into flip-flop $X_2$ is defined by the following terms:

$$S_pX_2=I'TX_2L'_1L_2(O'_1+O'_2)$$
106

$$Z_pX_2=I'TX_2L'_1L'_2(O'_1+O'_2)$$
107

The reasons for the inclusion of the expression $(O'_1+O'_2)$ in terms 104 through 107 will be later explained in connection with description of the mark operations.

In connection with terms 106 and 107 which define the entry of signals into flip-flop $X_2$ at time $I'TX_2L'_1$, it should be noted that at all other times $$(\text{times } I+T'+X'_2+L_1)$$

signals in the X channel will be normally recirculated from flip-flop $X_1$ to flip-flop $X_2$ as defined by the following terms:

$$S_pX_2=(I+T'+X'_2+L_1)X_1$$
108

$$Z_pX_2=(I+T'+X'_2+L_1)X'_1$$
109

Also in connection with terms 106 and 107, after signal $t_a$ has been copied into flip-flop $X_2$ as defined by these terms, the signal is always recirculated without further change as a new $t_p$ signal from flip-flop $X_2$ to flip-flop $X_3$ as defined by the following terms:

$$S_pX_3=I'T'(X'_1+X_3)X_2$$
110

$$Z_pX_3=I'T'X_3X'_2$$
111

It will be noted that terms 110 and 111 also define the normal recirculation from flip-flop $X_2$ to flip-flop $X_3$ of all other signals (except the *v* signal) which appears in flip-flop $X_2$ at times I'T'.

Very nearly all of the operations which are uniform throughout all block programs have now been described and therefore description of the various block programs may now be begun.

The block programs will be described in the following order: Postexchange, Write, Read, Preexchange and Exchange. This order of description is preferred because adequate discussion of the Preexchange and Exchange block programs particularly requires thorough understanding of the other block programs.

To preliminarily summarize the transitions between the block programs as discussed hereinbefore in connection with Table 1 the block program Postexchange is always automatically followed by the Write block program. Write in turn is automatically followed by Read, and Read is automatically followed by Preexchange. Preexchange however does not automatically change to any other program, but instead changes only in response to instructions read from the L block being computed upon. In response to a $\text{Branch}_0$ instruction, Preexchange may be followed by Read as has been hereinbefore described. In response to an Exchange ($\overline{\underline{X}}$) instruction accepted from word W33 alone, Preexchange will be followed first by Exchange and then by Postexchange. In response to $\overline{\underline{X}}$ instructions appearing in and accepted from W32, Preexchange will be followed first by Exchange and then by Preexchange.

Consider now the details of the successive block programs:

*The Postexchange block program* ($B_1=0$, $B_2=0$, $t_a{}^*=0$)

The Postexchange block program is distinguished or identified as shown in Table 1, by flip-flops $B_1$ and $B_2$ both being in their 0 states and the signal $t_a{}^*$ in W33 of the L block having a 0 value.

During Postexchange preparations are made to return the old B block (just obtained as a result of the preceding Exchange block program) to its own position in the W channel. In addition computation is performed in normal fashion on the words of the new L block (also obtained as a result of the preceding Exchange block program).

As shown in Table 2, during Postexchange the address of the position in the W channel to which the B block is to be returned is designated by tab $t_0{}^*$, positioned in a corresponding word of the L–B channel; while the precinct to which the B block is to be returned is designated by the value of $t_0$ positioned in word W33 of the L–B channel. Then $t_a$–$t_0$ tab coincidence is obtained during a turn of the L–B channel (tab $t_a$ appears in the word containing tab $t_0$) this indicates that the next block to appear in the W channel will be that one (providing its precinct is correct) to which the B block is to be returned. Therefore to memorize the tab coincidence until the end of the present block the $v$ signal is changed to a 1 value, and at the end of the present block, upon the appearance of the fiducial *, $v=1$, and obtaining of precinct verification (agreement between the value of signal H and the value of $t_0{}^*$), the block program Postexchange is changed to the block program Write so that the B block may be written into its proper place in the W channel during the next turn of the L–B channel.

If the precinct of the identified position in the W channel is not correct, precinct verification will not be obtained in word W33 and Postexchange will continue. The $v$ signal will be erased (changed back to a 0 value) during the next turn of the L–B channel upon the appearance of tab $t_a=1$ in a word having tab $t_0=0$, and will not be reinserted until tab coincidence is again obtained 33 turns later, this time in the correct precinct. Thereupon signal $v$ is again changed to its 1 value and at the end of the block in which this second tab coincidence appears, precinct verification will be obtained and the block program Postexchange changed to the block program Write to thereby cause the B block to be written into its proper position in the W channel.

The successive operations performed are presented hereinbelow:

(*a*) Changing the $v$ signal to its 1 value when there is $t_a$–$t_0$ tab coincidence is accomplished during Postexchange (and also during Preexchange and Exchange) by setting flip-flop $X_3$ at the time (time $I'T'X_1X'_3$) that signal $v=0$ appears in flip-flop $X_2$, provided tab $t_2=1$ in flip-flop $L_1$ and tab $t_0=1$ in flip-flop $L_2$ agree. The setting of flip-flop $X_3$ at this time is defined by term 81 hereinafter presented.

Normal recirculation of the $v$ signal from flip-flop $X_2$ to flip-flop $X_3$ after it has been changed to a 1 value is defined by term 88 hereinbefore presented. The expression $(L'_1+L_2)$ in term 88 indicates that normal recirculation will continue unless both $t_a=1$ in flip-flop $L_1$ and $t_0=0$ in flip-flop $L_2$. In this event the signal $v=1$ will not be transferred from flip-flop $X_2$ to flip-flop $X_3$ and will thereby be changed back to a 0 value because of the presence of a preceding 0-valued signal in flip-flop $X_3$.

(*b*) The block program Postexchange ($B_1=0$, $B_2=0$, $t_a{}^*0$)

is changed to the block program Write ($B_1=1$, $B_2=0$, $t_a{}^*=0$) by setting flip-flop $B_1$ to its 1 state at the time (time $I'TX_2L_1$) that the fiducial mark * appears in flip-flop $L_1$, provided that $v=1$ in flip-flop $X_3$ and precinct verification is obtained as indicated by signal H agreeing in value with signal $t_0{}^*$ in flip-flop $L_3$. The setting of flip-flop $B_1$ in accordance with these conditions is defined by the following term:

$$S_pB_1=I'TX_2L_1B'_1B'_2L'_2X_3(L_3H+L'_3H') \quad 112$$

*The Write block program* ($B_1=1$, $B_2=0$, $t_a{}^*=0$)

I. Copying the B block into the W channel—The Write block program lasts for one turn of the L–B channel during which the B block is written into its proper position in the W channel. During the Write block program, gating signals $Wr$ and $Wr'$ are formed by matrix 20 at their high and low levels respectively, these signals being applied as shown in Fig. 1 to gated Write amplifier E, this having the effect of activating Write amplifier E as has been hereinbefore described by allowing applied Write signal $E_{in}$ to pass through diode bridge 56 to output amplifier 55 to thereby cause the high and low levels of signal $E_{in}$ to be recorded as corresponding magnetic signals in the W channel.

Signal $E_{in}$ is produced during the Write block program by matrix 20, having a high level whenever a 1-valued signal of the B block appears in flip-flop $L_1$ and having a 0-value whenever a 0-valued signal of the B block appears in flip-flop $L_1$. In this manner the signals of the B block as they appear in flip-flop $L_1$ are simultaneously copied into the W channel without any delay.

The following equations define the formation of gating signals $Wr$ and $Wr'$ at their high and low levels respectively during the Write block program:

$$Wr=B_1B'_2 \quad 113$$

$$Wr'=B'_1+B_2 \quad 114$$

It will be noted that during all other block programs, gating signals $Wr$ and $Wr'$ will be at their low and high levels respectively, thereby deactivating gated write amplifier E.

The formation of signal $E_{in}$ having, during Write, high and low levels in accordance with the appearance (at times T') of 1 and 0-valued signals of the B block in flip-flop $L_1$ is defined by the following equation.

$$E_{in}=B_1B'_2T'L_1 \quad 115$$

II. Copying tab $t_1$ into the $t_0$ positions—Another operation always performed during the one turn of the Write block program is that tab $t_1$ is copied into the $t_0$ position in each word of the L block. As explained before, the position of tab $t_1=1$ at this time indicates the address of the new B block which is to be read in an immediately succeeding Read block program. Thus copying of the $t_1$ tab into the $t_0$ position enables preparations to be made for the reading of the new B block.

It should be noted that this operation extends to W33 —that is the $t_1{}^*$ tab is copied into the $t_0{}^*$ position in W33 to thereby identify the precinct of the new B block which is to be read.

Copying of the $t_1$ tab into the $t_0$ position (and also copying of $t_1{}^*$ into the $t_0{}^*$ position) is accomplished at the time (time $I'TX'_2X_3$) that $t_0$ appears in flip-flop $L_1$ by setting or zeroing flip-flop $L_2$ in accordance with the value of $t_1$ in flip-flop $L_3$. The terms defining this operation are:

$$S_pL_2=I'TX'_2X_3B_1B'_2L_3$$
116

$$Z_pL_2=I'TX'_2X_3B_1B'_2L'_3$$
117

III. Changing from Write to Read—As stated before the Write block program ($B_1B'_2$, $t_a{}^*=0$) lasts only for one turn of the L–B channel, and at the completion of that turn (upon the reappearance of the fiducial mark * in flip-flop $L_1$) is changed to the Read block program ($B_1B_2$, $t_a{}^*=1$ or 0).

This change to the Read block program is accomplished by seting flip-flop $B_2$ at the time that the fiducial mark appears in flip-flop $L_1$ as defined by the following term:

$$S_pB_2=I'TX_2L_1B_1B'_2L'_2$$
118

In ending the Write block program, in addition to setting flip-flop $B_2$ it also is necessary to either not change or change the $t_a$ tab from its 0 value to a 1 value to thereby enter either the first phase ($B_1B_2$, $t_a{}^*=0$) or the second phase ($B_1B_2$, $t_a{}^*=1$) of the Read program.

This choice as to not changing or changing the $t_a{}^*$ tab is governed by the following considerations: If $t_a$–$t_0$ tab coincidence is obtained (appearance of tab $t_a=1$ in the same word in which a new $t_0=1$ has been copied from $t_1$) during the one turn of the Write block program and also precinct verification is obtained, this indicates that the block which is to be read is the block which will appear next in the W channel. Therefore $t_a{}^*$ is changed to a 1 value so that the second phase ($B_1=1$, $B_2=1$, $t_a{}^*=1$) of the Read block program will be entered which it will be remembered will last only for the next turn of the L–B channel and during which the desired block will be read from the W channel into the B block.

If tab coincidence or precinct verification is not obtained during the one turn of the Write block program, this indicates that the block which is to be read will not appear next in the W channel. Therefore $t_a{}^*$ is not changed from its 0 value to thereby enter the first phase ($B_1=1$, $B_2=1$, $t_a{}^*=0$) of the Read block program during which blocks are read continuously from the W channel. Later when tab coincidence and precinct verification are obtained the second phase of Read is entered. In this way it is arranged that the last block read from the W channel is the desired block.

It is thus clear that the additional operation which is required during the one turn of Write, is to detect $t_a$–$t_0$ tab coincidence if it occurs, memorize such tab coincidence by changing the $v$ signal (from its 1 value to a 0 value, as will be shown), and then later at the end of the turn during the passage of W33, change $t_a{}^*$ from a 0 to a 1 value, provided $v=0$ and precinct verification is obtained.

Note that during Write (and also during Read) the significance of the $v$ signal is inverted. The $v$ signal it is known will have a 1 value when Write is entered. During Write (and also Read) the normal condition of signal $v$ is that it is maintained at a 1 value, and is only changed to a 0 value if $t_a$–$t_0$ tab coincidence occurs to thereby memorize this tab coincidence until passage of W33. Signal $v$ will be changed back to a 1 value during the next turn of the L–B channel upon the appearance of $t_a=1$ in a word having $t_0=0$ and will not be changed again to a 0 value until tab coincidence is again obtained 33 turns later in the correct precincts.

Normal recirculation during Write (and also Read) of signal $v=1$ from flip-flop $X_2$ to flip-flop $X_3$ so long as tab coincidence does not occur is accomplished by setting flip-flop $X_3$ at the time (time $I'T'X_1X'_3$) that signal $v=1$ appears in flip-flop $X_2$ provided that either $t_a=0$ in flip-flop $L_1$ or $t_0=0$ in flip-flop $L_2$, as defined by the following term:

$$S_pX_3=I'T'X_1X'_3B_1X_2(L'_1+L'_2)$$
119

As indicated by term 119 normal recirculation of $v=1$ during Write (and Read) will fail when tab coincidence occurs, since then $t_a=1$ in $L_1$ and $t_0=1$ in $L_2$ so that the expression $(L'_1+L'_2)$ is not satisfied. Thus when tab coincidence occurs the signal $v=1$ will automatically be changed to $v=0$ because of the presence of a preceding 0-valued signal in flip-flop $X_3$.

Changing of $t_a$ to its 1 value, if this is to be done, at the end of Write, is accomplished by setting flip-flop $L_3$ at the time ($I'TX_2L_1$) during passage of W33 that $v=0$ appears in flip-flop $X_3$ provided that precinct verification is obtained, as defined by the following term:

$$S_pL_3=I'TX_2L_1B_1X'_3(L_3H+L'_3H')$$
120

As indicated by term 120 $t_a{}^*$ will be changed to a 1 value if $v$ equals 0 (in flip-flop $X_3$) and precinct verification is obtained. Normal recirculation of $t_a=0$, if $v$ does not equal 0 or if precinct verification is not obtained is defined by the following term:

$$Z_pL_3=I'TX_2L_1L'_2B_1(X_3+L_3H'+L'_3H)$$
121

*The Read block program ($B_1=1$, $B_2=1$)*

I. The first phase of the Read block program ($B_1=1$, $B_2=1$, $t_a{}^*=0$—Normally it may be assumed that tab coincidence and precinct verification are not obtained during Write and that therefore the Read program is begun in its first phase in which $t_a{}^*=0$. Since tab coincidence has not yet occurred it may also be assumed that signal $v=1$, its normal condition during Write and Read.

So long as the Read program lasts, blocks appearing in the W channel will be copied one over another into the cells of the B block, this being accomplished by copying each W channel signal as it appears in read flip-flop W into flip-flop $L_2$. All signals are copied except the flag ($f$), $t_a$ and $t_w$ tabs. In this way reading of tabs other than $t_b$ is suppressed, this being necessary to prevent interference with the $f$, $t_a$ and $t_w$ tabs which are retained without change in the L–B channel during Read.

The copying into $L_2$ during Read of all signals appearing in flip-flop W at time IT' is defined by the following terms:

$$S_pL_2=IT'RdW$$
122

$$Z_pL_2=IT'RdW'$$
123

The normal circulation of signals from $L_1$ to $L_2$ at times IT' when the computer is not in its Read program is defined by the following corresponding terms:

$$S_pL_2=IT'Rd'L_1$$
124

$$Z_pL_2=IT'Rd'L'_1$$
125

The copying into $L_2$ during Read of all signals (other than $f$, $t_a$ and $t_w$) appearing in flip-flop W at times I'T' is defined by the following terms:

$$S_pL_2=I'T'X'_1X'_2RdW$$
126

$$Z_pL_2=I'T'X'_1X'_2RdW'$$
127

At the time that the reading of signals $t_a$ and $t_w$ from the W channel is suppressed the corresponding signals $t_a$ and $t_w$ in the L–B channel are recirculated without change from flip-flop $L_1$ to flip-flop $L_2$ as defined by the following terms:

$$S_pL_2=I'T'X_1X'_3RdL_1$$
128

$$Z_pL_2=I'T'X_1X'_3RdL'_1$$
129

The normal recirculation of all signals (other than the $f$ signal from $L_1$ to $L_2$ at times I'T' when the computer is not in its Read program is defined by the following terms:

$$S_pL_2=I'T'(X'_1+X'_3)Rd'L_1$$
130

$$Z_pL_2=I'T'(X'_1+X'_3)Rd'L'_1$$
131

The various recirculations, insertions and erasures of the $f$ tab during transfers from $L_1$ to $L_2$ have already been fully defined by terms 43, 44, 46, 49, 50 and 78 hereinbefore presented.

Since all changes in the $f$ tab are effected during its transfer from $L_1$ to $L_2$ it is clear that it must always recirculate without change from flip-flop $L_2$ to flip-flop $L_3$ as defined by the following terms:

$$S_pL_3=ITX_1X_2L_2$$
132

$$Z_pL_3=ITX_1X_2L'_2$$
133

The first phase of the Read program will last, possibly for many, many turns of the L–B channel until a turn in which $t_a$–$t_0$ tab coincidence and precinct verification are obtained. At the end of the turn $t_a^*$ is changed to a 1 value to thereby enter the second phase of the Read program which will last for only 1 turn during which the desired block will be read from the W channel, the desired block therefore being the last block read from the W channel.

Tab coincidence when it occurs during a turn, is memorized until the end of that turn by changing the signal $v=1$ to the new value $v=0$.

Normal recirculation of signal $v=1$ until tab coincidence occurrs is defined by term 119 hereinbefore presented. Since the expression $(L'_1+L'_2)$ in term 119 is not satisfied when tab coincidence occurs, the signal $v=1$ will not be recirculated at that time and will therefore be automatically changed to a 0 value as has been hereinbefore explained because of the passage of a preceding 0-valued signal through flip-flop $X_3$.

If precinct verification is not obtained at the end of a turn in which tab coincidence occurs, the signal $v=0$ will be changed back to its normal value $v=1$ (for Read and Write) during the next turn of the L–B channel upon the appearance of $t_a=1$ in a word having $t_0=0$, as defined by the following term:

$$S_pX_3=I'T'X_1X'_3X'_2L_1L'_2$$
136

If precinct verification is obtained at the end of a turn in which tab coincidence occurs, the signal $t_a^*=0$ is changed to $t_a^*=1$, as defined by term 120 presented hereinabove, to thereby enter the second phase ($B_1=1$, $B_2=1$, $t_a^*=1$) of the Read block program.

II. The second phase of the Read block program ($B_1=1$, $B_2=1$, $t_a^*=1$)—The second phase of the Read block program lasts for only one turn of the L–B channel, during which the final (desired) block is read from the W channel into the B block as defined by terms 122, 123 and 126 through 129 presented hereinabove.

This second phase of Read is entered either from the first phase of Read or from Write, as has been hereinbefore explained. In either event, the initial conditions for the second phase of Write are identical; namely flip-flops $B_1$ and $B_2$ are both in their 1 states, signal $t_a^*=1$ and signal $v=0$ (because of the immediately preceding tab coincidence).

During the single turn of the second phase of the Read program signal $v=0$ will be changed back to its normal 1 value for Read and Write, as defined by the previously presented term 133, but will be changed again to a 0 value during the next turn (the first turn of Preexchange) as defined by term 88, this being the normal value of $v$ for Preexchange, Exchange, and Postexchange.

At the end of the single turn of the second phase of the Read program, upon the appearance of $t_a^*=1$ in flip-flop $L_2$, flip-flops $B_1$ and $B_2$ are both zeroed and the signal $t_a^*=1$ is recirculated without change to thereby enter the Preexchange block program ($B_1=0$, $B_2=0$, $t_a^*=1$). The terms defining the described zeroing of flip-flops $B_1$ and $B_2$ are the following terms:

$$Z_pB_1=I'TX_2L_1B_1B_2L_2$$
137

$$Z_pB_2=I'TX_2L_1B_1B_2L_2$$
138

The recirculation during this turn of signal $t_a^*=1$ from flip-flop $L_2$ to flip-flop $L_3$ is defined by the following term:

$$S_pL_3=I'TX_2L_1B_1L_2$$
139

The Preexchange block program ($B_1=0$, $B_2=0$, $t_a^*=1$)—Preexchange does not change automatically to any other block program but only in response to the acceptance of certain instructions from the L block being computed upon; namely, acceptance of a $Br_0$ instruction, or an X instruction from W33, or an $\overline{X}$ instruction from W32.

If a $\text{Branch}_0$ ($Br_0$) instruction is present in and is accepted from the L block, Preexchange will be followed by the second phase of Read, as has been fully described hereinbefore.

If an $\overline{X}$ instruction is present in and accepted from W33, Preexchange ($B_1=0$, $B_2=0$, $t_a^*=1$) will be followed by the normal form of Exchange ($B_1=0$, $B_2=1$, $t_a^*=0$) in which $t_a^*=0$, this being the form of Exchange which is automatically followed by Postexchange. The actual transition from Preexchange to this form of Exchange is accomplished during the passage of W33, by setting flip-flop $B_2$ and changing $t_a^*$ from a 1 to a 0 value.

If an $\overline{X}$ instruction is present in and accepted from W32, Preexchange ($B_1=0$, $B_2=0$, $t_a^*=1$) will be followed by an alternate form of Exchange ($B_1=0$, $B_2=1$, $t_a^*=1$) in which $t_a^*=1$, which is automatically followed by Preexchange. The transition from Preexchange to this form of Exchange is accomplished during the passage of W33 by setting flip-flop $B_2$ (as in the normal form of Exchange) and by recirculating signal $t_a^*=1$ without change.

The performance of these alternative operations and the manner in which choice may be made between them may best be understood by considering, as an example, a typical situation in which the $\underline{X}$ instruction appears in both W33 and W32 and a Test instruction appears in W31. It is clear that if the Test instruction in W31 is not satisfied, flip-flop C will be set to its 1 value until it is zeroed at the middle of the following W32 so that the $\underline{X}$ instruction in W32 will not be accepted while flip-flop C during the passage of W33 will be in its 0 state so that the $\underline{X}$ instruction in W32 will be accepted. In this event, at the middle of W33, upon the appearance of the fiducial mark, $C=0$, and $\underline{X}$ instruction in the instruction register, flip-flop $B_2$ is set and signal $t_a{}^*$ is changed from a 1 to a 0 value as described before.

However if the test instruction in W31 is satisfied, flip-flop C will be in its 0 state and the following $\underline{X}$ instruction in W32 will be accepted. The acceptance of an $\underline{X}$ instruction in a non-fiducial word causes flip-flop C to be set (rather than zeroed) at the middle of that word (W32) and thus flip-flop C will be in its 1 state when W33 appears so that the $\underline{X}$ instruction in W33 will not be accepted, the $\underline{X}$ instruction obtained in W32 being retained in the instruction register. In this event, at the middle of W33 upon the appearance of the fiducial mark, $C=1$, and the $\underline{X}$ instruction in the instruction register, flip-flop $B_2$ is set as before but signal $t_a{}^*=1$ recirculated without change.

I. $\underline{X}$ instruction accepted from W33—Considering these above-described operations now in detail, assume first that the Test instruction in W31 is not satisfied so that $C=1$ when W32 appears and therefore, the $\underline{X}$ instruction in W32 is not accepted. Flip-flop C will then be zeroed at the middle of W32 as defined by term 28 hereinbefore presented.

Thus flip-flop C will be in its normal 0 state when W33 begins its passage and the $\underline{X}$ instruction in W33 will be accepted by the instruction register. (Note that the same state of affairs might also have been reached in other ways, as for example if the $\underline{X}$ instruction had been placed in W33 alone.) During the passage of W33 upon the appearance of the fiducial mark, flip-flop $B_2$ is set and simultaneously since $C=0$, the signal $t_a{}^*$ will be changed to a 0 value as it passes from flip-flop $L_2$ to flip-flop $L_3$.

The setting of flip-flop $B_2$ in the described manner is defined by the following term:

$$S_pB_2=I'TX_2L_1B'_1B'_2L_2\underline{X}X'_1 \quad (140)$$

The changing of signal $t_a{}^*=1$ to a 0 value as it passes from flip-flop $L_2$ to flip-flop $L_3$, provided $C=0$ and $\underline{X}$ appears in the instruction register is defined by the following term:

$$Z_pL_3=I'TX_2L_1B'_1B'_2L_2\underline{X}X'_1C' \quad (141)$$

II. $\underline{X}$ instruction accepted from W32—Assume, for the purpose of this example that a Test instruction in W31 has been satisfied (or alternatively that there was no Test instruction in W31). In either event flip-flop C will be in its 0 state at the beginning of W32 and therefore the $\underline{X}$ instruction in W32 will be accepted. As a result of acceptance of the $\underline{X}$ instruction in non-fiducial word, W32, flip-flop C will be set (rather than zeroed) at the middle of W32 upon the appearance of a 0-valued fiducial cell in flip-flop $L_1$ as defined by the following term:

$$S_pC=I'TX_2L'_1\underline{X} \quad (142)$$

Suppression of the normal zeroing of flip-flop C is obtained by the inclusion of the signal $\underline{X}'$ in the normal zeroing term, term 28 hereinbefore presented.

Thus flip-flop C will be in its 1 state when W33 begins its passage so that the $\underline{X}$ instruction from W32 is retained and the $\underline{X}$ instruction in W33 (if present) is not accepted. In this event upon the appearance of the fiducial mark, flip-flop $B_2$ is set, as defined by the hereinbefore presented term 140, and simultaneously signal $t_a{}^*=1$ is recirculated without change from flip-flop $L_2$ to $L_3$ in acordance with flip-flop C being in its 1 state as defined by the following term:

$$S_pL_3=I'TX_2L_1B'_1B'_2L_2(\underline{X}'+X_1+C) \quad (143)$$

At this time therefore the alternate from the Exchange block program has been entered.

In the next timing interval upon the appearance of the fiducial mark in flip-flop $L_2$ the $\underline{X}$ instruction is removed from the instruction register by zeroing all of the instruction register flip-flops under the control of the $Ze$ signal as defined by the following term:

$$Ze_p=I'T'X_1X_3\underline{X}L_2 \quad (144)$$

In the following timing interval, since the $\underline{X}$ instruction is no longer in the instruction register, flip-flop C will be zeroed in normal fashion as defined by term 28 hereinbefore presented.

*The Exchange block program ($B_1=0$, $B_2=1$, $t_a{}^*=0$ or 1)*

I. Transition from Exchange to Preexchange or Postexchange—The exchange block program lasts for only one turn of the L–B channel during which the L and B blocks are interchanged as will be described. At the end of the turn of the L–B channel the Exchange block program is followed either by the Postexchange ($B_1=0$, $B_2=0$, $t_a{}^*=0$) or Preexchange ($B_1=0$, $B_2=0$, $t_a{}^*=1$) block programs in accordance with $t_a{}^*$ having a 0 or 1 value. This transition is accomplished by zeroing flip-flop $B_2$ upon the appearance of the fiducial mark in $L_1$ and by simultaneously recirculating $t_a{}^*=0$ or 1 without change from $L_2$ to $L_3$ to thereby enter the Postexchange or Preexchange block programs.

Zeroing of flip-flop in this manner is defined by the following term:

$$Z_pB_2=I'TX_2L_1B'_1B_2 \quad (145)$$

Recirculation of $t_a{}^*$ without change from $L_2$ to $L_3$ is defined by the following terms:

$$S_pL_3=I'TX_2L_1B'_1B_2L_2 \quad (146)$$

$$Z_pL_3=I'TX_2L_1B'_1B_2L'_2 \quad (147)$$

Thus as defined by term 146 if $t_a{}^*=1$ it will be recirculated without change to thereby enter the Preexchange block program. Continued recirculation of $t_a{}^*=1$ during Preexchange is assured by the term 143. On the other hand if $t_a{}^*=0$, it will also be recirculated with change at the end of the Exchange program to thereby enter the normal Postexchange program. Continued recirculation of $t_a{}^*=0$ during Postexchange is defined by the following term:

$$Z_pL_3=I'TX_2L_1B'_1B'_2L'_2 \quad (148)$$

II. Interchange of the L and B blocks during Exchange—During the one turn of the Exchange program the digits of the L block are interchanged with the corresponding digits of the B block. All digits are interchanged in each word of the L–B channel except for the digits $l_0$ and $f$ and * and $t_a$ which are recirculated in their customary fashion. To accomplish the interchange of L and B digits, the following operations are performed:

(1) At time T, when an L digit is in $L_1$ and a B digit is in $L_2$, the L digit is copied from flip-flop $L_1$ to flip-flop $L_3$ while the B digit is held unchanged in flip-flop $L_2$. In this manner the L digit is jumped ahead one cell to enter the L–B block while the B digit is effectively delayed one cell to enter the L block, thereby interchanging the L and B digits.

(2) At time T' digits are transferred normally from $L_1$ to $L_2$ and from $L_2$ to $L_3$ thereby shifting the interchanged L and B digits into the magnetic drum channel and restoring proper initial conditions for the operations to be performed at time T'.

Understanding of this digit interchange operation may be aided by consideration of the following table, Table 10, in which the progression of digits, during Exchange, through flip-flops $L_1$, $L_2$ and $L_3$ of the L–B channel is displayed.

than precede the corresponding L digits. Thus upon later normal recirculations of these digits the original B digits will appear in flip-flop $L_1$ at time T and therefore be treated as new L digits.

It is clear from Table 10 that the only effect of the Exchange program upon circulation of signals to flip-flop $L_2$ is that the normal transfer of signals from flip-flop $L_1$ to flip-flop $L_2$ must be suppressed at times T during Exchange, as defined by the following terms:

$$S_DL_2=ITEx'L_1$$
149

$$Z_DL_2=ITEx'L'_1$$
150

$$S_DL_2=I'TX'_2X'_3Ex'L_1$$
151

$$Z_DL_2=I'TX'_2X'_3Ex'L'_1$$
152

The inclusion of the expression $X'_2X'_3$ in terms 151 and 152 prevents these terms from affecting the circulation of tabs $t_0$ and *, which have been defined hereinbefore.

The effects of the Exchange program upon circulation

TABLE 10

| Row | State of Flip-flop T | Entering Digits | Contents of Flip-flops $L_1$ $L_2$ $L_3$ | Emerging Digits |
|---|---|---|---|---|
| 1 | 1 | $l_3$ $b_3$ $l_2$ $b_2$ | $l_1$ $b_1$ $l_0$ | |
| 2 | 0 | $b_4$ $l_3$ $b_3$ $l_2$ | $b_2$ $b_1$ $l_1$ | $l_0$ |
| 3 | 1 | $l_4$ $b_4$ $l_3$ $b_3$ | $l_2$ $b_2$ $b_1$ | $l_1$ $l_0$ |
| 4 | 0 | $b_5$ $l_4$ $b_4$ $l_3$ | $b_3$ $b_2$ $l_2$ | $b_1$ $l_1$ $l_0$ |
| 5 | 1 | $l_5$ $b_5$ $l_4$ $b_4$ | $l_3$ $b_3$ $b_2$ | $l_2$ $b_1$ $l_1$ $l_0$ |
| 6 | 0 | $b_6$ $l_5$ $b_5$ $l_4$ | $b_4$ $b_3$ $l_3$ | $b_2$ $l_2$ $b_1$ $l_1$ $l_0$ |
| 7 | 1 | $l_6$ $b_6$ $l_5$ $b_5$ | $l_4$ $b_4$ $b_3$ | $l_3$ $b_2$ $l_2$ $b_1$ $l_1$ $l_0$ |
| 8 | 0 | $b_7$ $l_6$ $b_6$ $l_5$ | $b_5$ $b_4$ $l_4$ | $b_3$ $l_3$ $b_2$ $l_2$ $b_1$ $l_1$ $l_0$ |

As illustrated in row 1 of Table 10, since the flag $f$ is not to be interchanged, the interchange operation begins at the time $T=1$ when $l_0$ is in flip-flop $L_3$, $b_1$ is in flip-flop $L_2$ and $l_1$ is in flip-flop $L_1$. To the left of the first dashed line are shown the next four digits of the L–B channel arranged in the order (right to left) in which they will enter flip-flop $L_1$. Digits emerging from flip-flop $L_3$ will be shown to the right of the second dashed line. As shown in row 1, the original order of the entering digits is that each L digit is preceded by the corresponding B digit. The digits are interchanged as will be explained as they pass through flip-flops $L_2$ and $L_3$ and emerge in reversed order.

Considering now these interchange operations as shown in row 1, at the end of the first time interval in which $T=1$ (time T), digit $l_1$ in flip-flop $L_1$ is copied into flip-flop $L_3$, as indicated by the corresponding arrow, while digit $l_0$ emerges from flip-flop $L_3$, digit $b_2$ enters flip-flop $L_1$, and digit $b_1$ is retained in flip-flop $L_2$. Thus during the next time interval (time T') as shown in row 2, digits $b_2$, $b_1$ and $l_1$ are in flip-flops $L_2$ and $L_3$, respectively while at the end of this time interval, as indicated by the arrows, digit $l_1$ emerges, digit $b_1$ is copied from $L_2$ into $L_3$, digit $b_2$ is copied from $L_1$ into $L_2$, and digit $l_2$ enters into flip-flop $L_1$. It is seen referring to rows 3 through 8, that by the simple repetition of these operations in successive T and T' time interval, all digits are interchanged so that in the emerging digits the original B digits now follow rather of signals to flip-flop $L_3$ is that during Exchange the normal transfer of signals from $L_2$ to $L_3$ must be suppressed at times T, signals being circulated instead at time T from flip-flop $L_1$ to flip-flop $L_3$ as defined by the following terms:

$$S_DL_3=I'TX'_2(ExL_1+Ex'L_2)$$
153 155

$$Z_DL_3=I'TX'_2(ExL'_1+Ex'L'_2)$$
154 156

$$S_DL_3=IT(X'_1+X'_2)Pb'_2(ExL_1+Ex'L_2)$$
157 68

$$Z_DL_3=IT(X'_1+X'_2)Pb'_2(ExL'_1+Ex'L'_2)$$
158 69

It is clear that terms 152 and 153 define the circulation of signals at times I'T from $L_1$ to $L_3$ during Exchange; while terms 155 and 156 define the normal circulation of signals at times I'T from $L_2$ to $L_3$ during other block programs. The inclusion of signal $X'_2$ as "and" factors of these terms prevents the terms from affecting the circulation of the fiducial cell which has been separately defined.

Terms 157 and 158 define the circulation of signals at time IT from $L_1$ to $L_3$ during exchange; while terms 68 and 69 hereinbefore presented define normal circulation of signals from $L_2$ to $L_3$ during other block programs.

The inclusion of signal $Pb'_2$ as an "and" factor suppresses the operation of these terms when the $\overline{X}$ number is copied into B words as separately defined by terms 62 and 63; while the inclusion of the expression $(X'_1+X'_2)$ prevents these terms from interfering with the normal separately defined circulation of the flag $f$ tab.

Recirculation from $L_2$ to $L_3$ of signals appearing in $L_2$ at time T' is, it is clear, unaffected by the Exchange program. Such normal recirculation of signals is defined for times $I'T'$ by terms 102 and 103 presented hereinbefore and is defined for times IT' by the following terms:

$$S_pL_3 = IT'Pl'_2L_2$$
159

$$Z_pL_3 = IT'Pl'_2L'_2$$
160

The inclusion of signal $Pl'_2$ in terms 159 and 160 prevents any interference by them when the X number is copied into the L number in response to a $Pl_2$ instruction, as defined by the terms 64 and 65.

PLACING THE COMPUTER IN OPERATION (CLEAR, MARK, AND FILL)

In the foregoing portions of the specification, all of the operations connected with the performance of the various instructions and the performance of the block programs have been fully described in detail. Now, those operations will be described which are connected with placing the computer in operation; namely, the operations connected with the Clear, Mark and Fill routines.

*Clear and Mark*

As described hereinbefore in the generalized description of operation, after power has been applied to the computer, the first step performed in placing the computer in operation is to depress clear-switch 71, this having the effect of placing flip-flop Q in its one state and all other flip-flops in their 0 states, thereby erasing or clearing undesired information from all of the recirculating channels and also effectively placing the Idle instruction in the instruction register flip-flops so that computation and acceptance of instructions cannot begin.

Figure 5A:
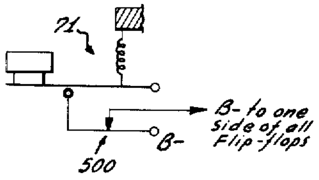

Clearing of flip-flop Q to its 1 state and all other flip-flops to their 0 states is accomplished in the following manner. The flip-flops utilized in the present computer are conventional in nature, each flip-flop comprising a pair of cross-coupled amplifiers connected so that either one or the other (but not both) of the amplifiers can be conductive. The 1 or 0 state of a flip-flop is therefore determined by one or the other of its amplifiers being conductive. Negative (B−) operating voltage is separately supplied to the two amplifiers of each flip-flop, B− voltage being produced by a source not shown and applied directly to one amplifier and indirectly through clear switch 71 to the other amplifier of each flip-flop. Momentary depression of switch 71 causes this second circuit to be opened so that B− voltage is cut-off from a predetermined amplifier in "one side of" each flip-flop thereby causing these amplifiers to become conductive and thus clearing each flip-flop to its corresponding predetermined 1 or 0 state. As shown in Fig. 5*a*, clear switch 71 merely comprises a normal "make" contact generally designated 500 through which electrical connection is normally made between the source (not shown) of B− voltage and one side of every flip-flop. As illustrated in Fig. 5*a*, depression of switch 71 causes contact 500 to be broken, thus momentarily cutting off this B− voltage until the switch is released.

After the clear operation has been accomplished in the described manner, the next step in placing the computer into operation is to depress mark switch 72, this having the effect of causing required marks and tabs to be copied from the permanent M channel into the L–B and X channels. It will be understood, as described hereinbefore, that the M channel extends entirely around the periphery of drum 21. All of the cells of the M channel contain 0-valued signals except for certain cells which contain the following 1-valued signals, arranged in the cells of the M channel as appears below:

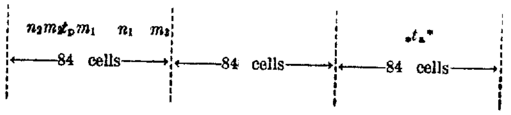

In the first (right hand) group of 84 cells the tab $t_a$* and the fiducial mark * are stored in adjacent cells, occupying the same relative positions that they would occupy in the 84 cells of a word of the L–B channel. The next 84 cells all contain 0-valued signals. The next 84 cells contain marks $m_3$, $n$, $m$, signal $t_p=1$ and marks $m_2$ and $n_2$ all positioned just as they would appear in the 84 cells of the one word X channel.

These signals are so situated in the M channel that $t_a$* and * are read by read flip-flop M at a predetermined time or spacing after switches 30*a* and 30*b* are thrown to their upper positions to switch from transducer 11*b* to 11*a* and change signal H from a high to a low level. The period elapsing between the throwing of these switches and the appearance of $t_a$* and * corresponds roughly to the time required for passage of half a block.

The following operations are performed when mark switch 72 is depressed and released: Nothing is done until signal H changes from a high to a low level. After this event, $t_a$* and *, appearing half a block later, are copied into the L–B channel to thereby define W33 of the L–B channel. (Since a complete traversal of the W channel corresponds to an integral number of turns of the L–B channel, it is clear that the switching operation will always take place thereafter during passage of the middle of W33, as is desired.) After $t_a$* and * have been copied from the M channel into the L–B channel, succeeding signals in the M channel are copied into the X channel. In this way during passage of W2 of the L–B channel, the marks $m_3$, $n_1$, $m$ signal, $t_p$, $m_2$ and $n_2$ are copied into their proper cells in the X channel. All copying of signals is then stopped and the mark routine is completed.

The turn of the L–B channel in which these marks are copied may be thought of as a first turn of the L–B channel following a change from precinct 2 to precinct 1. When the marks are copied into the X channel during passage of W2 in this first turn, the normal setting and zeroing of flip-flop I begins and the initial synchronization of flip-flop T is also accomplished. During the passage of the next word W3, the normal $t_p$–$t_a$ interchange begins and therefore $t_p=1$ is deposited from the X channel into W3 of the L–B channel as signal $t_a=1$. Thus when the second turn of the L–B channel is begun, $t_a=1$ is already in W3 and is therefore in its proper position to indicate the block ($Bl3$) which will next appear in the W channel.

All of the described operations of the mark routine are initiated and carried out under the control of signals $\underline{M_s}$, $\underline{m_d}$ and $\underline{m_{up}}$ (which are produced from switch 72) and the output signals of flip-flops $O_1$, $O_2$ and $O_3$.

Figure 5B:
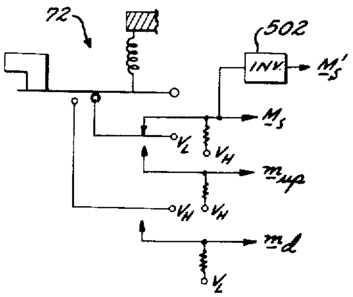

Switch 72 is shown in detail in Fig. 5*b*, and it is seen that the switch is normally spring loaded to an up position at which it produces signals $\underline{M_s}$ at a low voltage level $V_L$, signal $\underline{m_{up}}$ at a high level $V_H$ and signal $\underline{m_d}$ at a low level $V_L$. When switch 72 is depressed: first, signal $\underline{M_s}$ rises to a high level, next signal $\underline{m_{up}}$ falls to a low level, and finally signal $\underline{m_d}$ rises to a high level. When switch 72 is released all of these signals return to their normal levels in reverse order.

As shown in Fig. 5*b*, signal $\underline{M_s}$ is applied to an input of an inverting amplifier 502 which operates to invert signal $\underline{M}_s$ to produce a corresponding complementary signal $\underline{M}'_s$.

The following table, Table 11, illustrates how the various mark operations are initiated and controlled by these signals and by flip-flops $O_1$, $O_2$ and $O_3$.

TABLE 11

| States of— | | | Operation Performed |
|---|---|---|---|
| $O_1$ | $O_2$ | $O_3$ | |
| 0 | 0<br>$M\underline{m}_dH\underline{M}_s$ ↓ | 0 | None. |
| 0<br>$H'\underline{M}_s$ ↓ | 1 | 0 | None. |
| 1 | 1 | 0<br>$M\underline{L}_2M_s$ ↓ | Copy from M channel into L–B channel until $t_a$* and * are copied: Synchronize flip-flop T. |
| 1 | 1<br>$M'X_2X_3\underline{M}_s$ ↓ | 1<br>$M'X_2X_3\underline{M}_s$ ↓ | Copy from M channel into X channel until all marks have been copied. Initiate normal setting and zeroing of flip-flop I. |
| 1<br>$\underline{m}_{up}\underline{M}_s$ ↓ | 0 | 0 | Normal $t_p$–$t_a$ interchange begins and $t_a=1$ is deposited in W3 of L–B channel. |
| 0 | 0 | 0 | None. |

(Program state 0 0 0): As illustrated in Table 11 flip-flops $O_1$, $O_2$, $O_3$ are initially all in their 0 states, this being designated as the program state 0 0 0 of flip-flops $O_1$, $O_2$, $O_3$, since they have been put in that state by the preceding clear routine. No mark operations are performed while the flip-flops are in this state. When mark switch 72 is depressed, signals $\underline{M}_s$ and $\underline{m}_d$ rise to their high levels and whenever signal $\overline{H}$ is also at a high level, flip-flop $O_2$ is set (as indicated by the arrow) to its 1 state, to thereby place flip-flops $O_1$, $O_2$, $O_3$ in the states 0, 1, 0, respectively, this being known as the program state 0 1 0. Setting of flip-flop $O_2$ is defined by the following term:

$$S_pO_2=O'_1O'_2\underline{m}_dH\underline{M}_s$$
161

(Program state 0 1 0): No operations are performed when the flip-flops are in this program state. When signal H changes from a high level to a low level (so that signal H′ rises to a high level) flip-flop $O_1$ is set to thereby place flip-flops $O_1$, $O_2$, $O_3$ in the states 1, 1, 0, respectively. Thus these new states are established at the time that switches 30a and 30b are thrown to their lower positions. Setting of flip-flop $O_1$ is defined by the following term:

$$S_pO_1=O'_1O'_2H'\underline{M}_s$$
162

(Program state 1 1 0): While the flip-flops are in this program states, all signals appearing in flip-flop M of the M channel are copied without change into the L–B channel via flip-flop $L_2$ as defined by the following terms:

$$S_pL_2=\underline{M}_sO_1O_2O'_3M$$
163

$$Z_pL_2=\underline{M}_sO_1O_2O'_3M'$$
164

Normal recirculation of signals from $L_1$ to $L_2$, when flip-flops $O_1$, $O_2$, $O_3$ are not in the states 1, 1, 0, is defined by the following terms:

$$S_pL_2=\underline{M}_s(O'_1+O'_2+O_3)L_1$$
165

$$Z_pL_2=\underline{M}_s(O'_1+O'_2+O_3)L'_1$$
166

The program state 1 1 0, and hence all copying of signals into the L–B channel is ended when $t_a$* and * appear in flip-flops $L_2$ and M respectively, this being accomplished by setting flip-flop $O_3$ to thereby enter the program state 1 1 1 of flip-flop $O_1$, $O_2$, $O_3$. Setting of flip-flop $O_3$ is defined therefore by the following term:

$$S_pO_3=\underline{M}_sO_1O_2O'_3ML_2$$
167

At the same time that $O_3$ is set, it is clear that * will be copied from M into $L_2$ so that both $t_a$* and * are entered into the L–B channel during the program state 1 1 0.

Also, it should be understood that just before the program state 1 1 0 ends, an additional operation is performed in which the T flip-flop is synchronided in proper relation to the signals in the L–B channel. As defined by the terms 3 and 4, flip-flop T is normally reversed in state every timing interval, by applying signals simultaneously to both its set (S) and zero (Z) inputs. Initial synchronization is accomplished during the program state 1 1 0 of flip-flop $O_1$, $O_2$, $O_3$ by suppressing the ZT signal at the time that signal $t_a$* appears in flip-flop M. Thus if flip-flop T is in an incorrect 1 state at this time, it will not be reversed at the end of this interval but will merely be retained in its 1 state so that it will be in the proper stated during the next interval. Suppression of the ZT signal at this time (time $\underline{M}_sO_1O_2O'_3ML'_2$) is defined by the inclusion of the complementary expression $$(\underline{M}'_s+O'_1+O'_2+O_3+M'+L_2)$$

in term 4.

(Program state 1 1 1): As explained above, this program state begins immediately after $t_a$* and * have been copied into the L–B channel. Thereafter signals are copied from the M channel into the X channel as defined by the following terms:

$$S_pX_1=\underline{M}_sO_1O_3M$$
168

$$Z_pX_1=\underline{M}_sO_1O_3M'$$
169

During the program state 1 1 1, signals are thus copied continuously from the M channel into the X channel. During passage of W1 of the L–B channel only 0-valued signals are copied into the X channel. During the passage of W2, the mark $m_3$, $n_1$, $m_1$, signal $t_p=1$, marks $m_2$ and $n_2$ are copied into the X channel. The program state 1 1 1 and hence the copying of these signals is ended immediately after mark $m_2$ is copied, this being accomplished by zeroing flip-flops $O_2$ and $O_3$ at the time that $n_2$ appears in $X_2$ and $m_2$ appears in $X_3$ as defined by the following terms:

$$Z_pO_2=\underline{M}_sO_2O_3M'X_2X_3$$
170

$$Z_pO_3=\underline{M}_sO_2O_3M'X_2X_3$$
171

In addition to copying of signals from the M channel into the X channel, during the program state 1 1 1 the I flip-flop which has been cleared to its 0 state is set to its 1 state for the first time, upon the appearance of $t_p=1$ and $m_1$ in flip-flops $X_2$ and $X_3$, as defined by the following term:

$$S_pI=\underline{M}_sO_1O_3I'T'X_2X_3$$
172

Thus during passage of W2, flip-flop I is properly set and thereafter its settings and zeroings are invariant as described by terms 1 and 2.

During the passage of W2, $t_a=0$ in W2 and $t_p=1$ in the X channel. The normal $t_p$–$t_a$ interchange would thus cause $t_p=1$ to be deposited as $t_a=1$ in W2 of the L–B channel. This is not desired, since proper synchronization between $t_a$ and the turn of the L–B channel requires that $t_a=1$ be deposited in W3 rather than W2 during this first turn of the L–B channel, so that $t_a=1$ will be present in W3 during the second turn of the L–B channel. Therefore it is necessary to suppress the normal $t_p$–$t_a$ interchange during this passage of W2, this being accomplished by the inclusion of the expression $(O'_1+O'_2)$ in the normal interchange terms 104, 105, 106 and 107.

(Program state 1 0 0): When flip-flops $O_2$ and $O_3$ are zeroed during the passage of W2, the program state 1 0 0 is entered. This may be considered as a temporary state in which normal recirculation of signals takes place in all channels. Since $O_2=0$ the expression $(O'_1+O'_2)$ will be satisfied and therefore the normal interchange terms 104, 105, 106 and 107 are effective to accomplish the normal $t_p$–$t_a$ interchange operation, thereby causing $t_p=1$ to be properly deposited as $t_a=1$ in W3 of the L–B channel. Thus from this time on, the presence of $t_a=1$ in any word $W_i$ of the L–B channel will indicate that $Bl_i$ will appear next in the W channel.

The program state 1 0 0 in which normal recirculation begins, is followed by initial program state 0 0 0 in which normal recirculation will of course continue. The change to the program state 0 0 0 is accomplished by zeroing flip-flop $O_1$ at the time that signal $\underline{m}_{up}$ returns to its high level indicating that switch 72 has been released and is returning to its normal up position. Zeroing of flip-flop $O_1$ at this time is defined by the following term:

$$Z_pO_1=\underline{M}_s\underline{m}_{up} \quad 173$$

The mark routine is completed shortly thereafter when switch 72 returns to its normal position and signal $\underline{M}_s$ therefore returns to its normal low level.

Fill: After the clear and mark routines have been completed as described above, the next step in placing the computer into operation is to place fill-compute switch 73 in its lower "Fill" position and then proceed to fill or enter blocks of information into the computer, this being accomplished through manipulation of the additional switches 75, 76, 78 and 79, provided on control panel 22.

Figure 5C:
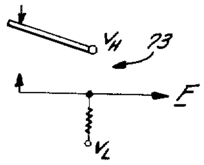
Figure 5D:
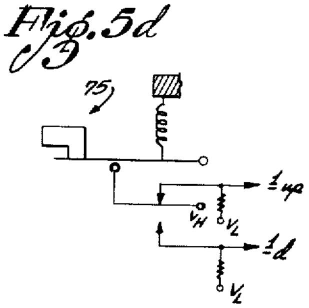
Figure 5E:
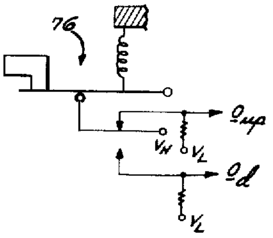

Detailed views of switches 73, 75, 76, 78 and 79 are shown in Figs. 5c, 5d, 5e, 5f and 5g, respectively. As shown in Fig. 5c, fill-compute switch 73 is a two position toggle-switch producing a signal $\underline{F}$ which is at a low level when the switch is at its upper compute position and is at a high level when the switch is thrown to its lower fill position Referring now to Fig. 5d, it is seen that switch 75 is a lever switch normally spring loaded to an up position at which it produces signals $\underline{1}_{up}$ and $\underline{1}_d$ at their high and low levels, respectively Upon depression of switch 75, first signal $1_{up}$ falls to its low level and then signal $\underline{1}_d$ rises to its high level. Upon release of switch 75 these signals are restored to their normal levels in reverse order. Switch 76, as shown in Fig. 5e, is identical to switch 75, producing however the signals $\underline{0}_{up}$ and $\underline{0}_d$ which are normally at their high and low levels, respectively. Upon depression of switch 75, first signal $\underline{0}_{up}$ falls to its low level and next signal $0_{down}$ rises to its high level. These signals are restored to their normal levels in reverse order when switch 76 is released.

Figure 5F:
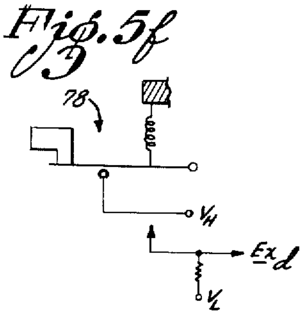
Figure 5G:
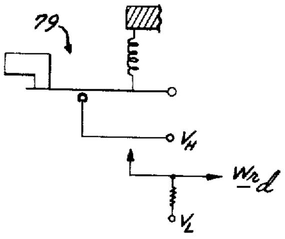

Copy switch 78 and write switch 79, as shown in Figs. 5f and 5g, are identical in structure, these switches being spring loaded to a normal up position at which they produce signals $\underline{Ex}_d$ and $\underline{Wr}_d$, each at its low level. Upon depression and release of switch 78, signal $\underline{Ex}_d$ first rises to its high level and then falls back to its low level. Similarly upon depression and release of switch 79, signal $\underline{Wr}_d$ rises to its high level and then is returned to its low level.

The manner in which the various Fill routines are initiated and controlled by these output signals and by the output signals of flip-flops $O_1$ and $O_2$ is illustrated in the following table, Table 12.

TABLE 12

| Entry | States of flip-flops | | States of flip-flops | | Operations Performed |
|---|---|---|---|---|---|
| | $B_1$ | $B_2$ | $O_1$ | $O_2$ | |
| 1 | 0 | 0 | 0 | 0 ↓ $*(\underline{1}_dO_3+\underline{0}_dO'_3)$ | Normal recirculation in the channels in the Preexchange block program. Set or zero flip-flop $O_3$ in accordance with $\underline{1}_d$ or $\underline{0}_d$ at its high level. |
| 2 | 0 | 0 | 0 ↓ * | 1 ↓ | Flip-flop $O_3$ is effectively inserted into the L blocks at time T so that information flow is from $L_1 \rightarrow O_3 \rightarrow L_2$ at time T. All digits in the L block are precessed left two cells and the 1 or 0-valued signal in $O_3$ is copied into the L block. |
| 3 | 0 | 0 | 1 ↓ $\underline{1}_{up}\underline{0}_{up}$ | 0 | Normal recirculation begins again. |
| 4 | 0 | 0 ↓ $\underline{Ex}_d*$ | 0 | 0 | Normal recirculation continues in the Preexchange program. Exchange program is entered when copy switch 78 is depressed. |
| 5 | 0 | 1 ↓ * | 0 | 0 | L block is copied into the B block. |
| 6 | 0 ↓ $\underline{Wr}_d*v$ | 0 | 0 | 0 | Normal recirculation in Preexchange. Write block program is entered when correct block appears in W channel. |
| 7 | 1 ↓ * | 0 | 0 | 0 | B block is copied (written) into its proper position in the W channel. |
| 8 | 0 | 0 | 0 | 0 | Normal recirculation in Preexchange. |

It will be remembered that in filling an information block into the computer, first the L block is completely filled with desired 1 or 0 signals through selective operation of switches 75 and 76, respectively.

Next, the filled L block is copied into the B block responsive to operation of copy switch 78. Finally, responsive to depression of write switch 79 the B block is copied into its proper position in the W channel.

It is seen referring to Table 12 that entries 1–4 describe the manner in which 1 or 0-valued signals are selectively entered into the L block. Entries 4 and 5 together illustrate the manner in which a filled L block may be copied into the B block of the L–B channel and entries 6 and 7 illustrate the manner in which the B block may then be copied into its proper place in the W channel.

*Filling the L block*

(Entry 1): Referring now to entry 1, it is seen that when the mark routine is finished flip-flops $O_1$ and $O_2$ are left in their 0 states. In addition flip-flops $B_1$ and $B_2$ which were cleared to their 0 states by the clear routine have remained in these states. Since $t_a{}^*=1$ was inserted during the mark routine, it is clear that the computer is in its Preexchange block program ($B_1=0$, $B_2=0$, $t_a{}^*=1$). Moreover since the instruction register flip-flops P, Q, R, S, K, D were set to contain the Idle instruction during the clear routine, no instructions are accepted and only normal recirculation takes place. Moreover since an $\underline{\overline{X}}$ instruction cannot be accepted from the L–B channel $\underline{\text{Preexchange}}$ will hold when it is established and will not be normally followed by Exchange.

Insertion of a 1 or 0-valued digit into the L block is accomplished by depressing switch 75 or 76 to cause signal $\underline{1}_d$ or $\underline{0}_d$ to rise to its high level. As soon as either signal $\underline{1}_d$ or $\underline{0}_d$ is at its high level, flip-flop $O_3$ is accordingly set or zeroed as defined by the following terms.

$$S_pO_3=\underline{F}\underline{1}_dO'_1O'_2 \quad 174$$

$$Z_pO_3=\underline{F}\underline{0}_dO'_1O'_2 \quad 175$$

At the next appearance of the fiducial mark * in flip-flop $L_1$, flip-flop $O_2$ is set to its 1 state, provided that a 1 or 0-valued signal has already been placed in flip-flop $O_3$ as described above. This setting of flip-flop $O_2$ is defined by the following term:

$$S_pO_2=\underline{F}I'TX_2L_1(\underline{1}_dO_3+\underline{0}_dO'_3) \quad 176$$

(Entry 2): While flip-flops $O_1$ and $O_2$ are in their 0 and 1 states respectively, the 1 or 0-valued signal which has been placed in flip-flop $O_3$ is copied into the L block in the cell following the fiducial mark *. This is accomplished by effectively inserting flip-flop $O_3$ at each time T into the recirculation loop of the L–B channel for one turn thereof, the path of signal flow during this turn being from $L_1$ to $O_3$ to $L_2$ at time T and then in normal fashion to $L_3$. In this way the initial 1 or 0-valued signal in $O_3$ is copied into the cell following the fiducial mark; while all other signals in the L block are each delayed for two timing periods in flip-flop $O_3$ to be thereby precessed or shifted two cells to the left and thus make room for the new signal being inserted. Since signals in the B block are to be unaffected by this operation they transfer in normal fashion from $L_1$ to $L_2$ to $L_3$ at time T'.

Transfer of signals from $L_1$ to $O_3$ at time T during this period is defined by the following terms:

$$S_pO_3=\underline{F}T(I+X'_2)O'_1O_2L_1 \quad 177$$

$$Z_pO_3=\underline{F}T(I+X'_2)O'_1O_2L'_1 \quad 178$$

Transfer of signals from $O_3$ to $L_2$ at time T during this period is defined by the following terms:

$$S_pL_2=\underline{F}O'_1O_2T(I+X'_2)O_3 \quad 179$$

$$Z_pL_2=\underline{F}O'_1O_2T(I+X'_2)O'_3 \quad 180$$

The inclusion of the expression $(I+X'_2)$ in these terms suppresses their action when the fiducial cell appears in flip-flop $L_1$, since the fiducial mark * must remain stationary in the L–B channel and not be precessed. Normal recirculation of the fiducial cells is separately defined by the following terms:

$$S_pL_2=\underline{F}TI'X_2L_1 \quad 181$$

$$Z_pL_2=\underline{F}TI'X_2L'_1 \quad 182$$

Normal recirculation of signals in the L block at times when flip-flops $O_1$ and $O_2$ are not in their 0 and 1 states respectively, is defined by the following terms:

$$S_pL_2=\underline{F}(O_1+O'_2)L_1 \quad 183$$

$$Z_pL_2=\underline{F}(O_1+O'_2)L'_1 \quad 184$$

Normal recirculation of signals appearing in $L_1$ at times T' is defined by the following terms:

$$S_pL_2=\underline{F}T'L_1 \quad 185$$

$$Z_pL_2=\underline{F}T'L'_1 \quad 186$$

At the end of the turn in which the 1 or 0-valued signal is copied into the L block, upon the appearance of the fiducial mark, flip-flop $O_2$ is zeroed and flip-flop $O_1$ is set as defined by the following terms:

$$S_pO_1=\underline{F}I'TX_2L_1O'_1O_2 \quad 187$$

$$Z_pO_2=\underline{F}I'TX_2L_1O'_1O_2 \quad 188$$

The phase of operation which is described by entry 3 is thus begun.

(Entry 3): While flip-flops $O_1$ and $O_2$ are in their 1 and 0-valued states respectively, normal recirculation (from $L_1$ to $L_2$ to $L_3$) begins again, as defined by terms 183, 184, 185 and 186, presented hereinabove. As soon as switch 75 or 76 (whichever has been depressed) returns to its normal up position so that signals $\underline{1}_{up}$ and $\underline{0}_{up}$ are both again at their high levels, flip-flop $O_1$ is zeroed so as to return to the initial condition in which $B_1$ and $B_2$ are both in their 0 states. Zeroing of flip-flop $O_1$ is defined by the following term:

$$Z_pO_1=\underline{F}\underline{1}_{up}\underline{0}_{up} \quad 189$$

(Entry 4): It is seen that the conditions described by Entry 4 are identical to those shown in Entry 1. Thus another 1 or 0-valued digit may again be entered by depressing switch 75 or 76 again, with the whole cycle of operation described by Entries 1 through 4 being repeated in response thereto. In this way desired 1 or 0-valued signals may be selectively filled into each cell of the L block.

Copying the L block into the B block: After all cells in the L block have been filled in the described manner switch 78 is depressed to cause the L block to be copied into the B block, as illustrated by Entries 4 and 5 of Table 12.

(Entry 4): As shown in Entry 4, upon depression of switch 78, the Exchange block program ($B_1=0$, $B_1=1$, $t_a*=1$) is entered, this being accomplished by setting flip-flop $B_2$ when the fiducial mark * appears in flip-flop $L_1$ as defined by the following term:

$$S_pB_2=\underline{F}\underline{Ex}_dI'TX_2L_1B'_2 \quad 190$$

(Entry 5): Ordinarily in Exchange L signals appearing in $L_1$ at time T are copied into $L_3$ to thereby enter the B block while the ordinary transfer from $L_1$ to $L_2$ at time T is suppressed so that B signals are retained in flip-flop $L_2$ and thus enter the L block thus accomplishing a complete interchange of the L and B blocks. During Fill however, there is not such an interchange but merely a copying of the L block into the B blocks with the original L block remaining unchanged. This accomplished by simultaneously copying L signals, as they appear in flip-flop $L_1$ at time T, into both flip-flop $L_3$ and flip-flop $L_2$. Copying from $L_1$ to $L_3$ at time T is defined by the ordinary Exchange terms while copying from $L_1$ to $L_2$ is defined by terms 183 and 184 presented hereinabove.

At the completion of the one turn of this Exchange block program, flip-flop $B_2$ is zeroed, as defined by the hereinbefore presented term 145 upon the appearance of the fiducial mark * to thereby reenter the Preexchange block program ($B_1=0$, $B_2=0$, $t_a*=1$).

*Copying the B block into the W Channel*

(Entry 6): After a filled L block is copied into the B block, write switch 79 is depressed to cause the B block to be copied into its proper position in the W channel. Since each block filled into the computer contains its own address in the W channel as the position of the $t_0$ tab, the impending appearance of the block to which the B block will be written will be indicated in ordinary fashion by $t_a-t_0$ tab coincidence and the subsequent setting of the $v$ signal to its 1 value.

Upon depression of switch 79, signal $\overline{Wr}_d$ rises to its high level. Thereafter, after tab coincidence is obtained during a turn of the L–B channel and signal $v$ set to its 1 value, the Write block program is entered at the end of that turn at the time that the fiducial mark appears in flip-flop $L_1$ by setting flip-flop $B_1$ provided that signal $v=1$ and precinct verification is obtained. Setting of $B_1$ is defined therefore by the following term:

$$S_pB_1=\underline{F}\underline{Wr}_dI'TX_2L_1X_3(L_3H+L'_3H')$$
191

Note however that $t_a{}^*=1$ remains unchanged.

(Entry 7): After flip-flop $B_1$ is set to its 1 state to thereby enter the Write block program ($B_1=1$, $B_2=0$), during the one turn of the Write program the B block is copied into its proper place in the W channel, as defined by terms 113, 114 and 115 presented hereinabove. At the completion of this turn the Write program is changed back to the Preexchange block program rather than to the normal succeeding Read block program. The normal change to the Read block program (by setting $B_2$) is suppressed at this time, for term 118 which defined this operation requires that $t_a{}^*=0$ in flip-flop $L_2$ while in this instance $t_a{}^*=0$. Setting of flip-flop $B_1$ upon appearance of the fiducial mark is to accomplish the change to the Preexchange block program is defined by the following term:

$$Z_pB_1=\underline{F}I'TX_2L_1B_1$$
192

(Entry 8): Normal recirculation continues in Preexchange. Since the conditions described by entry 8 are identical to those described by entry 1, it is clear that by simply repeating the described operations, all required information blocks may be entered into the computer. As described hereinbefore the second last block to be filled is merely copied from the L block to the B block and is retained there rather than being transferred to the W channel while the last block to be filled is merely entered into the L block.

Figure 5H:
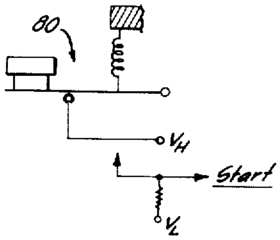

Start: Thereafter computation may be initiated by first, returning fill-compute switch 73 to its normal compute position at which signal $\underline{F}$ returns to its low level and then depressing start switch 80. As shown in Fig. 5*h*, switch 80 is normally spring loaded to an up position at which it produces signal $\overline{Start}$ at its low level. Upon depression and release of switch 80, signal $\overline{Start}$ rises momentarily to its high level before returning again to its normal low level. While signal $\overline{Start}$ is at its high level, the instruction register flip-flops are zeroed under the control of the *Ze* signal as defined by the hereinbefore presented term 99. This has the effect of removing the Idle instruction from the instruction register. Thereafter the instruction register can accept instructions from the words of the L block and thus computation will begin, in Preexchange upon the words of the last block filled into the computer.

What is claimed as new is:

1. An electronic digital computer comprising: a cyclically operable main memory channel for storing a plurality of serially arranged blocks of information signals therein, each block comprising a plurality of serially arranged words of information signals corresponding respectively to said blocks, one of said words for each of said blocks each word comprising a plurality of serially arranged binary information signals, each block having a binary signal $t_b$ positioned in a selected one of its words to identify as a successor block the block corresponding to the selected word; a cyclically operable intermediate memory channel for storing at least two blocks of information; first means for copying a predetermined block from said main memory channel into said intermediate memory channel; second means for reading the signals stored in said intermediate memory channel and responsive to the $t_b$ signal occurring in a word of the predetermined block for copying the corresponding successor block from said main memory channel into said intermediate memory channel.

2. The computer defined by claim 1 which includes third means for receiving the signals read from the intermediate memory channel by said second means and responsive to the $t_b$ signal occurring in a word of the predetermined block for re-recording the successor block in its original position in the main memory channel.

3. The computer defined by claim 1 which includes third means receiving the signals read from the intermediate channel by said second means and responsive to the $t_b$ signal occurring in a word of the successor block for copying another corresponding successor block from the main memory channel into the intermediate channel.

4. The computer defined by claim 1 wherein said intermediate memory channel is operable for storing an L block and a B block and said second means operates to copy the signals of the successor block into said intermediate channel over the corresponding signals of the B block, to thereby form a new B block, the computer including third means receiving the signals read from the intermediate channel by said second means and responsive to the signals of the L block for performing computational operations thereon, and fourth means selectively operable for copying each signal of the B block over the corresponding signal of the L block whereby upon operation of said fourth means the new B block replaces the L block and is computed upon by said fourth means.

5. The electronic digital computer defined by claim 1 wherein a predetermined one of the words contained in the predetermined block includes a predetermined first group of signals representing a Branch instruction; and third means for receiving the signals read by said second means and operable in response to the predetermined first group of signals for copying a predetermined alternate block from said main memory channel into said intermediate memory channel.

6. The computer defined by claim 5 wherein said predetermined first group of signals is included in the word containing the signal $t_b$; said third means including a first apparatus responsive to the predetermined first group of signals for recording a signal $t_0$ in a remote word corresponding to said alternate block, and also including a second apparatus responsive to signal $t_0$ in the remote word for copying the corresponding alternate block from said main memory channel into said intermediate memory channel.

7. In an electronic digital computer comprising an intermediate length cyclically operable memory channel having a first plurality of words of information signals serially stored therein and a cyclically operable main memory channel having a plurality of blocks of information signals serially stored therein and including reading apparatus for serially reading the information signals of the blocks of said main memory channel; the period of a cycle of operation of said intermediate channel corresponding to the time required for reading a block in said main channel, indication apparatus for identifying which block is being read, said indication apparatus comprising: first means for initially recording an indication signal $t_a$ in a predetermined word of the intermediate memory channel; and second means coupled to said intermediate memory channel and operable in each cycle of operation of the intermediate memory channel for removing the $t_a$ signal from the word in which it has been recorded and re-recording the $t_a$ signal in the serially succeeding word of the intermediate memory channel, whereby during each cycle of operation of the intermediate memory channel the block being read in the main memory channel is identified by the presence of the $t_a$ signal positioned in a corresponding word of the intermediate memory channel.

8. The combination defined by claim 7 which further includes block selection apparatus for producing an output signal $v$ whenever a predetermined block is being read in the main memory channel, said block selection apparatus comprising: third means coupled to the intermediate memory channel for recording a signal $t_0$ in a word of the intermediate memory channel which corresponds to the predetermined block; and fourth means for reading information signals from the intermediate channel and responsive to signals $t_0$ and $t_a$ for producing the output signal $v$ whenever signals $t_0$ and $t_a$ are read in the same word of the intermediate channel.

9. The combination defined by claim 8 which further includes fiducial word identification apparatus operable in each cycle of said intermediate channel for producing a fiducial word identification signal whenever a particular word, designated as the last or fiducial word, is being read in the intermediate channel, said fiducial word identification apparatus comprising: fifth means for initially recording a signal * in the fiducial word; and sixth means for receiving the information signals read by said fourth means and responsive to signal * for producing the fiducial word identification signal.

10. The combination defined by claim 9 which further includes block recording apparatus for recording in the intermediate channel that block in the main memory channel which serially succeeds a predetermined block selected by a $t_0$ signal recorded in the corresponding word of the intermediate channel, said block recording apparatus comprising: seventh means for receiving the information signals read from the main memory by the reading apparatus and normally operable for recording each block in the intermediate channel, each signal of a block being recorded over the corresponding signal of the preceding block, said seventh means being rendered inoperable whenever a predetermined deactuating signal is applied thereto; and eighth means responsive to each $v$ signal and the following two fiducial word identification signals for producing the deactuating signal and applying it to said seventh means, whereby the operation of said seventh means is suspended after the block following the selected block has been recorded in the intermediate channel.

11. The combination defined by claim 9 wherein the intermediate channel has a B block comprising a second plurality of information signal words stored therein and which includes writing apparatus for recording the B block in the main memory channel serially following a predetermined block selected by a $t_0$ signal, said writing apparatus comprising: seventh means receiving the information signals read from the intermediate channel by said fourth means and operable in response to application of a predetermined actuating signal for recording each B block information signal in the main memory channel, said seventh means being rendered inoperable whenever a predetermined deactuating signal is applied thereto; eighth means responsive to each $v$ signal and the first following fiducial word identification signal for producing the actuating signal and applying it to said seventh means and responsive to the next following fiducial word identification signal for producing the deactuating signal and applying it to said seventh means.

12. A general purpose electronic digital computer comprising: a cyclically operable intermediate length memory channel for storing a block of information signals, said block comprising a plurality of serially arranged alternate first and second groups of signals, each first group of signals designating an instruction and each second group of signals normally designating an L number; first means for serially reading the signals of said block; second means for receiving the signals read by said first means and normally operable in response to each first group of signals for operating upon the immediately succeeding second group of signals in accordance with the instruction designated by the first group of signals.

13. The general purpose electronic digital computer defined by claim 12 which further includes, a cyclically operable short length memory channel for storing a second group of signals designating an X number, third means for serially reading the signals stored in said short channel, said second means including apparatus for receiving the signals read by said third means and normally operable in response to each first group of signals received from said intermediate channel for combining the immediately succeeding second group of signals designating an L number with the second group of signals designating the X number in accordance with the instruction designated by the first group of signals.

14. The computer defined by claim 13 wherein a predetermined second group of signals designates a plurality of second groups of signals, said predetermined second group of signals comprising a plurality of serially arranged binary 1 or 0-valued signals corresponding respectively to said second groups of signals, each binary signal at its 1 value designating a corresponding second group of signals; said second means being responsive to a predetermined first group of signals for combining the second group of signals designating the X number with each of the second groups of signals designated by said predetermined second group of signals in accordance with the instruction designated by the predetermined first group of signals.

15. The computer defined by claim 14 wherein said second means includes recording apparatus responsive to the predetermined first group of signals for recording each signal of the second group of signals designating the X number in the intermediate channel over the corresponding signal of the second groups of signals designated by the predetermined second group of signals, whereby the X number is copied into a plurality of positions in the intermediate channel replacing each of the L numbers designated by the predetermined second group of signals.

16. The general purpose computer defined by claim 12 wherein a predetermined one of said first group of signals designates a predetermined instruction, the time required for carrying out said predetermined instruction exceeding the time required by said first means for reading the immediately succeeding second group of signals; said second means being rendered inoperable in response to further first group of signals after it receives said predetermined first group of signals and being rendered normally operable again only when a predetermined actuating signal is applied thereto; third means responsive to said predetermined first group of signals for producing signal $f$ and recording signal $f$ in said intermediate channel between said predetermined first group of signals and the serially succeeding first group of signals, fourth means for receiving the signals read by said first means and responsive to signal $f$ for forming the predetermined actuating signal and applying the actuating signal to said second means; whereby said second means normally responds to each successive instruction but is rendered unresponsive to further instructions after the predetermined instruction is read, remaining unresponsive thereafter for one cycle of operation of the intermediate channel until signal $f$ is read, and then being responsive to the instruction serially succeeding the predetermined instruction.

17. A general purpose electronic digital computer comprising: a cyclically operable intermediate length memory channel for storing a first block of information signals, said first block comprising a plurality of serially arranged words of information signals, each word comprising a plurality of serially arranged information signals and including a first group of signals representing a corresponding instruction and a second group of serially arranged signals normally representing a corresponding number; first means for serially reading the signals of said first block from said intermediate channel; second means for receiving the signals read by said first means and normally operable in response to each first group of signals in a word for operating upon the second group of signals in the same word in accordance with the instruction designated by the first group of signals, said second means being rendered inoperable whenever it receives a first group of signals designating a predetermined addressing instruction; third means for receiving the signals read by said first means and operable in response to a first group of signals designating the predetermined addressing instruction for operating upon the second group of signals in a remote word in accordance with the instruction designated by the first group of signals in the remote word.

18. In an electronic digital computer the combination comprising: a cyclically operable intermediate length memory channel for storing a plurality of number groups of binary signals, each number group representing a corresponding number; storage means for storing a predetermined address group of binary signals designating a plurality of said number groups, said predetermined address group comprising a plurality of serially arranged binary 1 or 0-valued signals corresponding respectively to said number groups, each binary signal at a predetermined one of its 1 or 0 values designating the corresponding number group; and computing means operable for serially reading the binary signals of said address group and responsive to each binary signal at its predetermined value for operating upon the signals of the corresponding number group in accordance with a predetermined mathematical operation.

19. The combination defined by claim 18 wherein said computing means includes a cyclically operable short length memory channel, first means for storing the binary signals of said address group in said short channel in their original serial arrangement; second means for serially reading signals simultaneously from said short and intermediate memory channels; said second means including apparatus responsive to each signal of said address group at its predetermined value when it is read at a predetermined time before the first signal of a number for operating upon the signals of the number group in accordance with the predetermined mathematical operation.

20. An electronic digital computer comprising: a cyclically operable main memory channel for storing a plurality N of serially arranged blocks $Bl_i$ of information signals designated $Bl_{i=1}, Bl_{i=2} \ldots Bl_{i=N}$, each block comprising a plurality N of serially arranged words $W_i$ of information signals designated $W_{i=1}, W_{i=2} \ldots W_{i=N}$, corresponding respectively to said blocks, each word comprising a plurality of serially arranged binary information signals, each block having a binary signal $t_b$ positioned in one of its words to identify a corresponding successor block; a cyclically operable intermediate memory channel for storing at least two blocks; first means for copying a predetermined block $Bl_{i=j}$, where $j$ is a predetermined integer, from said main memory channel into said intermediate memory channel, $Bl_{i=j}$ having the signal $t_b$ positioned in $W_{i=k}$ where $k$ is another integer; and second means for reading the signals stored in said intermediate channel and responsive to the signal $t_b$ in $W_{i=k}$ for copying $Bl_{i=k}$ from said main memory channel into said intermediate memory channel.

21. An electronic digital general purpose computer comprising: an intermediate memory for storing a predetermined plurality of blocks of information signals, each block comprising a plurality of serially arranged words of information signals, each word comprising a plurality of serially arranged binary signals; a cyclically operable memory absolutely synchronized with said intermediate memory for storing a predetermined plurality of precincts of information signals, each precinct comprising a plurality of blocks, each block containing predetermined signals designating a corresponding successor block; first means for copying a predetermined block from said main memory into said intermediate memory; second means for serially reading the signals of blocks stored in the intermediate memory; third means for receiving the signals read by said second means and serially operating upon the signals of the predetermined block in accordance with predetermined mathematical operations; and fourth means for receiving the signals read by said second means and automatically operable in response to said predetermined signals for copying the corresponding successor block from the main memory into the intermediate memory while the signals of said predetermined block are being operated upon by said third means, whereby a standby successor block is normally automatically copied from the main memory into the intermediate memory while computation is continuing on the preceding block, the standby successor block thus being available in the intermediate memory for immediate use as soon as computation on the preceding block is completed.

22. The computer defined by claim 21 wherein said intermediate memory comprises a cyclically operable intermediate length memory channel for storing at least two blocks of information interplexed signal by signal in alternate cells of said intermediate channel, said first means being operable for serially copying the signals of the predetermined block into the intermediate channel, each signal being spaced one cell from the preceding cell, said fourth means including apparatus for copying the signals of said successor block into the cells between the corresponding signals of the predetermined block, and fifth means operable when computation is completed on said predetermined block for copying each signal of the successor block over the immediately adjacent corresponding signal of the predetermined block, whereby upon operation of said fifth means computation is immediately begun by said third means upon the signals of the successor block.

23. In an electronic digital computer, a cyclically operable memory channel comprising: a rotatable drum having a magnetizable surface; first and second writing transducers operable in response to electrical information signals for recording corresponding magnetic signals on the drum surface then being traversed by the transducers; transducer moving means intercoupling said drum and first and second transducers for cyclically moving said first and second transducer in synchronism with rotation of said drum to respectively alternately traverse a first and second helical channel on the periphery of said drum, the cycle of operation of said transducer moving means corresponding to a predetermined integral number of rotations of said drum, the cycle of operation of said transducer moving means corresponding to a predetermined integral number of rotations of said drum; identification apparatus for indicating when a predetermined point in a predetermined helical channel is being traversed by the corresponding transducer, said identification apparatus including a signal generator coupled to said drum and responsive to rotation of said drum for producing a predetermined identification signal after each of said predetermined integral number of rotations of said drum; recording means for recording applied information signals in a selected portion of said predetermined helical channel having a predetermined displacement in said channel relative to said predetermined point said recording apparatus comprising, first means for storing the applied electrical information signals and operable in response to a predetermined actuating signal for applying the stored signals to the predetermined transducer; second means coupled to said drum and responsive to said identification signal and to rotation of said drum for producing the predetermined actuating signal after an angular rotation of said drum corresponding to the predetermined displacement of the selected portion from said predetermined point; and third means intercoupling said first and second means for applying the actuating signal to said second means.

24. An electronic digital computer including a cyclically operable intermediate length memory for storing a block of information signals, said block including a plurality of serially arranged instruction words, each instruction word containing an instruction group of serially arranged binary signals selectively designating an operation to be performed, at least one of said instruction groups designating a predetermined extended operation; first means for serially reading the signals of said block; second means for receiving the signals read by said first means and responsive to said one instruction group designating the predetermined extended operation for producing a recognition signal *f* and storing signal *f* in said intermediate memory at a predetermined position relative to said one instruction group; third means for receiving the signals read by said first means and normally responsive to each instruction group for performing the corresponding selectively designated operation, said third means being responsive to said one instruction group for performing the extended operation and being thereafter inoperable until application of a predetermined actuating signal thereto; fourth means for receiving the signals read by said first means and responsive to the recognition signal *f* read from the intermediate memory for applying the predetermined actuating signal to said third means immediately before the *n*th instruction group, where *n* is a predetermined integer, serially following the signal *f* in the intermediate memory is read, whereby said third means is unresopnsive to further operational instructions after said one instruction group is read and remains unresponsive for one cycle of operation of the intermediate memory, until the *n*th instruction group following the recorded *f* signal is read.

25. The electronic digital computer defined by claim 24 wherein said second means includes apparatus responsive to said one instruction group for storing signal *f* in said intermediate channel between said one instruction group and the sequentially succeeding instruction group, and wherein said fourth means is operable in response to signal *f* for applying the predetermined actuating signal to said third means immediately before the first instruction group following the *f* signal is read: whereby said third means is unresponsive to further instructions after said one instruction is read and remains unresponsive for one cycle of operation until the instruction group serially succeeding said one instruction group is read.

26. The electronic digital computer defined by claim 24 which further includes fifth means coupled to said second means and operable after each recording operation of said second means for receiving the signals read by said first means and responsive to signal *f* for erasing signal *f* from the intermediate memory.

27. The electronic digital computer defined by claim 1 wherein said fourth means after receiving signal *f* is responsive to the next serially following instruction group for applying the predetermined actuating signal to said third means.

28. In an electronic switching system wherein operations are performed in response to a first plurality of bivalued instruction signals contained in a corresponding first plurality of static storage elements, apparatus for serially stepping the instruction signals into the static storage elements, suspending performance of operations until all signals of an instruction are entered, and suspending further stepping after all signals of an instruction have been entered, said apparatus comprising: first means for sequentially applying a plurality of instruction words to a selected one of said static storage elements, each instruction word including a first plurality of sequentially occurring instruction signals every first plurality of bivalued instruction signals including at least two predetermined signals having predetermined values; second means coupled to at least two predetermined static storage elements of said first plurality of elements for producing a predetermined stepping signal whenever signals not having the predetermined values are stored in said predetermined elements; third means responsive to the predetermined stepping signal for stepping each instruction signal applied to said selected element in predetermined order through the remaining elements of said first plurality of static storage elements; fourth means coupled to said storage elements and to said second means and normally operable in response to the signals stored in said first plurality of static storage elements for performing the correspondingly designated operation, said fourth means being rendered inoperative whenever the predetermined stepping signal is produced.

References Cited in the file of this patent

UNITED STATES PATENTS

| | | |
|---|---|---|
| 2,416,445 | Jensen | Feb. 25, 1947 |
| 2,636,672 | Hamilton | Apr. 28, 1953 |
| 2,679,638 | Bensky | May 25, 1954 |
| 2,721,990 | McNaney | Oct. 25, 1955 |
| 2,787,416 | Hansen | Apr. 2, 1957 |

FOREIGN PATENTS

| | | |
|---|---|---|
| 167,102 | Australia | Feb. 27, 1956 |

UNITED STATES PATENT OFFICE
CERTIFICATION OF CORRECTION

Patent No. 2,974,867 March 14, 1961

Floyd G. Steele

It is hereby certified that error appears in the above numbered patent requiring correction and that the said Letters Patent should read as corrected below.

Column 12, line 54, for "$t_1$", (numeral "1"), read -- $t_l$ --, (letter "l"); column 15, line 9, for "X of the $X_1$" read -- $X_1$ of the X --; line 60, for "tht" read -- the --; column 17, line 21, for "numbtr" read -- number --; column 32, line 19, for that portion of formula (9) reading "SX=" read -- $SX_2$= --; line 41, for that portion of formula (11) reading "$+L'^2$" read -- $+L'_2$ --; line 43, for that portion of formula (11) reading "$+T_1)\}$" read -- $+T_1)\{$ --; same column 32, line 45, for that portion of formula (11) reading "$Tb'^2$" read -- $Tb'_2$ --; column 34, line 31, the formula (42) should appear as shown below instead of as in the patent:

$$SO_2=Cl[O'_1O'_2\underline{m}_dH\underline{M}_s+FI'TX_2L_1(\underline{1}_dO_3+\underline{0}_dO'_3)]$$

column 35, TABLE 5-Continued, second column, line 24, for "Idle%" read -- Idle= --; column 38, line 59, for that portion of the equation reading "(O'+R)" read -- (Q'+R) --; column 42, line 9, for "coppied" read -- copied --; column 49, line 20, for "test" read -- Test --; column 52, line 59, for "42a" read -- (42a) --; column 56, line 10, for "$t_2$=1" read -- $t_a$=1 --; column 57, line 33, for "seting" read -- setting --; column 58, line 30, for "$L_2$" read -- $L_3$ --; line 39, for "$t_a$=0" read -- $t^*_a$=0 --; column 60, line 49, for "X" read -- $\underline{X}$ --; column 62, line 53, after "flip-flop" insert -- $B_2$ --; column 68, line 30, for "stated" read -- state --; column 78, lines 59, 60 and 61, strike out "the cycle of operation of said transducer moving means corresponding to a predetermined integral number of rotations of said drum,".

Signed and sealed this 31st day of October 1961.

(SEAL)
Attest:

ERNEST W. SWIDER
Attesting Officer

DAVID L. LADD
Commissioner of Patents